(12) United States Patent
Huang et al.

(10) Patent No.: US 11,824,808 B2
(45) Date of Patent: Nov. 21, 2023

(54) TECHNIQUES FOR MULTIPLEXING MULTI-BIT AND SINGLE-BIT FEEDBACK

(71) Applicant: QUALCOMM Incorporated, San Diego, CA (US)

(72) Inventors: Yi Huang, San Diego, CA (US); Seyedkianoush Hosseini, San Diego, CA (US); Peter Gaal, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/394,728

(22) Filed: Aug. 5, 2021

(65) Prior Publication Data

US 2023/0043337 A1 Feb. 9, 2023

(51) Int. Cl.
*H04L 5/00* (2006.01)
*H04W 72/10* (2009.01)
*H04W 72/23* (2023.01)

(52) U.S. Cl.
CPC .......... *H04L 5/005* (2013.01); *H04L 5/0016* (2013.01); *H04W 72/23* (2023.01)

(58) Field of Classification Search
CPC ....... H04L 5/005; H04L 5/0016; H04W 72/23
See application file for complete search history.

(56) References Cited

U.S. PATENT DOCUMENTS

| 10,574,309 B2 | 2/2020 | Akkarakaran et al. |
| 2017/0273056 A1 | 9/2017 | Papasakellariou |
| 2018/0019843 A1 | 1/2018 | Papasakellariou |
| 2018/0242286 A1 | 8/2018 | Song et al. |
| 2019/0021088 A1 | 1/2019 | Zhang et al. |
| 2019/0045489 A1 | 2/2019 | He et al. |
| 2019/0305894 A1 | 10/2019 | Hosseini et al. |

(Continued)

FOREIGN PATENT DOCUMENTS

| EP | 3657713 A1 | 5/2020 |
| WO | WO-2018204491 A1 | 11/2018 |

(Continued)

OTHER PUBLICATIONS

International Search Report and Written Opinion—PCT/US2022/036881—ISA/EPO—dated Oct. 17, 2022.

*Primary Examiner* — Ronald B Abelson
(74) *Attorney, Agent, or Firm* — Holland & Hart LLP

(57) ABSTRACT

Methods, systems, and devices for wireless communication are described. Some wireless communications systems may support codebook structures for multiplexing single-bit feedback and multi-bit feedback in a same uplink feedback message. A user equipment (UE) may receive a first downlink message associated with single-bit feedback and a second downlink message associated with multi-bit feedback. The first downlink message and the second downlink message may have a common uplink transmission opportunity for transmitting feedback pertaining to the downlink messages. The UE may generate a codebook that supports inclusion of both the single-bit feedback and the multi-bit feedback for the first and second downlink messages. The UE may transmit the feedback message during the common uplink transmission opportunity based on the codebook.

36 Claims, 25 Drawing Sheets

(56) References Cited

U.S. PATENT DOCUMENTS

| | | |
|---|---|---|
| 2020/0052825 A1 | 2/2020 | Sarkis et al. |
| 2020/0059327 A1* | 2/2020 | Kini ..................... H04L 5/0055 |
| 2020/0228174 A1 | 7/2020 | Nam et al. |
| 2020/0229179 A1 | 7/2020 | Fan et al. |
| 2020/0313807 A1 | 10/2020 | Salem |
| 2020/0322097 A1 | 10/2020 | Hsieh et al. |
| 2022/0039029 A1 | 2/2022 | Zhang et al. |
| 2022/0053532 A1 | 2/2022 | Baldemair et al. |
| 2022/0116153 A1 | 4/2022 | Hosseini et al. |
| 2022/0377813 A1 | 11/2022 | Wang et al. |
| 2023/0041715 A1* | 2/2023 | Huang ................. H04W 72/23 |
| 2023/0074723 A1 | 3/2023 | Alfarhan et al. |
| 2023/0087280 A1 | 3/2023 | Zhang et al. |

FOREIGN PATENT DOCUMENTS

| | | |
|---|---|---|
| WO | WO-2019099383 A1 | 5/2019 |
| WO | WO-2019226458 A1 | 11/2019 |

* cited by examiner

TECHNIQUES FOR MULTIPLEXING MULTI-BIT AND SINGLE-BIT FEEDBACK

FIELD OF TECHNOLOGY

The following relates to wireless communication, including techniques for multiplexing multi-bit and single-bit feedback.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may transmit a feedback message in response to a downlink message. The feedback message may include a single bit of feedback per transport block (TB) or per code block group (CBG) in the downlink message (e.g., which may be referred to as single-bit feedback). Alternatively, the feedback message may include multiple bits per TB or CBG (e.g., which may be referred to as multi-bit feedback or other terminology). In some cases, feedback for multiple downlink messages may be transmitted via a same uplink resource, and the UE may generate a codebook corresponding to the multiple downlink messages. Existing techniques, however, may not support codebooks for multiplexing multi-bit feedback with single-bit feedback into a same feedback message.

SUMMARY

The described techniques relate to improved methods, systems, devices, and apparatuses that support techniques for multiplexing multi-bit and single-bit feedback. Generally, the described techniques provide for a user equipment (UE) to multiplex single-bit feedback information and multi-bit feedback information in an uplink feedback message based at least in part on one or more codebooks. For example, a UE may receive one or more downlink messages and generate a codebook for reporting feedback pertaining to each of the downlink messages. In some cases, a codebook generated by the UE may not support inclusion of both single-bit feedback information and multi-bit feedback information in a same feedback message. In such cases, one or more codebooks used by the UE for feedback may not simultaneously support single-bit feedback and multi-bit feedback, potentially impairing system efficiency.

To improve codebook generation for single-bit feedback and multi-bit feedback, a UE as described herein may receive signaling indicating one or more codebook configurations that support inclusion of both the single-bit feedback information and the multi-bit feedback information in a same feedback message. The UE may receive a first downlink message associated with single-bit feedback and a second downlink message associated with multi-bit feedback. The first downlink message and the second downlink message may share a common uplink transmission opportunity for transmitting feedback (e.g., via a physical uplink control channel (PUCCH)), via a physical uplink shared channel (PUSCH)) pertaining to the downlink messages. The UE may generate a codebook that supports inclusion of both the single-bit feedback information and the multi-bit feedback information for the first and second downlink messages. In some examples, the codebook may be generated in accordance with a codebook configuration for the UE. The UE may transmit the feedback message during the common uplink transmission opportunity based on the codebook.

A method for wireless communication at a UE is described. The method may include receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message, generating, based on decoding the first downlink message and the second downlink message, the codebook supporting inclusion of both single-bit feedback for the first downlink message and multi-bit feedback for the second downlink message, and transmitting, during the common uplink transmission opportunity, the feedback message based on the codebook.

An apparatus for wireless communication at a UE is described. The apparatus may include a processor, memory coupled with the processor, and instructions stored in the memory. The instructions may be executable by the processor to cause the apparatus to receive a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message, generating, base at least in part on decoding the first downlink message and the second downlink message, the codebook supporting inclusion of both single-bit feedback for the first downlink message and multi-bit feedback for the second downlink message, and transmit, during the common uplink transmission opportunity, the feedback message based on the codebook.

Another apparatus for wireless communication at a UE is described. The apparatus may include means for receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message, means for generating, based on decoding the first downlink message and the second downlink message, the codebook supporting inclusion of both single-bit feedback for the first downlink message and multi-bit feedback for the second downlink message, and means for transmitting, during the common uplink transmission opportunity, the feedback message based on the codebook.

A non-transitory computer-readable medium storing code for wireless communication at a UE is described. The code may include instructions executable by a processor to receive a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message, generating, base at least in part on decoding the first downlink message and the second downlink message, the codebook supporting inclusion of both single-bit feedback for the first downlink message and multi-bit feedback for the second downlink message, and transmit, during the common uplink transmission opportunity, the feedback message based on the codebook.

Some examples of the method, apparatuses, and non-transitory computer-readable medium described herein may further include operations, features, means, or instructions for receiving signaling including a first feedback timing for the single-bit feedback for the first downlink message and a second feedback timing for the multi-bit feedback for the second downlink message, the first feedback timing indicating a first time gap that may be less than a second time gap indicated by the second feedback timing, where the feedback message based on the codebook may be transmitted based on a time difference between the first downlink message and the feedback message being greater than or equal to the first time gap, the codebook supporting inclusion of at least the single-bit feedback for the first downlink message.

Some examples of the method, apparatuses, and non-transitory computer-readable medium described herein may further include operations, features, means, or instructions for determining that a time difference between the second downlink message and the feedback message may be greater than or equal to the second time gap, where generating the codebook includes generating the codebook supporting inclusion of both the single-bit feedback for the first downlink message and the multi-bit feedback for the second downlink message based on the time difference being greater than or equal to the second time gap.

Some examples of the method, apparatuses, and non-transitory computer-readable medium described herein may further include operations, features, means, or instructions for determining that a time difference between the second downlink message and the feedback message may be less than the second time gap, where generating the codebook includes generating the codebook supporting inclusion of the single-bit feedback for the first downlink message and additional single-bit feedback for the second downlink message based on the time difference being less than the second time gap.

In some examples of the method, apparatuses, and non-transitory computer-readable medium described herein, generating the codebook supporting inclusion of the single-bit feedback for the first downlink message and the additional single-bit feedback for the second downlink message may include operations, features, means, or instructions for dropping one or more bits from the multi-bit feedback for the second downlink message.

Some examples of the method, apparatuses, and non-transitory computer-readable medium described herein may further include operations, features, means, or instructions for determining that a subcodebook of the codebook supports inclusion of either the single-bit feedback or the multi-bit feedback, where generating the codebook includes generating the codebook supporting inclusion of the single-bit feedback for the first downlink message based on the determination, where each subsubcodebook of the codebook supports inclusion of the single-bit feedback for the first downlink message.

Some examples of the method, apparatuses, and non-transitory computer-readable medium described herein may further include operations, features, means, or instructions for determining that a subcodebook of the codebook supports inclusion of either the single-bit feedback or the multi-bit feedback, where generating the codebook includes generating the codebook supporting inclusion of the multi-bit feedback for the second downlink message based on the determination, where each subsubcodebook of the codebook supports inclusion of the multi-bit feedback for the second downlink message.

Some examples of the method, apparatuses, and non-transitory computer-readable medium described herein may further include operations, features, means, or instructions for determining that a first subcodebook and a second subcodebook of the codebook support inclusion of either the single-bit feedback or the multi-bit feedback, where generating the codebook includes generating the codebook supporting inclusion of the single-bit feedback for the first downlink message or the multi-bit feedback for the second downlink message based on the determination, where a subsubcodebook of the first subcodebook supports inclusion of the single-bit feedback for the first downlink message and a subsubcodebook of the second subcodebook supports inclusion of the multi-bit feedback for the second downlink message.

Some examples of the method, apparatuses, and non-transitory computer-readable medium described herein may further include operations, features, means, or instructions for receiving signaling configuring the UE with a per-TB based feedback scheme and a per-CBG based feedback scheme, determining that a subcodebook of the codebook supports inclusion of the single-bit feedback and exclude the multi-bit feedback based on the signaling configuring the per-TB based feedback scheme and the per-CBG based feedback scheme, where generating the codebook includes generating the codebook supporting inclusion of the single-bit feedback for the first downlink message and additional single-bit feedback for the second downlink message based on the determination, where a subsubcodebook of the subcodebook supports inclusion of the single-bit feedback for the first downlink message and the additional single-bit feedback for the second downlink message, and where the multi-bit feedback for the second downlink message may be reduced to the additional single-bit feedback based on the determination.

Some examples of the method, apparatuses, and non-transitory computer-readable medium described herein may further include operations, features, means, or instructions for receiving signaling configuring the UE with a per-TB based feedback scheme and disabling a per-CBG based feedback scheme, determining that a subcodebook of the codebook supports inclusion of both the single-bit feedback and the multi-bit feedback based on the signaling configuring the per-TB based feedback scheme and disabling the per-CBG based feedback scheme, where generating the codebook includes generating the codebook supporting inclusion of both the single-bit feedback for the first downlink message and the multi-bit feedback for the second downlink message based on the determination, where a first subsubcodebook of the subcodebook supports inclusion of the single-bit feedback for the first downlink message and a second subsubcodebook of the subcodebook supports inclusion of the multi-bit feedback for the second downlink message.

Some examples of the method, apparatuses, and non-transitory computer-readable medium described herein may further include operations, features, means, or instructions for determining that a subcodebook of the codebook supports inclusion of both the single-bit feedback and the multi-bit feedback based on the codebook being a high-priority codebook, where generating the codebook includes generating the codebook supporting inclusion of both the single-bit feedback for the first downlink message and the multi-bit feedback for the second downlink message based on the determination, where a first subsubcodebook of the subcodebook supports inclusion of the single-bit feedback for the first downlink message and a second subsubcodebook of the subcodebook supports inclusion of the multi-bit feedback for the second downlink message.

Some examples of the method, apparatuses, and non-transitory computer-readable medium described herein may further include operations, features, means, or instructions for determining that a subcodebook of the codebook supports inclusion of the single-bit feedback and exclude the multi-bit feedback based on the codebook being a low-priority codebook, where generating the codebook includes and generating the codebook supporting inclusion of the single-bit feedback for the first downlink message and additional single-bit feedback for the second downlink message based on the determination, where a subsubcodebook of the subcodebook supports inclusion of the single-bit feedback for the first downlink message and the additional single-bit feedback for the second downlink message, and where the multi-bit feedback for the second downlink message may be reduced to the additional single-bit feedback based on the determination.

Some examples of the method, apparatuses, and non-transitory computer-readable medium described herein may further include operations, features, means, or instructions for receiving signaling configuring the UE with multi-transmission/reception point (TRP) feedback, determining that a subcodebook of the codebook supports inclusion of the single-bit feedback and exclude the multi-bit feedback based on the control signaling configuring the multi-TRP feedback, where generating the codebook includes generating the codebook supporting inclusion of the single-bit feedback for the first downlink message and additional single-bit feedback for the second downlink message based on the determination, where a subsubcodebook of the subcodebook supports inclusion of the single-bit feedback for the first downlink message and the additional single-bit feedback for the second downlink message, and where the multi-bit feedback for the second downlink message may be reduced to the additional single-bit feedback based on the determination.

In some examples of the method, apparatuses, and non-transitory computer-readable medium described herein, generating the codebook may include operations, features, means, or instructions for generating the codebook supporting inclusion of both the single-bit feedback for the first downlink message and the multi-bit feedback for the second downlink message, where a subcodebook of the codebook includes a first subsubcodebook and a second subsubcodebook, the first subsubcodebook including the single-bit feedback and the second subsubcodebook including the multi-bit feedback.

Some examples of the method, apparatuses, and non-transitory computer-readable medium described herein may further include operations, features, means, or instructions for transmitting an indication of a capability of the UE to support a set of multiple subsubcodebooks of the codebook, where transmitting the feedback message including the codebook may be based on the capability of the UE.

In some examples of the method, apparatuses, and non-transitory computer-readable medium described herein, the multi-bit feedback includes a first bit indicating an acknowledgment (ACK) or a negative acknowledgment (NACK) associated with the second downlink message and one or more additional bits indicating information corresponding to one or more communications parameters, and the one or more communications parameters may be associated with channel state information (CSI).

A method for wireless communication at a base station is described. The method may include transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message and receiving, from the UE and during the common uplink transmission opportunity, the feedback message based on the codebook, the codebook supporting inclusion of single-bit feedback for the first downlink message and multi-bit feedback for the second downlink message.

An apparatus for wireless communication at a base station is described. The apparatus may include a processor, memory coupled with the processor, and instructions stored in the memory. The instructions may be executable by the processor to cause the apparatus to transmit, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message and receive, from the UE and during the common uplink transmission opportunity, the feedback message based on the codebook, the codebook supporting inclusion of single-bit feedback for the first downlink message and multi-bit feedback for the second downlink message.

Another apparatus for wireless communication at a base station is described. The apparatus may include means for transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message and means for receiving, from the UE and during the common uplink transmission opportunity, the feedback message based on the codebook, the codebook supporting inclusion of single-bit feedback for the first downlink message and multi-bit feedback for the second downlink message.

A non-transitory computer-readable medium storing code for wireless communication at a base station is described.

The code may include instructions executable by a processor to transmit, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message and receive, from the UE and during the common uplink transmission opportunity, the feedback message based on the codebook, the codebook supporting inclusion of single-bit feedback for the first downlink message and multi-bit feedback for the second downlink message.

Some examples of the method, apparatuses, and non-transitory computer-readable medium described herein may further include operations, features, means, or instructions for transmitting signaling indicating a first feedback timing for the single-bit feedback for the first downlink message and a second feedback timing for the multi-bit feedback for the second downlink message, the first feedback timing corresponding to a first time gap that may be less than a second time gap indicated by the second feedback timing, where transmitting the feedback message based on the codebook may be based on a time difference between the first downlink message and the feedback message being greater than or equal to the first time gap, the codebook supporting inclusion of at least the single-bit feedback for the first downlink message.

In some examples of the method, apparatuses, and non-transitory computer-readable medium described herein, a time difference between the second downlink message and the feedback message may be greater than or equal to the second time gap, and the codebook may support inclusion of both the single-bit feedback for the first downlink message and the multi-bit feedback for the second downlink message based on the time difference being greater than or equal to the second time gap.

In some examples of the method, apparatuses, and non-transitory computer-readable medium described herein, a time difference between the second downlink message and the feedback message may be less than the second time gap, and the codebook may support inclusion of the single-bit feedback for the first downlink message and additional single-bit feedback for the second downlink message based on the time difference being less than the second time gap.

In some examples of the method, apparatuses, and non-transitory computer-readable medium described herein, the codebook includes a subcodebook that supports inclusion of either the single-bit feedback for the first downlink message or the multi-bit feedback for the second downlink message, and each subsubcodebook of the codebook may support inclusion of the single-bit feedback for the first downlink message.

In some examples of the method, apparatuses, and non-transitory computer-readable medium described herein, a first subcodebook and a second subcodebook of the codebook support inclusion of either the single-bit feedback for the first downlink message or the multi-bit feedback for the second downlink message, and each subsubcodebook of the codebook may support inclusion of the multi-bit feedback for the second downlink message.

In some examples of the method, apparatuses, and non-transitory computer-readable medium described herein, a first subcodebook and a second subcodebook of the codebook may support inclusion of either the single-bit feedback for the first downlink message or the multi-bit feedback for the second downlink message, and a sub subcodebook of the first subcodebook may support inclusion of the single-bit feedback for the first downlink message and a subsubcodebook of the second subcodebook may support inclusion of the multi-bit feedback for the second downlink message.

Some examples of the method, apparatuses, and non-transitory computer-readable medium described herein may further include operations, features, means, or instructions for transmitting signaling configuring the UE with a per-TB based feedback scheme and a per-CBG based feedback scheme, where a subcodebook of the codebook includes the single-bit feedback and excludes the multi-bit feedback based on the signaling configuring the UE with the per-TB based feedback scheme and the per-CBG based feedback scheme, and where a subsubcodebook of the subcodebook may support inclusion of the single-bit feedback for the first downlink message and additional single-bit feedback for the second downlink message.

Some examples of the method, apparatuses, and non-transitory computer-readable medium described herein may further include operations, features, means, or instructions for transmitting signaling configuring the UE with a per-TB based feedback scheme and disabling a per-CBG based feedback scheme, where a subcodebook of the codebook includes both the single-bit feedback and the multi-bit feedback based on the signaling configuring the per-TB based feedback scheme and disabling the per-CBG based feedback scheme, and where a first subsubcodebook of the subcodebook supports inclusion of the single-bit feedback for the first downlink message and a second subsubcodebook of the subcodebook supports inclusion of the multi-bit feedback for the second downlink message.

In some examples of the method, apparatuses, and non-transitory computer-readable medium described herein, a subcodebook of the codebook includes both the single-bit feedback and the multi-bit feedback based on the codebook being a high-priority codebook, and a first subsubcodebook of the subcodebook may support inclusion of the single-bit feedback for the first downlink message and a second subsubcodebook of the subcodebook may support inclusion of the multi-bit feedback for the second downlink message.

In some examples of the method, apparatuses, and non-transitory computer-readable medium described herein, a subcodebook of the codebook includes the single-bit feedback and excludes the multi-bit feedback based on the codebook being a low-priority codebook, and a subsubcodebook of the subcodebook may support inclusion of the single-bit feedback for the first downlink message and additional single-bit feedback for the second downlink message.

Some examples of the method, apparatuses, and non-transitory computer-readable medium described herein may further include operations, features, means, or instructions for transmitting signaling configuring the UE with multi-TRP feedback, where a subcodebook of the codebook includes the single-bit feedback and excludes the multi-bit feedback based on the signaling configuring the multi-TRP feedback, and where a subsubcodebook of the subcodebook may support inclusion of the single-bit feedback for the first downlink message and additional single-bit feedback for the second downlink message.

In some examples of the method, apparatuses, and non-transitory computer-readable medium described herein, the codebook includes both the single-bit feedback for the first downlink message and the multi-bit feedback for the second downlink message, and a subcodebook of the codebook includes a first subsubcodebook and a second subsubcodebook, the first subsubcodebook including the single-bit feedback and the second subsubcodebook including the multi-bit feedback.

Some examples of the method, apparatuses, and non-transitory computer-readable medium described herein may further include operations, features, means, or instructions for receiving an indication of a capability of the UE to support a set of multiple subsubcodebooks of the codebook, where the feedback message including the codebook may be based on the capability of the UE.

In some examples of the method, apparatuses, and non-transitory computer-readable medium described herein, the multi-bit feedback includes a first bit indicating an ACK or a NACK associated with the second downlink message and one or more additional bits indicating information corresponding to one or more communications parameters, and the one or more communications parameters may be associated with CSI.

DETAILED DESCRIPTION

Figure 1:
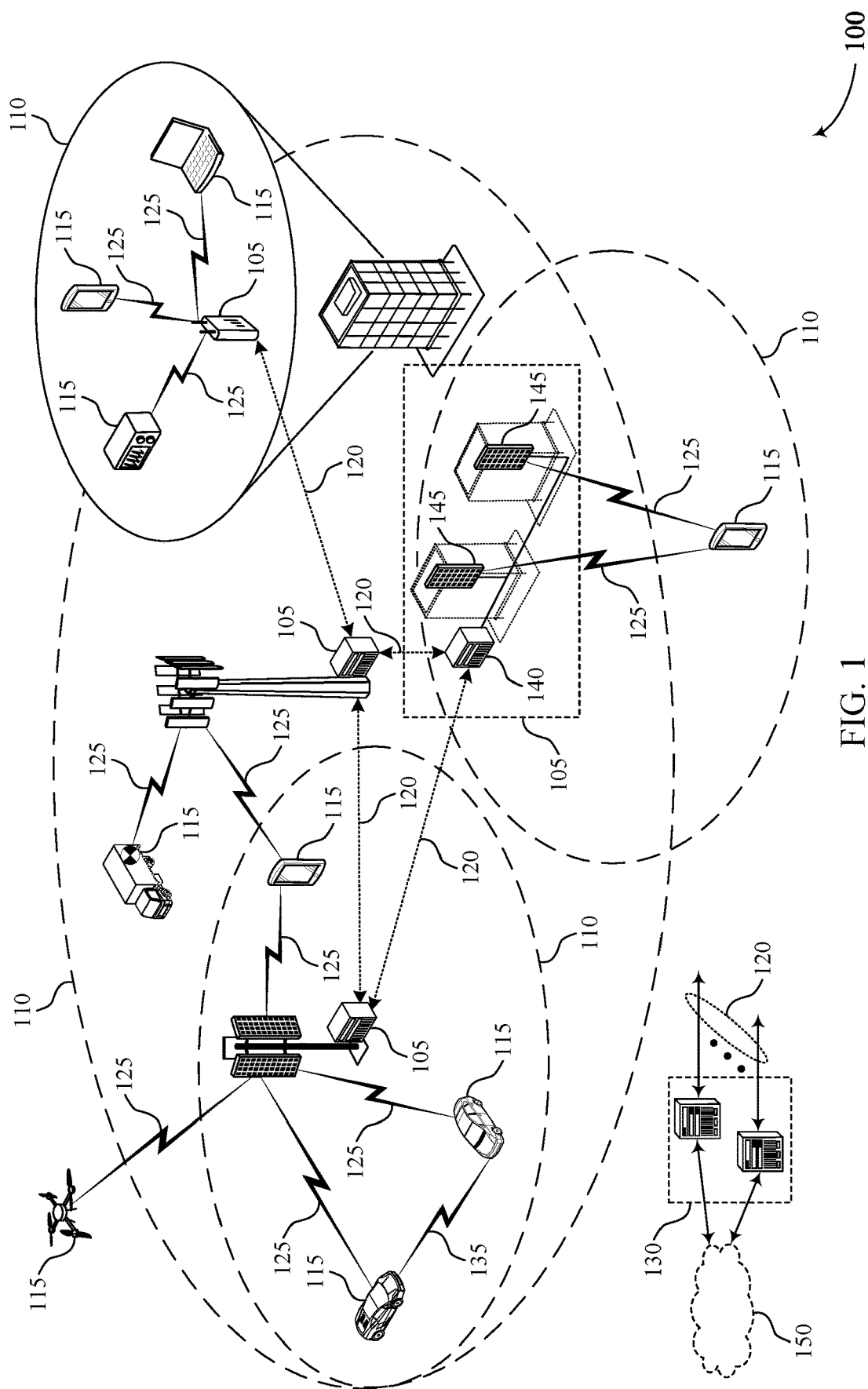
FIGS. 1 and 2 illustrate examples of wireless communications systems that support techniques for multiplexing multi-bit and single-bit feedback in accordance with aspects of the present disclosure.

A wireless communications system may include communication devices, such as a base station (e.g., an eNodeB (eNB), a next generation NodeB or a giga NodeB, any of which may be referred to as a gNB, or some other base station) or a user equipment (UE) that may support multiple radio access technologies. Examples of radio access technologies include 4G systems, such as LTE systems, and 5G systems, which may be referred to as New Radio (NR) systems. In the wireless communications system, a base station may transmit one or more downlink messages to a UE. The UE may transmit a feedback message in response to the one or more downlink messages. The feedback message may include a single bit of feedback per transport block (TB) or per code block group (CBG) in the downlink messages (which may be referred to as single-bit feedback). Alternatively, the feedback message may include multiple bits per TB or CBG (which may be referred to as multi-bit feedback). For example, the multi-bit feedback may indicate a one-bit acknowledgment (ACK) or negative acknowledgment (NACK) in addition to one or more other bits that indicate additional information, for example, related to channel state information (CSI). In one example, the one or more other bits may indicate information associated with a modulation and coding scheme (MCS) used for communications. The multi-bit feedback (e.g., including ACK/NACK and additional information) may be referred to as turbo-hybrid automatic repeat request (HARQ) or some other terminology.

In some cases, feedback for multiple downlink messages may be transmitted via a same uplink resource, and the UE may generate a codebook corresponding to the multiple downlink messages. The UE may use the codebook to multiplex the feedback into a single uplink message. The UE may simultaneously support two codebooks that each correspond to one of a first or a second transmission reception point (TRP) of the base station, or to high priority traffic or low priority traffic, or the like. However, the UE may not utilize a codebook structure that supports multiplexing single-bit feedback with multi-bit feedback into a same feedback message.

Different codebook configurations as described herein may provide for the UE to multiplex single-bit feedback and multi-bit feedback into a same uplink feedback message. Each of the two codebooks supported by the UE may include two subcodebooks, and each subcodebook may further include up to two subsubcodebooks. The subcodebooks and subsubcodebooks may each include subsets of the total feedback information included in the respective codebook. The subsets of feedback information may be grouped into the subcodebooks and subsubcodebooks based on one or more parameters associated with the feedback information. For example, a first subcodebook may correspond to TB-based feedback and a second subcodebook may correspond to CBG-based feedback. Each subcodebook may include a respective first subsubcodebook associated with multi-bit feedback and a respective second subsubcodebook associated with single-bit feedback. As such, the UE may, in some examples, support multi-bit and single-bit feedback simultaneously in accordance with eight subsubcodebooks. Alternatively, to reduce overhead associated with the eight subsubcodebooks, the base station may indicate one or more codebook configurations for the UE. The codebook configurations (e.g., restrictions) may reduce a quantity of subsubcodebooks, subcodebooks, or both that are supported by the UE at a time.

In some examples, the codebook configuration may disable simultaneous single-bit and multi-bit feedback on a per-UE basis, on a per-subcodebook basis, for a UE configured to support multi-TRP communications, or for low priority communications. In such cases, the UE may support one of the single-bit feedback or the multi-bit feedback. For example, if the UE supports multi-TRP communications, the codebook configuration may disable multi-bit feedback for the UE. Such cases may result in the UE supporting, for example, less than a maximum number subsubcodebooks (e.g., eight subsubcodebooks) based on the codebook configuration, thereby reducing a number of subsubcodebooks supported by the UE (e.g., as compared to a total number of possible subsubcodebooks) and reducing complexity. Additionally, or alternatively, the codebook configuration may disable multi-bit feedback for UEs that support CBG-based feedback and TB-based feedback. If CBG-based feedback is disabled at the UE, the codebook configuration may enable single-bit feedback and multi-bit feedback for the UE, such that the UE may use, for example, two subcodebooks corresponding to the TB-based feedback and four subsubcodebooks corresponding to single-bit or multi-bit feedback. A UE that supports both single-bit feedback and multi-bit feedback may thereby be configured to maintain fewer subsubcodebooks than if codebook restrictions are not configured for the UE, which may reduce overhead.

In some aspects, the UE may be configured to support a first time gap between reception of a downlink data message and a single-bit feedback transmission and a second time gap between reception of a downlink data message and a multi-bit feedback transmission. The second time gap may be longer than the first time gap, for example, to enable the UE to prepare the multi-bit feedback. In some examples, the UE may be configured to refrain from transmitting feedback for a downlink message if the UE receives the downlink message within one or both of the first time gap or the second time gap. Alternatively, the UE may be configured to transmit single-bit feedback if the second time gap is not satisfied. That is, the UE may automatically modify the multi-bit feedback into single-bit feedback in cases where the second time gap is not satisfied, and the UE may transmit the single-bit feedback for a downlink messages associated with multi-bit feedback.

Aspects of the disclosure are initially described in the context of wireless communications systems. Additional aspects of the disclosure are described with reference to a feedback timeline, codebook configurations, and a process flow. Aspects of the disclosure are further illustrated by and described with reference to apparatus diagrams, system diagrams, and flowcharts that relate to techniques for multiplexing multi-bit and single-bit feedback.

FIG. 1 illustrates an example of a wireless communications system 100 that supports techniques for multiplexing multi-bit and single-bit feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

A physical uplink control channel (PUCCH) may be mapped to a control channel defined by a code and consecutive resource blocks (RBs). Uplink control signaling may depend on the presence of timing synchronization for a cell. PUCCH resources for scheduling request (SR) and channel quality indicator (CQI) reporting may be assigned (and revoked) through radio resource control (RRC) signaling.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may multiplex single-bit feedback information and multi-bit feedback information in a single uplink feedback message (e.g., over PUCCH, over PUSCH). The UE 115 may receive one or more downlink messages from a base station 105 and generate a codebook for reporting feedback pertaining to each of the downlink messages. In some cases, a codebook generated by the UE 115 may not support inclusion of both single-bit feedback information and multi-bit feedback information in a same feedback message. To improve codebook generation techniques, a UE 115 as described herein may simultaneously support both single-bit feedback and multi-bit feedback. The UE 115 may receive signaling from a base station 105 that indicates one or more codebook configurations that support inclusion of both the single-bit feedback information and the multi-bit feedback information in a same feedback message. The UE 115 may receive, from the base station 105, a first downlink message associated with single-bit feedback and a second downlink message associated with multi-bit feedback. The first downlink message and the second downlink message may share a common uplink transmission opportunity for transmitting feedback pertaining to the downlink messages (e.g., transmitted together via a physical uplink control channel PUCCH) or via a physical uplink shared channel (PUSCH)). The UE 115 may generate a codebook that supports inclusion of both the single-bit feedback information and the multi-bit feedback information for the first and second downlink messages. In some examples, the codebook may be generated in accordance with a codebook configuration for the UE 115. The UE 115 may transmit the feedback message to the base station 105 during the common uplink transmission opportunity based on the codebook.

Figure 2:
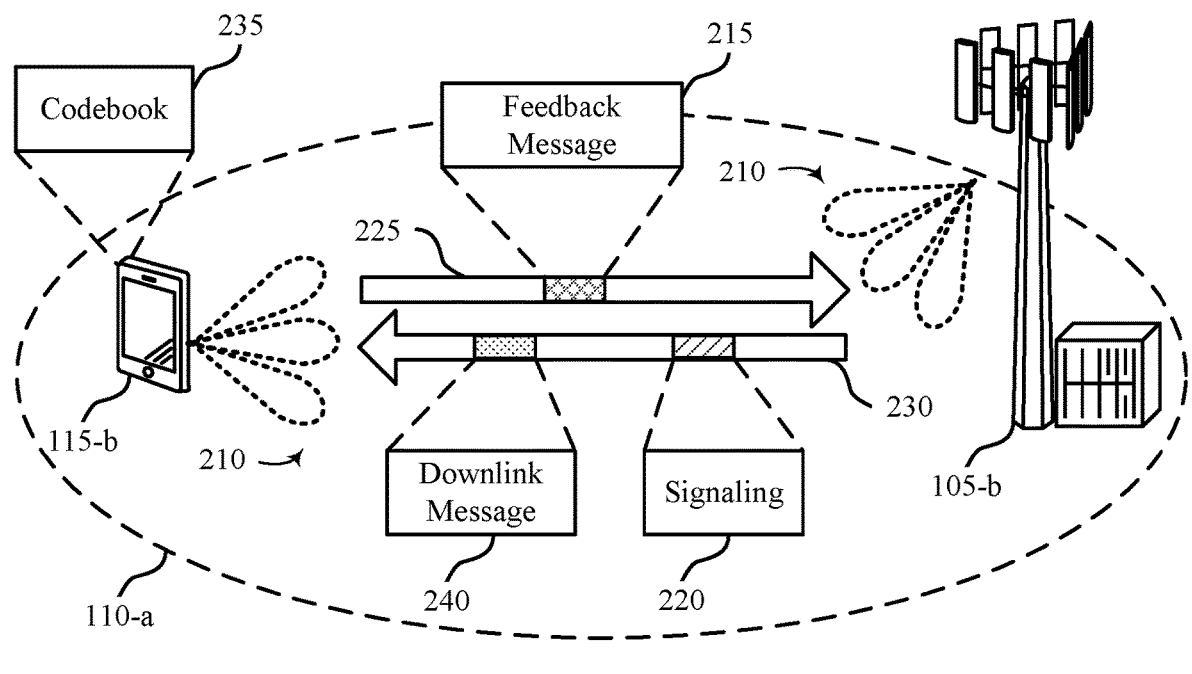

FIG. 2 illustrates an example of a wireless communications system 200 that supports techniques for multiplexing multi-bit and single-bit feedback in accordance with aspects of the present disclosure. The wireless communications system 200 may implement aspects of the wireless communications system 100. The wireless communications system 200 may include a base station 105-b having a corresponding coverage area 110-a and a UE 115-b, which may be examples of the corresponding devices described herein. In some aspects, the base station 105-b and the UE 115-b may wirelessly communicate with each other via an uplink communication link 225 and a downlink communication link 230. The base station 105-b and the UE 115-b may communicate using non-beamform communications and/or beamformed communications (e.g., using beams 210).

The UE 115-b may receive a downlink message 240 from the base station 105-b. The UE 115-b may transmit a feedback message 215 in response to the downlink message 240. The feedback message 215 may include a single bit of feedback per TB or per CBG in the downlink message 240. Alternatively, the feedback message 215 may include multiple bits per TB or CBG. For example, multi-bit feedback information may indicate a one-bit ACK/NACK in addition to one or more bits to indicate additional information, for example, related to CSI. Such multi-bit feedback (e.g., including ACK/NACK and additional information) may be referred to a turbo-HARQ or some other terminology (such as multi-bit feedback). In some cases, feedback for multiple downlink messages 240 may be transmitted via the same uplink resource, and the UE 115-b may generate a codebook 235 corresponding to the multiple downlink messages 240. The UE 115-b may use the codebook 235 to multiplex the feedback into a single uplink message. The UE 115-b may simultaneously support two codebooks 235 that each correspond to one of a first or a second TRP, or to high priority traffic (e.g., URLLC) or low priority traffic (e.g., eMBB). However, current techniques do not support codebook structures for multiplexing multi-bit feedback with single-bit feedback.

For example, this may include the UE 115-b supporting one (e.g., a single) HARQ-ACK codebook 235. The codebook 235 may be a type 1 codebook or type 2 codebook. Broadly, CBG-based physical downlink shared channel (PDSCH) and TB-based PDSCH may, at least in some aspects, use different HARQ-ACK subcodebooks. That is, the codebook 235 may include two subcodebooks, with one subcodebook being for TB-based PDSCH and the other subcodebook being for CBG-based PDSCH. For a type 2 codebook 235, the UE 115-b supporting simultaneous CBG and TB-based PDSCH may use two downlink assignment indicator (DAI) pairs (e.g., a counter-DAI_CBG/total_DAI_CBG pair and a counter_DAI_TB/total_DAI_TB pair). In some aspects, a single TB PDSCH and a two TB PDSCH (where the TB may also be referred to as a codeword (CW) in some examples) may use the same HARQ-ACK subcodebook and the same DAI pair (e.g., for a type 2 codebook). For the type 2 codebook 235, if an active component carrier (CC) is configured to support two TBs, then the PDSCH on all active CCs may assume two-bit ACK/NACK feedback when constructing the HARQ-ACK subcodebook. In some examples, for the type 2 codebook 235, the one TB and two TB PDSCH may use different subcodebooks and different DAI pairs. This may result in four subcodebooks (e.g., 2×2=4) and four independent DAIS pairs being used (e.g., to avoid complexity).

For the UE 115-b to support certain traffic types (e.g., URLLC and eMBB services), two HARQ-ACK codebooks 235 may be used. One codebook 235 may be associated with high priority (HP) traffic while the other codebook 235 may be associated with low priority (LP) traffic. For the UE 115-b to support multi-TRP-based traffic, again two codebooks 235 may be used. One codebook 235 for HARQ-ACK feedback for a first TRP (TRP1) and another codebook 235 for HARQ-ACK feedback for a second TRP (TRP2). In some examples, supporting certain traffic types (e.g., URLLC and eMBB) in addition to multiple TRPs may result in the UE 115-b using four codebooks 235 in its feedback. However, this may impose an increased processing or complexity burden on the UE 115-b and/or the base station 105-b, which may be undesirable. Accordingly, the UE 115-b may simultaneously support up to two codebooks 235 (comprising four subcodebooks, with each subcodebook comprising two subsubcodebooks), where four independent DAI pairs are used for a type 2 codebook. Again, current techniques do not support codebook structures for multiplexing multi-bit feedback with single-bit feedback by the UE 115-*b*.

For example, for each TB of a PDSCH (e.g., each TB of a downlink message 240), the UE 115-*b* may transmit multiple bits of feedback information in the feedback message 215 to provide additional information in addition to the one-bit ACK/NACK for the PDSCH. Examples of the additional information include, but are not limited to, the delta modulation and coding scheme (MCS) for a TB received with an MCS index (I_MCS). In some aspects, the delta MCS may be calculated from the difference between a target MCS (I_MCS_tgt) and the MCS used for the downlink transmission (I_MCS). Broadly, the target MCS (I_MCS_tgt) may correspond to the largest MCS index such that the estimated block error rate (BLER) for a TB received with an MCS index (I_MCS) would be smaller than or equal to a BLER target. Again, I_MCS may correspond to the MCS index of the received TB.

One example of how to extend the 1-bit feedback using two bits may include, but are not limited to, an ACK with the delta MCS+X (with respect to the MCS of the current PDSCH TB), where the X corresponds to an integer number indicating the change in the current MCS index to a target MCS index being X (e.g., from MCS index 4 to MCS index 6, where X would be two in this example). This may convey an indication that, although the UE 115-*b* was able to successfully receive and decode the TB, the channel conditions are such that subsequent downlink messages 240 would benefit from using a different MCS index. Another example may include an ACK with a delta MCS+0 (again with respect to the MCS of the current PDSCH TB). This may indicate that the channel conditions are such that no change to the current PDSCH TB MCS is needed. Another example may include a NACK with delta MCS−0. This may indicate that, although the UE 115-*b* was not able to successfully receive and decode the TB, the channel conditions are such that no change to the current PDSCH TB MCS index is needed (e.g., in the situation where something other than the channel conditions caused the UE 115-*b* to be unable to successfully receive and decode the downlink message 240). Yet another example may include a NACK with delta MCS−Y (also with respect to the current PDSCH TB). This may indicate that the UE 115-*b* was unable to successfully receive and decode the downlink message 240, and therefore the channel conditions are such that a lower MCS index value (e.g., corresponding to Y) may be needed for subsequent downlink messages 240.

Accordingly, the wireless communications system 200 may support CSI feedback and feedback enhancements. This may include an increase in the number of bits used in the feedback for reported subband CQI (e.g., such as a 3-bit differential subband CQI or 4-bit CQI). This may support and/or leverage turbo HARQ where the delta MCS is derived or otherwise determined based on PDSCH decoding. However, multiplexing single-bit (1-bit) and multi-bit HARQ-ACK feedback is not supported in some wireless communication systems.

Accordingly, aspects of the described techniques may support multiplexing single-bit (e.g., 1-bit) feedback with multi-bit feedback in a same feedback message 215. This may result in a scenario where two codebooks 235 are supported by the UE 115-*b* (e.g., a HP HARQ-ACK codebook and a LP HARQ-ACK codebook, or a TRP1 codebook and a TRP2 codebook). Each codebook 235 may include two subcodebooks, such as a subcodebook for TB-based PDSCH and another subcodebook for CBG-based PDSCH (e.g., a set of subcodebooks for HP vs LP HARQ-ACK, a set of subcodebooks for TRP1 HARQ-ACK vs TRP2 HARQ-ACK). Each subcodebook may include two subsubcodebooks, such as a subsubcodebook for single-bit feedback and a subsubcodebook for multi-bit feedback. For a two-codebook configuration, this would include two codebooks 235, with each codebook being formed by concatenating two subcodebooks (e.g., per TB/CBG). Each subcodebook may be formed by concatenating two subsubcodebooks (e.g., single-bit vs multi-bit feedback). In such examples, to support simultaneous single-bit feedback and multi-bit feedback, the UE 115-*b* may support up to eight subsubcodebooks that may, in some cases, be associated with relatively high overhead and UE complexity. Such a codebook configuration may be described in further detail elsewhere herein, including with reference to FIG. 4.

To reduce complexity, the UE 115-*b* may, in some aspects, be configured with one or more codebook configurations that include fewer subsubcodebooks (e.g., seven or fewer subsubcodebooks). In some examples, the UE 115-*b* may receive the signaling 220 from the base station 105-*b*, and the signaling 220 may indicate a codebook configuration for the UE 115-*b*. Additionally, or alternatively, the codebook configuration may be configured at the UE 115-*b* (e.g., a pre-configured, predetermined, configured by default). The UE 115-*b* may, in some examples, transmit a UE capability message to the base station 105-*b* via the uplink communication link 225. The UE capability message may indicate a capability of the UE 115-*b* to support multiple subsubcodebooks of a same codebook 235, or the UE capability message may indicate support for a certain configuration of subcodebooks or subsubcodebooks within a codebook 235. In such cases, the codebook configuration and the feedback message 215 may be based on the capability of the UE 115-*b*. In any case, the codebook configurations may support inclusion of single-bit feedback and multi-bit feedback in a same feedback message. Examples of such codebook configurations are described in further detail elsewhere herein, including with reference to FIGS. 5A, 5B, 6, 7A, 7B, and 8.

In some examples, the signaling 220 may indicate one or more feedback timings for the UE 115-*b* to use for generating the feedback message 215. For example, the signaling 220 may indicate a first feedback timing for the UE 115-*b* to generate single-bit feedback and a second feedback timing for the UE 115-*b* to generate multi-bit feedback. The first and second timings are described in further detail with reference to FIG. 3.

Figure 3:
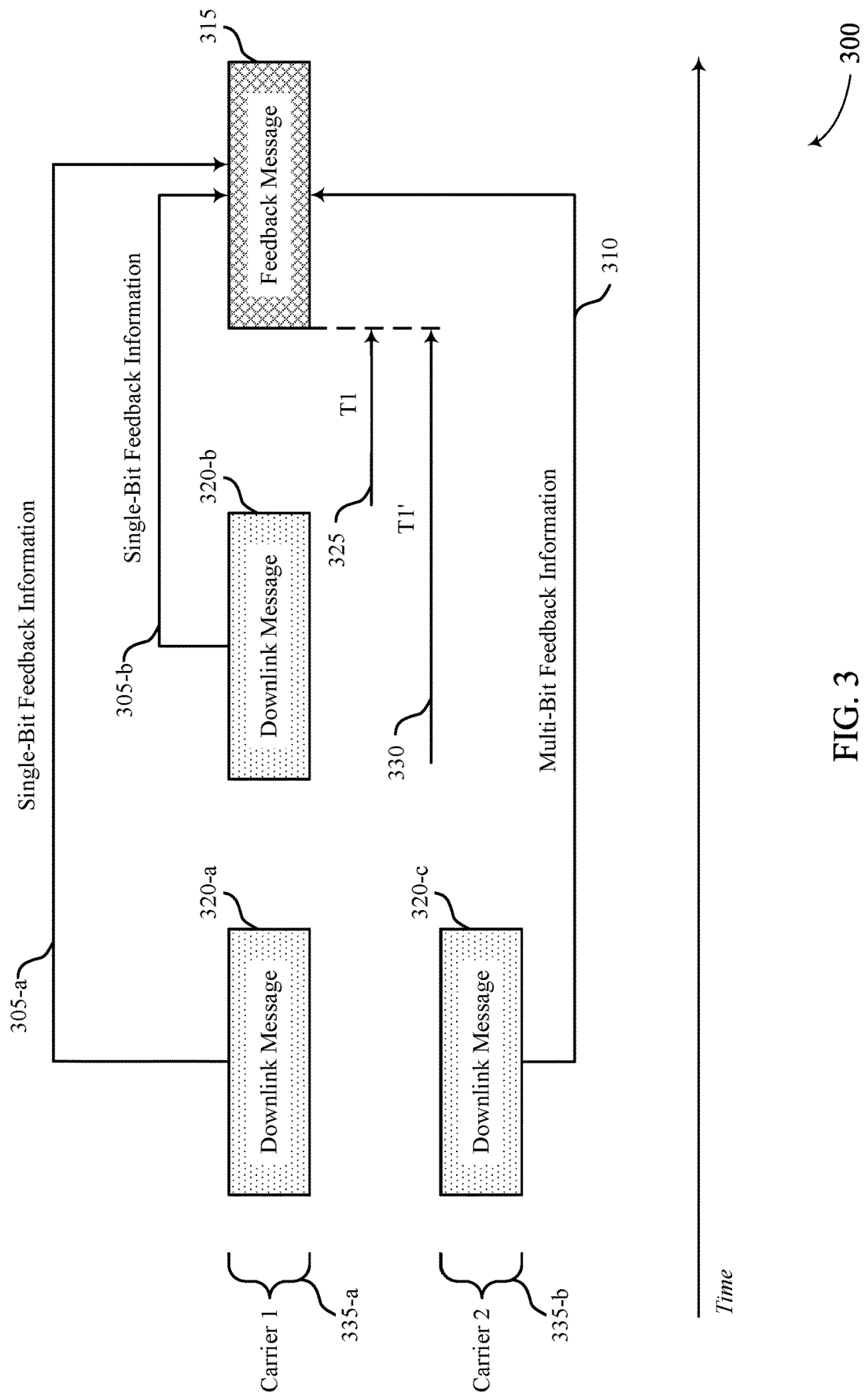
FIG. 3 illustrates an example of a feedback timeline that supports techniques for multiplexing multi-bit and single-bit feedback in accordance with aspects of the present disclosure.

FIG. 3 illustrates an example of a feedback timeline 300 that supports techniques for multiplexing multi-bit and single-bit feedback in accordance with aspects of the present disclosure. The feedback timeline 300 may implement aspects of the wireless communications systems 100 and 200 or may be implemented by aspects of the wireless communications systems 100 and 200 as described with reference to FIGS. 1 and 2, respectively. For example, the feedback timeline 300 may illustrate example timing for communications between a base station 105 and a UE 115, which may be examples of the corresponding devices described herein.

In some cases, the UE 115 may support single-bit feedback. For example, the UE 115 may transmit a single bit of feedback per TB or per CBG in a downlink message 320, as described with reference to FIG. 2. The UE 115 may be configured with a first time gap 325 (e.g., T1) for preparing the single-bit feedback information 305. The UE 115 may, in some examples, receive signaling indicating a duration of the first time gap 325. The first time gap 325 may correspond to a time period (e.g., a minimum time period or a threshold time period) or time interval between a last symbol of a downlink message 320 received by the UE 115 and a starting symbol of a feedback occasion for the feedback message 315 (e.g., a first symbol of a PUSCH or a PUCCH that carries the ACK or NACK). For example, the first time gap 325 may provide time for the UE 115 to prepare the single-bit feedback information 305-b after receiving the downlink message 320-c and prior to transmitting the feedback message 315. In some examples, preparing feedback information may include generating a codebook including the single-bit feedback information 305-a, the single-bit feedback information 305-b, or both. In some examples, the UE 115 may expect that the first time gap 325 is satisfied (e.g., the feedback message 315 is scheduled such that the first time gap 325 is satisfied) when feedback for one or more downlink messages. Thus, if the first time gap 325 is satisfied, the UE 115 may transmit the feedback message 315 via an uplink channel (e.g., a PUSCH or a PUCCH) based on the codebook. In some examples, the feedback message 315 may include the codebook.

In the example of FIG. 3, the UE 115 may support both single-bit feedback and multi-bit feedback. The UE 115 may be configured to transmit single-bit feedback information 305 for the downlink messages 320-a and 320-b and multi-bit feedback information 310 for the downlink message 320-c. A configuration for single-bit feedback and multi-bit feedback may be provided on a per-component carrier basis, a per-UE basis, a per-codebook basis, or some other basis for configuring the different types of feedback. In the example of FIG. 3, the UE 115 may support carrier aggregation, and the feedback type may be configured on a per-carrier 335 basis. For example, the UE 115 may support the carrier 335-a (e.g., Carrier 1) and the carrier 335-b (e.g., Carrier 2). The base station 105 may configure the carrier 335-a with single-bit feedback (e.g., one-bit HARQ-ACK per TB) and the carrier 335-b with multi-bit feedback (e.g., multiple bits HARQ-ACK per TB). Different types of feedback configurations are described in further detail elsewhere herein, including with reference to FIGS. 4, 5A, 5B, 6, 7A, 7B, and 8.

The UE 115 may receive one or more downlink messages 320 (e.g., downlink message 320-a, downlink message 320-b, downlink message 320-c) from the base station 105 via each carrier 335. The downlink messages 320 may include one or more TBs, one or more CBGs per TB, or both and may be transmitted via a PDSCH. In the example of FIG. 3, the downlink messages 320-a, 320-b, and 320-c may each represent a single-TB PDSCH. The UE 115 may receive, from the base station 105, one or more downlink control messages, such as downlink control information (DCI), that schedules the downlink messages 320. The downlink control messages may additionally, or alternatively, schedule a feedback occasion for the UE 115 to transmit feedback in response to the downlink messages 320. In some examples, the downlink control messages may indicate one or more resources on a PUCCH or a PUSCH for the UE 115 to use for transmitting the feedback message 315.

One or more feedback resources allocated for feedback in response to the downlink messages 320-a and 320-b may be the same as one or more feedback resources allocated for feedback in response to the downlink message 320-c. As such, the UE 115 may multiplex feedback for each of the downlink messages 320 into the feedback message 315. The UE 115 may transmit the codebook via the feedback message 315. In some cases, however, some techniques may prevent the UE 115 from multiplexing a codebook generated in accordance with a single-bit feedback configuration, such as a codebook generated for the downlink messages 320-a and 320-b, with a codebook generated in accordance with a multi-bit feedback configuration, such as a codebook generated for the downlink message 320-c.

As described herein, the UE 115 may be configured with a codebook configuration that supports multiplexing single-bit feedback information 305 with multi-bit feedback information 310 into a same feedback message 315 (e.g., transmitted via PUCCH or PUSCH). The UE 115 may thereby identify the shared feedback resources associated with each of the downlink messages 320-a, 320-b, and 320-c, and the UE 115 may generate the codebook (e.g., an extended HARQ-ACK codebook) based on the downlink messages 320-a, 320-b, and 320-c. The UE 115 may generate subcodebooks or subsubcodebooks corresponding to each downlink message 320 and generate the codebook to include each of the subcodebooks and/or subsubcodebooks. The UE 115 may transmit the feedback message 315 to include the single-bit feedback information 305-a, the single-bit feedback information 305-b, and the multi-bit feedback information 310 based on the codebook. In some examples, the UE 115 may transmit the codebook via the feedback message 315.

The UE 115 may be configured with a second time gap 330 (e.g., T1') for preparing the multi-bit feedback information 310. The UE 115 may, in some examples, receive signaling (e.g., RRC signaling, a MAC-CE, DCI, a physical downlink control channel (PDCCH), or some other signaling) that indicates a duration of the second time gap 330. The second time gap 330 may be longer than the first time gap 325 to provide for the UE 115 to generate the multi-bit feedback information 310 (e.g., time for the UE 115 to calculate a target MCS, a delta MCS, or both). The second time gap 330 may correspond to a time period (e.g., a minimum time period or a threshold time period) between a last symbol of reception of a downlink message 320 that is configured for multi-bit feedback and a starting symbol of a feedback occasion for the feedback message 315. For example, the second time gap 330 may provide time for the UE 115 to prepare the multi-bit feedback information 310 after receiving the downlink message 320-c and prior to transmitting the feedback message 315.

The UE 115 may be configured with one or more rules for performing feedback if the first time gap 325, the second time gap 330, or both are not satisfied. In one example, the UE 115 may expect that the first time gap 325 and the second time gap 330 are satisfied (e.g., the downlink message 320-a, the downlink message 320-b, and the downlink messages 320-c are received, and the feedback message 315 is scheduled, such that both the T1 and T1' time gaps are satisfied). In other cases, the UE 115 may refrain from transmitting the feedback message 315 during the scheduled feedback occasion including both the single-bit and the multi-bit feedback (e.g., the UE 115 may treat the multiplexing as an error case). That is, the UE 115 may transmit the feedback message 315 if both T1 and T1' are satisfied for each downlink message 320 that is involved in the feedback multiplexing, and the UE 115 may be configured to modify (e.g., automatically reduce) the multi-bit feedback information 310 to single-bit feedback information 305 if the second time gap 330 is not satisfied. For example, if the feedback message 315 is scheduled such that the second time gap 330 is not satisfied (e.g., but the first time gap 325 is satisfied), the UE 115 may transmit single-bit feedback information 305 in response to the downlink message 320-c instead of the multi-bit feedback information 310. The UE 115 may transmit the single-bit feedback information 305 due to the reduced time for the UE 115 to process the downlink message 320-c and prepare feedback. The UE 115 may, in some examples, generate the single-bit feedback information 305 by dropping one or more bits from the multi-bit feedback information 310. The UE 115 may multiplex the single-bit feedback information 305 for the downlink message 320-c with the single-bit feedback information 305-a and the single-bit feedback information 305-b to form the feedback message 315. If both the first time gap 325 and the second time gap 330 are not satisfied, the UE 115 may refrain from transmitting the feedback message 315 during the scheduled feedback occasion (e.g., the UE 115 may treat the multiplexing as an error case).

The base station 105 may schedule the downlink messages 320 in accordance with the time gaps 325 and 330. That is, the base station 105 may schedule the downlink messages 320 to satisfy the time gaps 325 and 330, such that the UE 115 may perform accurate and efficient multiplexing of single-bit and multi-bit feedback.

The UE 115 as described herein may thereby be configured with a first time gap 325, a second time gap 330, and a codebook configuration that support multiplexing the single-bit feedback information 305 with the multi-bit feedback information 310. The UE 115 may multiplex the single-bit feedback information 305 with the multi-bit feedback information 310 into a single feedback message 315 in accordance with the time gaps being satisfied and the codebook configuration, which may reduce latency, reduce overhead, and improve reliability of the wireless communications.

Figure 4:
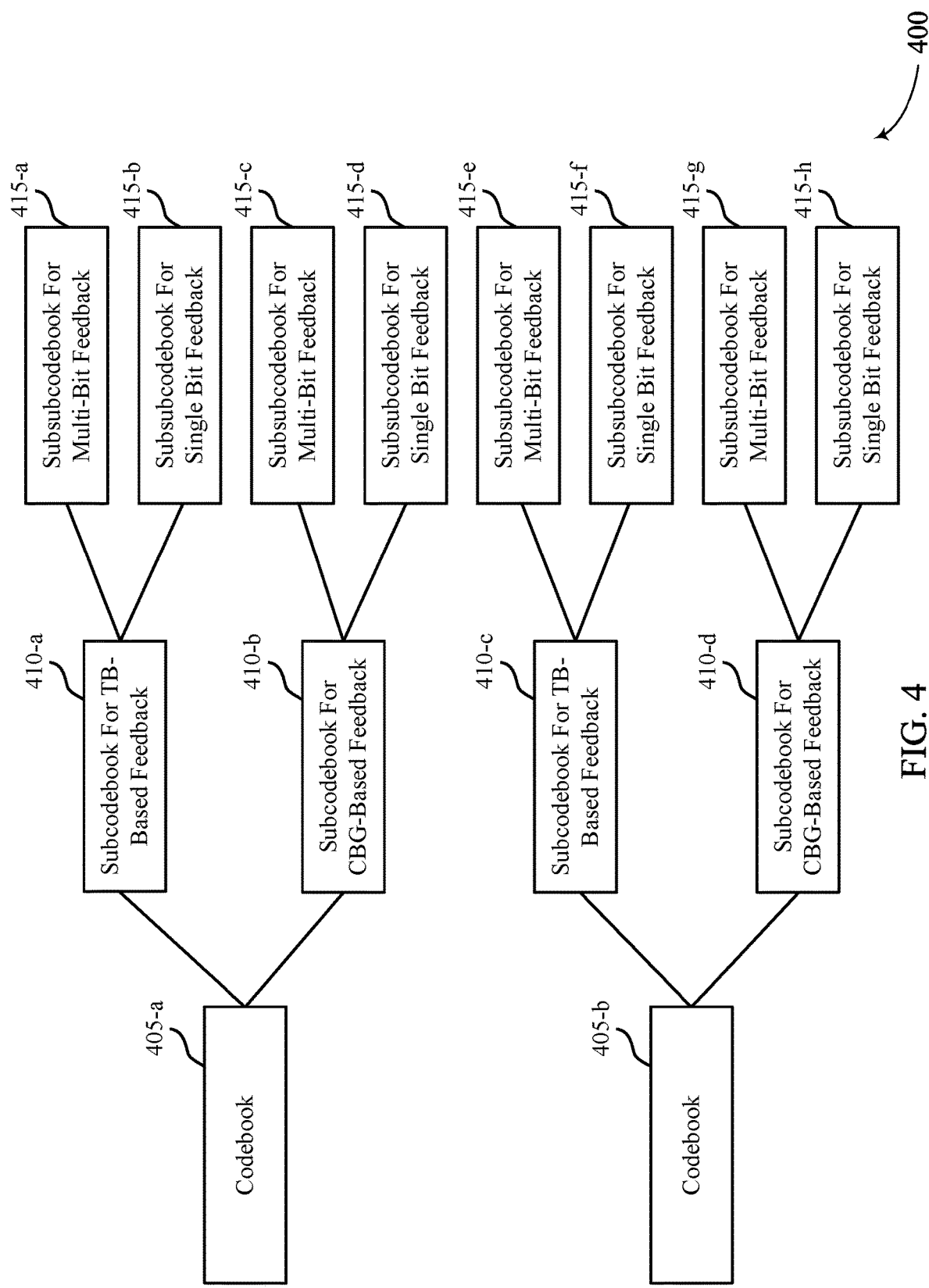
FIGS. 4, 5A, 5B, 6, 7A, 7B, 8, and 9 illustrate examples of codebook configurations that support techniques for multiplexing multi-bit and single-bit feedback in accordance with aspects of the present disclosure.

FIG. 4 illustrates an example of a codebook configuration 400 that supports techniques for multiplexing multi-bit and single-bit feedback in accordance with aspects of the present disclosure. The codebook configuration 400 may illustrate an example configuration of codebooks 405, subcodebooks 410, and subsubcodebooks 415 associated with single-bit and multi-bit feedback generated by a UE 115 for transmission to a base station 105. The UE 115 and the base station 105 may be examples of the corresponding devices described herein.

The UE 115 may generate two codebooks 405-a and 405-b to support multi-TRP communications or high priority and low priority communications. For example, the codebook 405-a may include feedback information for high priority communications, such as URLLC, and the codebook 405-b may include feedback information for low priority communications, such as eMBB. Alternatively, the codebook 405-a may include feedback information for downlink messages received from a first TRP and the codebook 405-b may include feedback information for downlink messages received from a second TRP. The UE 115 may refrain from supporting multi-TRP communications in addition to high and low priority communications simultaneously. As such, the UE 115 may support no more than two codebooks 405 at a time, which may reduce feedback processing and UE complexity.

The UE 115 may support feedback for TB-based PDSCH transmissions and CBG-based PDSCH transmissions. As such, each codebook 405 may include respective first and second subcodebooks 410 for the TB-based feedback and CBG-based feedback. The UE 115 may generate a first subcodebook 410 in each codebook 405, such as the subcodebooks 410-a and 410-c, to include feedback information for TB-based communications. The UE 115 may generate a respective second subcodebook 410 in each codebook 405, such as the subcodebooks 410-b and 410-d, to include feedback information for CBG-based communications. The UE 115 may thereby support up to four subcodebooks 410 at a time.

The UE 115 may support multi-bit feedback and single-bit feedback. As such, each subcodebook 410 may include respective first and second subsubcodebooks 415 for the multi-bit feedback and the single-bit feedback. The UE 115 may generate a first subsubcodebook 415 in each subcodebook 410 to include multi-bit feedback information. For example, the subsubcodebooks 415-a, 415-c, 415-e, and 415-g may correspond to multi-bit feedback. The UE 115 may generate a second subsubcodebook 415 in each subcodebook 410 to include single-bit feedback information. For example, the subsubcodebooks 415-b, 415-d, 415-f, and 415-h may correspond to single-bit feedback.

The subsubcodebooks 415-a and 415-e may thereby correspond to multi-bit feedback per TB. The subsubcodebooks 415-c and 415-g may correspond to multi-bit feedback per CBG, which may include multiple bits of feedback information per CBG or multiple bits of feedback information for each CBG in a TB. For example, the UE 115 may generate the feedback based on averaging all of the CBGs in the TB, based on a decoding performance of a CBG (e.g., a worst decoding performance), or both. The subsubcodebooks 415-b and 415-f may correspond to single-bit feedback per TB, and the subsubcodebooks 415-d and 415-h may correspond to single-bit feedback per CBG.

The UE 115 may thereby support up to eight subsubcodebooks 415 at a time. In some examples, if the UE 115 supports eight subsubcodebooks 415, the UE 115 may receive signaling from a base station 105 that indicates whether the UE 115 is to generate single-bit feedback or multi-bit feedback in response to a TB received by the UE. The indication may be transmitted via RRC signaling, a MAC-CE, a PDCCH (e.g., DCI), or some other signaling.

The generation of eight subsubcodebooks 415, in some cases, may correspond to relatively high overhead and UE complexity (e.g., based on a UE capability or other factors). As such, in some examples, the UE 115 may be configured with one or more codebook configurations (e.g., codebook restrictions) that may provide for the UE 115 to generate fewer than eight subsubcodebooks 415 within a codebook 405. Examples of such codebook configurations are described in further detail elsewhere herein, including with reference to FIGS. 5A, 5B, 6, 7A, 7B, and 8.

Figure 5A:
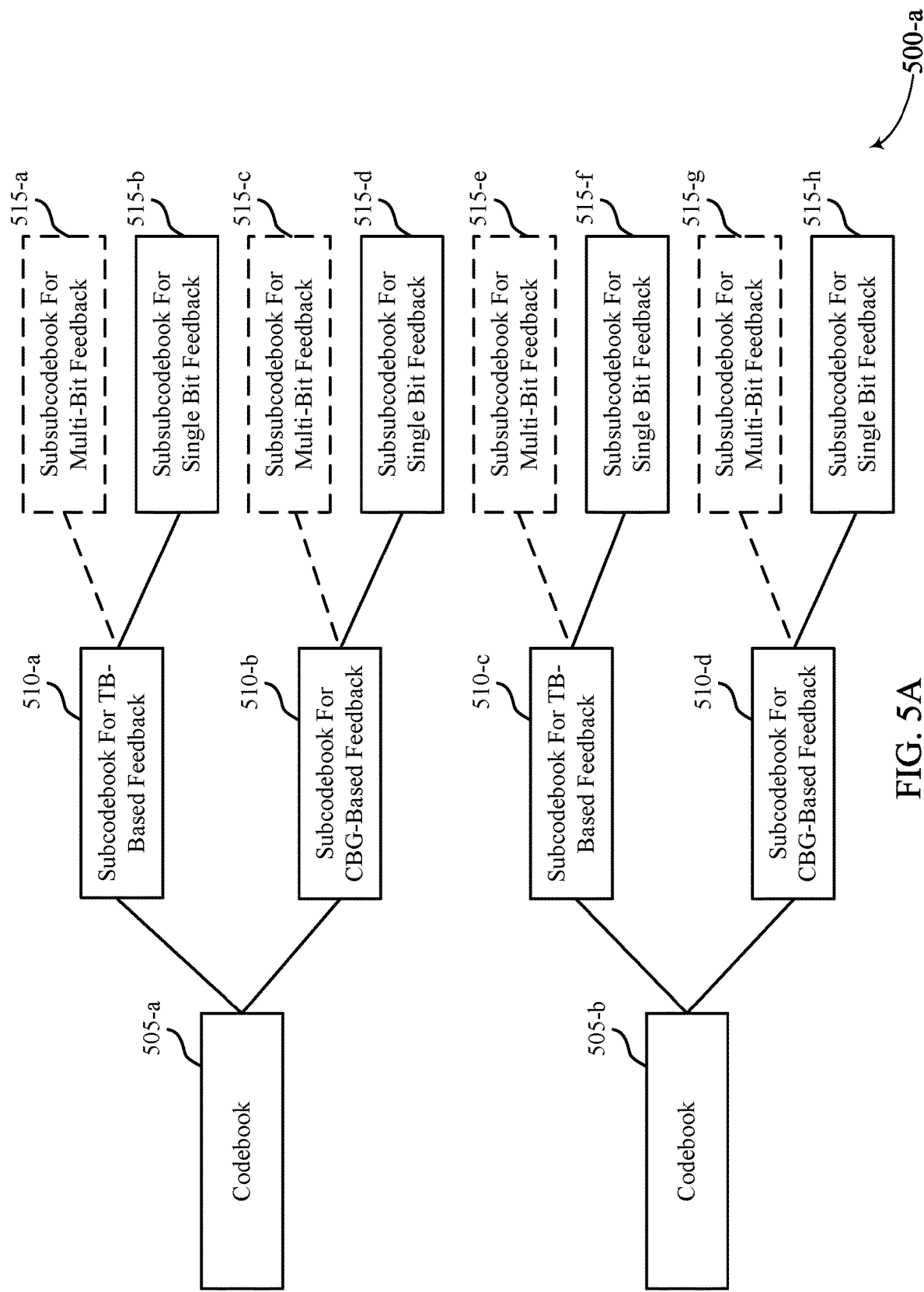
Figure 5B:
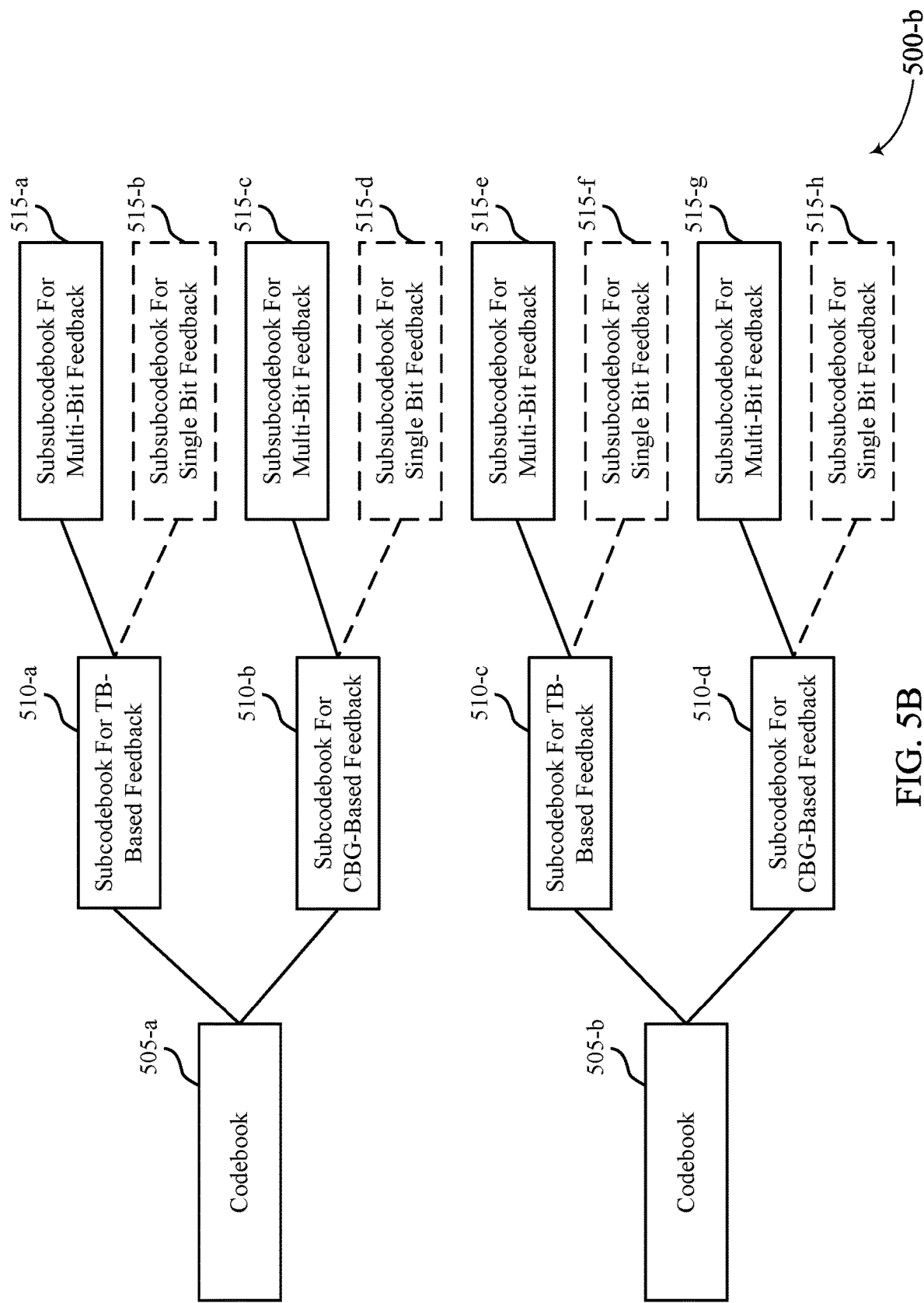

FIGS. 5A and 5B illustrate examples of codebook configurations 500 that support techniques for multiplexing multi-bit and single-bit feedback in accordance with aspects of the present disclosure. The codebook configurations 500-a and 500-b illustrate example configurations of codebooks 505, subcodebooks 510, and subsubcodebooks 515 associated with single-bit and multi-bit feedback transmitted by a UE 115 to a base station 105. The UE 115 and the base station 105 may be examples of the corresponding devices described herein. In some examples, the UE 115 may receive a codebook configuration that indicates one or more restrictions associated with the codebook 505-a and the codebook 505-b.

The codebook configurations 500-a and 500-b may represent examples of the codebook configuration 400 described with reference to FIG. 4. For example, the UE 115 may generate the codebook 505-a to correspond to either high priority communications (e.g., URLLC communications) or a first TRP of the network and the codebook 505-b to correspond to either low priority communications (e.g., eMBB communications) or a second TRP of the network, as described with reference to FIG. 4. Each codebook 505 may include two respective subcodebooks 510. The UE 115 may generate the subcodebooks 510-a and 510-c for the codebooks 505-a and 505-b, respectively, to correspond to TB-based feedback. The UE 115 may generate the subcodebooks 510-b and 510-d for the codebooks 505-a and 505-b, respectively, to correspond to CBG-based feedback, as described with reference to FIG. 4.

FIG. 5A illustrates an example of a first codebook configuration 500-a. The UE 115 may receive signaling indicating the codebook configuration 500-a. The codebook configuration 500-a may indicate that multi-bit feedback is disabled for the UE 115. That is, the codebook configuration 500-a may indicate that each subcodebook 510 is to follow a same configuration, such that each subcodebook 510 may include the single-bit feedback information, but not the multi-bit feedback information. The UE 115 may generate the codebook 505-a and the codebook 505-b in accordance with the codebook configuration 500-a. In some examples, the signaling may be transmitted on a per-UE basis. That is, each UE 115 may receive signaling that indicates whether multi-bit feedback is enabled or disabled.

The UE 115 may be configured to generate a single subsubcodebook 515 corresponding to single-bit feedback for each subcodebook 510 in accordance with the codebook configuration 500-a. The UE 115 may generate the subsubcodebooks 515-b, 515-d, 515-f, and 515-h, and the UE 115 may refrain from generating the subsubcodebooks 515-a, 515-c, 515-e, and 515-g to correspond to multi-bit feedback in accordance with the codebook configuration 500-a.

By disabling the multi-bit feedback on a per-UE basis, the codebook configuration 500-a may provide for the UE 115 to generate and maintain fewer subsubcodebooks 515 than if the UE 115 did not receive the codebook configuration 500-a, which may reduce overhead. The UE 115 may thereby transmit single-bit feedback information in response to each downlink message (e.g., a single bit for each TB or CBG within the downlink message) received by the UE 115. The UE 115 may multiplex the single-bit feedback information for two or more TBs or CBGs into a single feedback message, as described with reference to FIG. 3. If the UE 115 receives a first downlink message associated with single-bit feedback and a second downlink message associated with multi-bit feedback, the UE 115 may be configured to reduce the multi-bit feedback for the second downlink message to single-bit feedback in accordance with the codebook configuration 500-a disabling the multi-bit feedback for the UE 115.

FIG. 5B illustrates an example of a second codebook configuration 500-b. The UE 115 may receive signaling indicating the codebook configuration 500-b. The codebook configuration 500-a may indicate that single-bit feedback is disabled for the UE 115. That is, the codebook configuration 500-b may indicate that each subcodebook 510 is to follow a same configuration, such that each subcodebook 510 may include the multi-bit feedback information, but not the single-bit feedback information. The UE 115 may generate the codebook 505-a and the codebook 505-b in accordance with the codebook configuration 500-b. In some examples, the signaling may be transmitted on a per-UE basis. That is, each UE 115 may receive signaling that indicates whether single-bit feedback is enabled or disabled.

The UE 115 may be configured to generate a single subsubcodebook 515 corresponding to multi-bit feedback information for each subcodebook 510 in accordance with the codebook configuration 500-b. The UE 115 may generate the subsubcodebooks 515-a, 515-c, 515-e, and 515-g corresponding to multi-bit feedback, and the UE 115 may refrain from generating the subsubcodebooks 515-b, 515-d, 515-f, and 515-h to correspond to single-bit feedback in accordance with the codebook configuration 500-b.

By disabling the single-bit feedback on a per-UE basis, the codebook configuration 500-b may provide for the UE 115 to generate and maintain fewer subsubcodebooks 515 than if the UE 115 did not receive the codebook configuration 500-b, which may reduce overhead. The UE 115 may thereby transmit multi-bit feedback information in response to each downlink message (e.g., a single bit for each TB or CBG within the downlink message) received by the UE 115. The UE 115 may multiplex the multi-bit feedback information for two or more TBs or CBGs into a single feedback message, as described with reference to FIG. 3.

Figure 6:
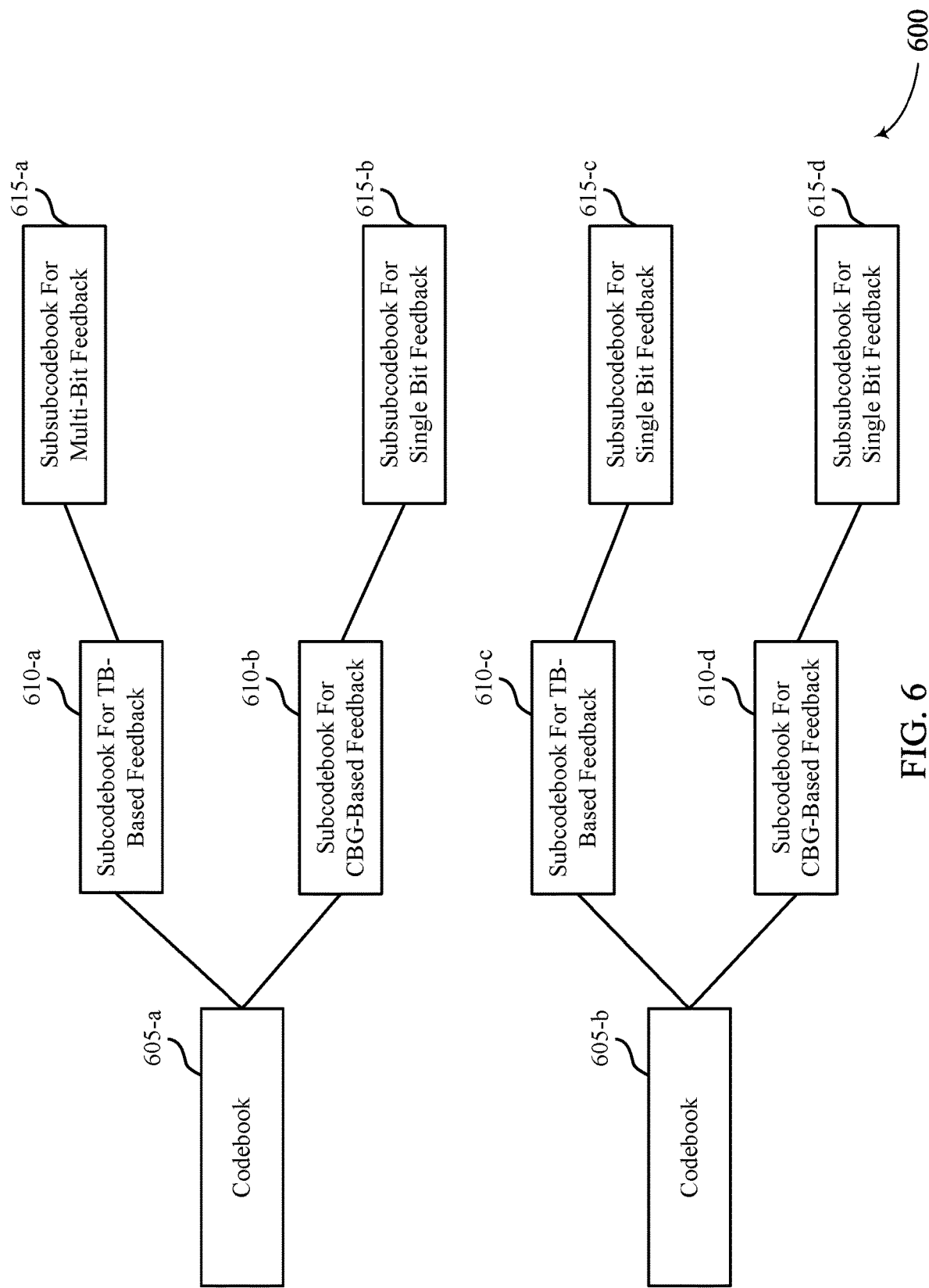

FIG. 6 illustrates an example of a codebook configuration 600 that supports techniques for multiplexing multi-bit and single-bit feedback in accordance with aspects of the present disclosure. The codebook configuration 600 may illustrate an example configuration of codebooks 605, subcodebooks 610, and subsubcodebooks 615 associated with single-bit and multi-bit feedback transmitted by a UE 115 to a base station 105. The UE 115 and the base station 105 may represent examples the corresponding devices as described herein. In some examples, the codebook configuration 600 may indicate one or more restrictions associated with each subcodebook 610.

The codebook configuration 600 may represent an example of the codebook configuration 400 described with reference to FIG. 4. For example, the UE 115 may generate the codebook 605-a to correspond to either high priority communications (e.g., URLLC communications) or a first TRP of the network and the codebook 605-b to correspond to either low priority communications (e.g., eMBB communications) or a second TRP of the network, as described with reference to FIG. 4. Each codebook 605 may include two respective subcodebooks 610. The UE 115 may generate the subcodebooks 610-a and 610-c for the codebooks 605-a and 605-b, respectively, to correspond to TB-based feedback. The UE 115 may generate the subcodebooks 610-b and 610-d for the codebooks 605-a and 605-b, respectively, to correspond to CBG-based feedback, as described with reference to FIG. 4.

The UE 115 may receive signaling that indicates the codebook configuration 600. Additionally, or alternatively, the UE 115 may be configured to support the codebook configuration 600 without signaling (e.g., a pre-configuration or a default configuration for the UE 115). The codebook configuration 600 may indicate, to the UE 115, whether each subcodebook 610 includes single-bit feedback information or multi-bit feedback information. That is, the codebook configuration 600 may enable one of the single-bit feedback or the multi-bit feedback on a per-subcodebook 610 basis. For example, the codebook configuration 600 may enable the multi-bit feedback for the subcodebook 610-a and may disable the multi-bit feedback for the subcodebooks 610-b, 610-c, and 610-d. The codebook configuration 600 may enable the single-bit feedback for the subcodebooks 610-b, 610-c, and 610-c and may disable the single-bit feedback for the subcodebook 610-a.

The UE 115 may generate the codebook 605-a to include the subcodebook 610-a and the subcodebook 610-b, where the subcodebook 610-a further includes the subsubcodebook 615-a for the multi-bit feedback information and the subcodebook 610-b further includes the subsubcodebook 615-b for the single-bit feedback information. The UE 115 may generate the codebook 605-b to include the subcodebook 610-c and the subcodebook 610-d, where the subcodebook 610-c and the subcodebook 610-d further include the subsubcodebooks 615-c and 615-d, respectively, for the single-bit feedback information.

The UE 115 may utilize the codebook 605-a to multiplex the single-bit feedback information corresponding to the subsubcodebook 615-b with the multi-bit feedback information corresponding to the subsubcodebook 615-a into a single feedback message, as described with reference to FIG. 3. As such, the codebook configuration 600 may provide a for a codebook 605 to support inclusion of both multi-bit and single-bit feedback in a feedback message. The UE 115 may utilize the codebook 605-b to multiplex the single-bit feedback information corresponding two to or more downlink messages into a single feedback message. By configuring a feedback type on a per-subcodebook basis, the codebook configuration 600 may provide for the UE 115 to support four or less subsubcodebooks 615, which may reduce overhead and UE complexity.

Figure 7A:
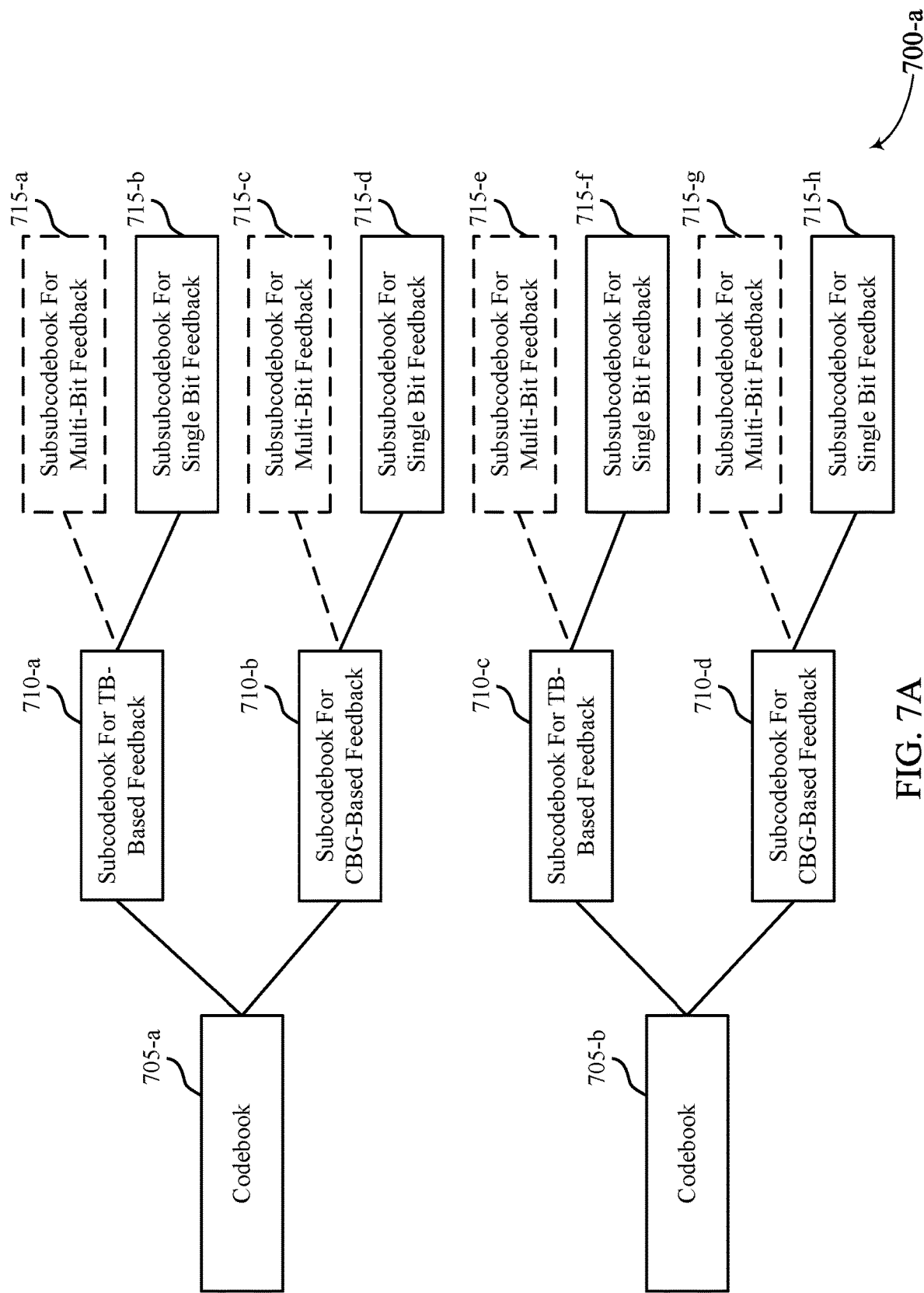
Figure 7B:
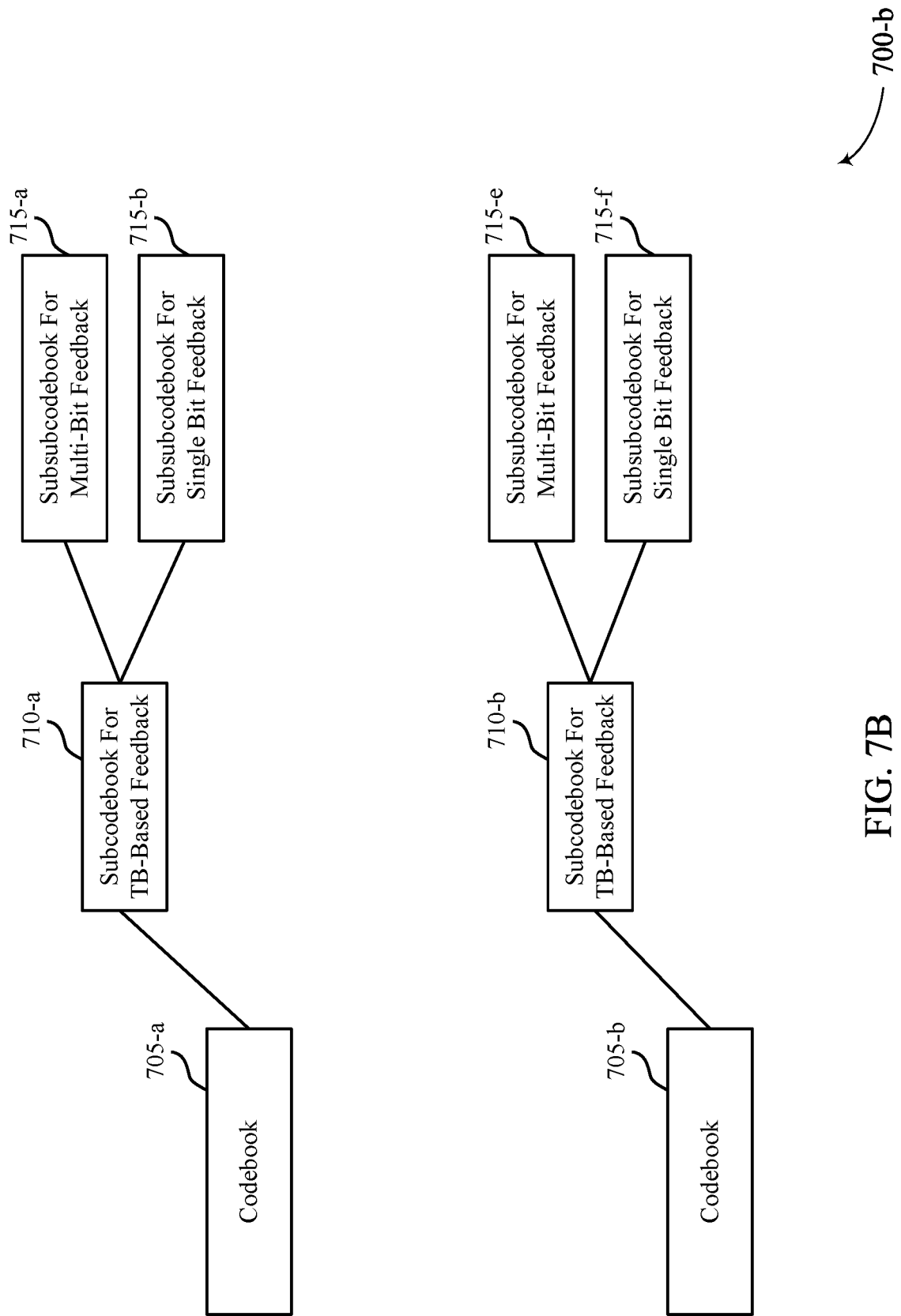

FIGS. 7A and 7B illustrate examples of codebook configurations 700 that support techniques for multiplexing multi-bit and single-bit feedback in accordance with aspects of the present disclosure. The codebook configurations 700-a and 700-b may illustrate example configurations of codebooks 705, subcodebooks 710, and subsubcodebooks 715 associated with single-bit and multi-bit feedback transmitted by a UE 115 to a base station 105. The UE 115 and the base station 105 may represent examples of the corresponding devices as described herein. In some examples, the UE 115 may be configured to support one or both of multi-bit feedback and single-bit feedback based on whether the UE 115 supports TB-based feedback, CBG-based feedback, or both.

The codebook configurations 700-a and 700-b may represent examples of the codebook configuration 400 described with reference to FIG. 4. For example, the UE 115 may generate the codebook 705-a to correspond to either high priority communications (e.g., URLLC communications) or a first TRP of the network and the codebook 705-b to correspond to either low priority communications (e.g., eMBB communications) or a second TRP of the network, as described with reference to FIG. 4. In the example of FIGS. 7A and 7B, the UE 115 may generate the subcodebooks 710 and subsubcodebooks 715 based on whether CBG-based feedback is enabled at the UE 115.

FIG. 7A illustrates a first example codebook configuration 700-a. The codebook configuration 700-a may be configured if the UE 115 supports both CBG-based feedback and TB-based feedback (e.g., TB-based and CBG-based PDSCH is enabled at the UE 115). If both CBG-based feedback and TB-based feedback are enabled, the UE 115 may generate the subcodebooks 710-a and 710-c to correspond to the TB-based feedback and the subcodebooks 710-b and 710-d to correspond to the CBG-based feedback.

To reduce a quantity of subsubcodebooks 715 supported by the UE 115, the codebook configuration 700-a may disable multi-bit feedback by the UE 115 when both TB-based feedback and CBG-based feedback are enabled. The UE 115 may thereby generate the subsubcodebooks 715-b, 715-d, 715-f, and 715-h to include single-bit feedback information for each of the subcodebooks 710-a, 710-b, 710-c, and 710-d, respectively. The UE 115 may refrain from generating the subsubcodebooks 715-a, 715-c, 715-e, and 715-g to include multi-bit feedback information in accordance with the codebook configuration 700-a.

The codebook 705-a and the codebook 705-b may each support inclusion of single-bit feedback in a feedback message in accordance with the codebook configuration 700-a. The UE 115 may thereby transmit single-bit feedback in response to each downlink message received by the UE 115. For example, the UE 115 receives a first downlink message associated with single-bit feedback and a second downlink message associated with multi-bit feedback, the UE 115 may be configured to reduce the multi-bit feedback for the second downlink message to single-bit feedback in accordance with the codebook configuration 500-a disabling the multi-bit feedback for the UE 115.

The codebook configuration 700-a may thereby provide for the UE 115 to support both TB-based feedback and CBG-based feedback while supporting four subsubcodebooks 715 or less. The codebook configuration 700-a may reduce overhead and UE complexity as compared with codebook generation techniques in which the UE 115 supports both TB-based feedback and CBG-based feedback but does not receive the codebook configuration 700-a.

FIG. 7B illustrates a second example codebook configuration 700-b. The codebook configuration 700-b may be configured if CBG-based feedback is disabled for the UE 115. If the UE 115 is configured to support TB-based feedback, but not CBG-based feedback, the UE 115 may generate two subcodebooks 710-a and 710-c. The subcodebooks 710-a and 710-c may correspond to the TB-based feedback. The UE 115 may refrain from generating other subcodebooks 710 that correspond to the CBG-based feedback.

The codebook configuration 700-b may enable both single-bit feedback and multi-bit feedback at the UE 115 if CBG-based feedback is disabled by the UE 115. The UE 115 may thereby generate four subsubcodebooks 715. For example, the subsubcodebooks 715-a and 715-e may include multi-bit feedback information and the subsubcodebooks 715-b and 715-f may include single-bit feedback information. The UE 115 may thereby utilize the codebook 705-a and 705-b to support inclusion of single-bit feedback and multi-bit feedback in a same uplink message. But the UE 115 and the codebooks 705-a and 705-b may not support inclusion of feedback information in response to CBG-based PDSCH transmissions in accordance with the codebook configuration 700-b.

The codebook configuration 700-b may thereby provide for the UE 115 to support simultaneous multi-bit and single-bit feedback while performing TB-based feedback. The UE 115 may support four subsubcodebooks 715 or fewer in accordance with the codebook configuration 700-b, which may reduce overhead and UE complexity.

Figure 8:
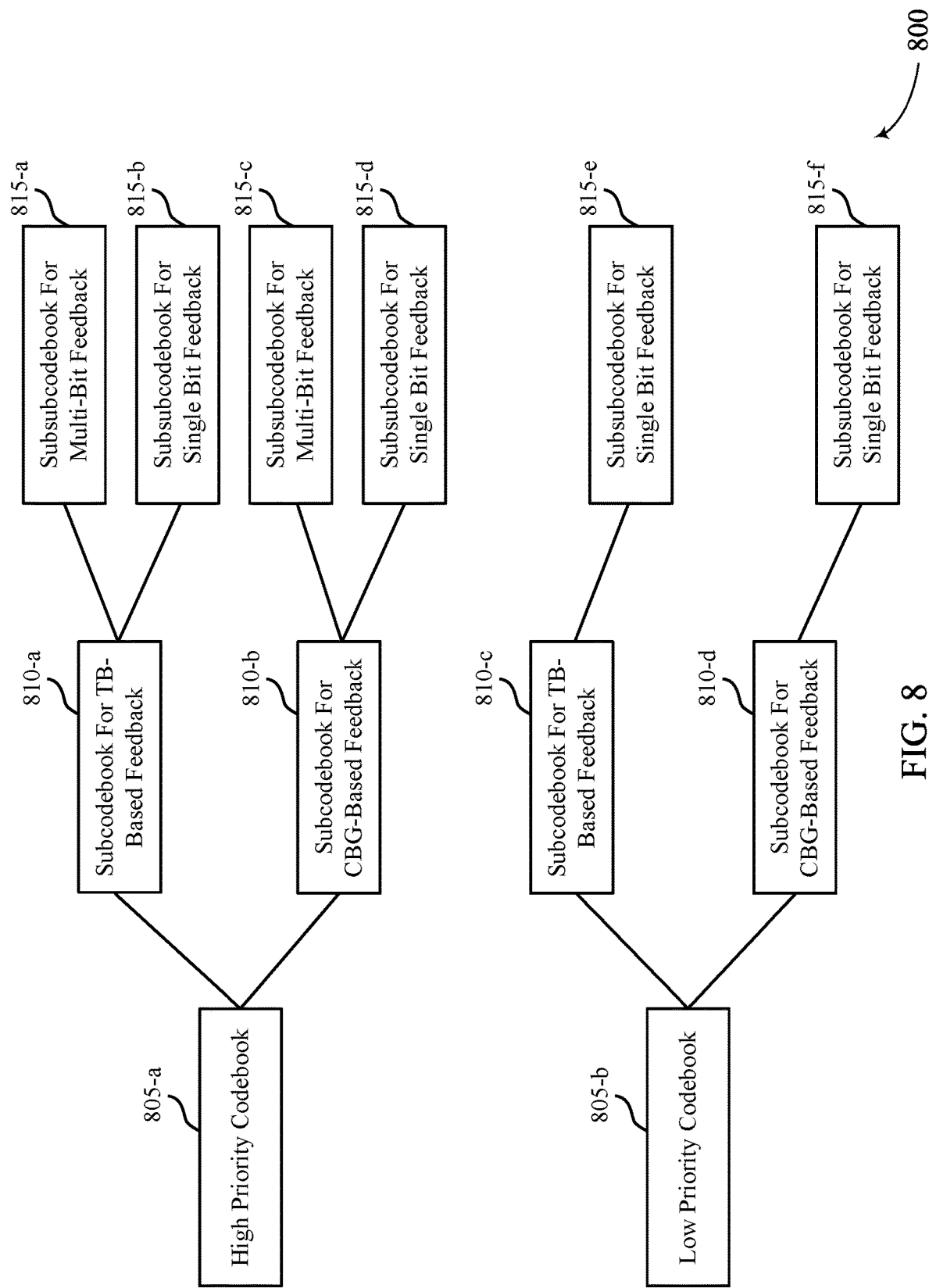

FIG. 8 illustrates an example of a codebook configuration 800 that supports techniques for multiplexing multi-bit and single-bit feedback in accordance with aspects of the present disclosure. The codebook configuration 800 may illustrate an example configuration of codebooks 805, subcodebooks 810, and subsubcodebooks 815 associated with single-bit and multi-bit feedback transmitted by a UE 115 to a base station 105. The UE 115 and the base station 105 may represent examples of corresponding devices described herein.

The codebook configuration 800 may represent an example of the codebook configuration 400 described with reference to FIG. 4. For example, the UE 115 may generate the codebook 805-a to correspond to high priority communications (e.g., URLLC communications) and the codebook 805-b to correspond to low priority communications (e.g., eMBB communications), as described with reference to FIG. 4. In the example of FIG. 8, the UE 115 may not support multi-TRP communications. Each codebook 805 may include two respective subcodebooks 810. The UE 115 may generate the subcodebooks 810-a and 810-c for the codebooks 805-a and 805-b, respectively, to correspond to TB-based feedback. The UE 115 may generate the subcodebooks 810-b and 810-d for the codebooks 805-a and 805-b, respectively, to correspond to CBG-based feedback, as described with reference to FIG. 4.

The UE 115 may receive signaling indicating the codebook configuration 800. Additionally, or alternatively, the UE 115 may be configured to support the codebook configuration 800 (e.g., a pre-configuration or a default configuration). The codebook configuration 800 may enable multi-bit feedback for the high priority codebook 805-a. The UE 115 may generate two subsubcodebooks 815 for each of the subcodebooks 810-a and 810-b in the high priority codebook 805-a based on the multi-bit feedback being enabled. For example, the subsubcodebooks 815-a and 815-c may include multi-bit feedback information and the subsubcodebooks 815-b and 815-d may include single-bit feedback information. The high priority codebook 805-a may thereby support inclusion of both single-bit feedback and multi-bit feedback in a same uplink message.

To reduce the quantity of subsubcodebooks 815 generated by the UE 115, the codebook configuration 800 may disable the multi-bit feedback for the low priority codebook 805-b. The UE 115 may generate a single subsubcodebook 815 for each of the subcodebooks 810-c and 810-d of the codebook 805-b based on the multi-bit feedback being disabled. For example, the UE 115 may generate the subsubcodebooks 815-e and 815-f to each include single-bit feedback information.

The low priority codebook 805-b may thereby support inclusion of single-bit feedback in a feedback message in accordance with the codebook configuration 800. The UE 115 may transmit single-bit feedback in response to each low priority downlink message received by the UE 115. For example, if the UE 115 receives a first low priority downlink message associated with single-bit feedback and a second low priority downlink message associated with multi-bit feedback, the UE 115 may be configured to reduce the multi-bit feedback for the second low priority downlink message to single-bit feedback in accordance with the codebook configuration 800 disabling the multi-bit feedback for low priority communications.

The codebook configuration 800 may provide for more reliable and efficient high priority communications by enabling the multi-bit feedback for the high priority codebook 805-a. The codebook configuration 800 may additionally, or alternatively provide for reduced overhead and UE complexity by reducing the quantity of subsubcodebooks 815 supported by the UE 115 to six or fewer. The UE 115 may thereby support simultaneous multi-bit and single-bit feedback for high priority communications, and the UE 115 may support single-bit feedback for low priority communications in accordance with the codebook configuration 800.

Figure 9:
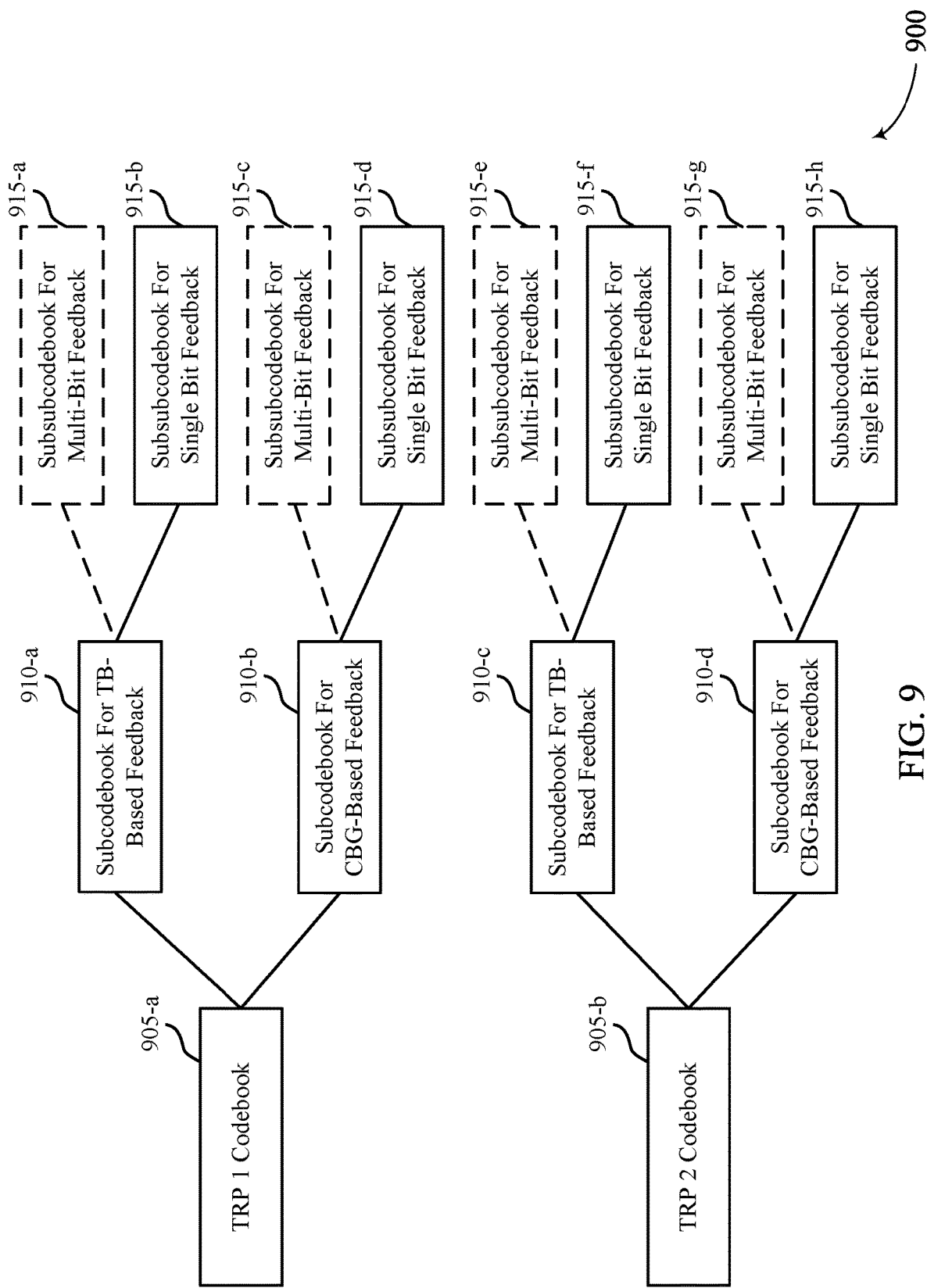

FIG. 9 illustrates an example of a codebook configuration 900 that supports techniques for multiplexing multi-bit and single-bit feedback in accordance with aspects of the present disclosure. The codebook configuration 900 may illustrate an example configuration of codebooks 905, subcodebooks 910, and subsubcodebooks 915 associated with single-bit and multi-bit feedback transmitted by a UE 115 to a base station 105. The UE 115 and the base station 105 may represent examples of corresponding devices described herein.

The codebook configuration 900 may represent an example of the codebook configuration 400 described with reference to FIG. 4. For example, the UE 115 may generate the codebook 905-a to correspond to a first TRP (TRP 1) and the codebook 905-b to correspond to a second TRP (TRP 2), as described with reference to FIG. 4. In the example of FIG. 9, the UE 115 may not support codebooks 905 for high priority and low priority communications. Each codebook 905 may include two respective subcodebooks 910. The UE 115 may generate the subcodebooks 910-a and 910-c for the codebooks 905-a and 905-b, respectively, to correspond to TB-based feedback. The UE 115 may generate the subcodebooks 910-b and 910-d for the codebooks 905-a and 905-b, respectively, to correspond to CBG-based feedback, as described with reference to FIG. 4.

The UE 115 may receive signaling indicating the codebook configuration 900. Additionally, or alternatively, the UE 115 may be configured to support the codebook configuration 900 (e.g., a pre-configuration or a default configuration). To reduce the quantity of subsubcodebooks 915 generated by the UE 115, the codebook configuration 900 may disable the multi-bit feedback. That is, the codebook configuration 900 may indicate that multi-bit feedback is disabled for a UE 115 that supports multi-TRP communications. If the UE 115 receives signaling that configures the UE 115 with multi-TRP feedback, the UE 115 will generate the codebook 905-a to correspond to the first TRP and the codebook 905-b to correspond to a second TRP, and the codebook configuration 900 may disable multi-bit feedback for each of the codebooks 905-a and 905-b based on the multi-TRP communications.

The UE 115 may thereby generate the subsubcodebooks 915-b, 915-d, 915-f, and 915-h to correspond to single-bit feedback for multi-TRP communications. The UE 115 may refrain from generating the subsubcodebooks 915-a, 915-c, 915-e, and 915-g to correspond to multi-bit feedback in accordance with the codebook configuration 900 and the multi-TRP communications. The codebook configuration 900 may provide for reduced overhead and UE complexity by reducing the quantity of subsubcodebooks 915 supported by the UE 115 to four or fewer. The UE 115 may thereby support single-bit feedback for multi-TRP communications in accordance with the codebook configuration 900.

Figure 10:
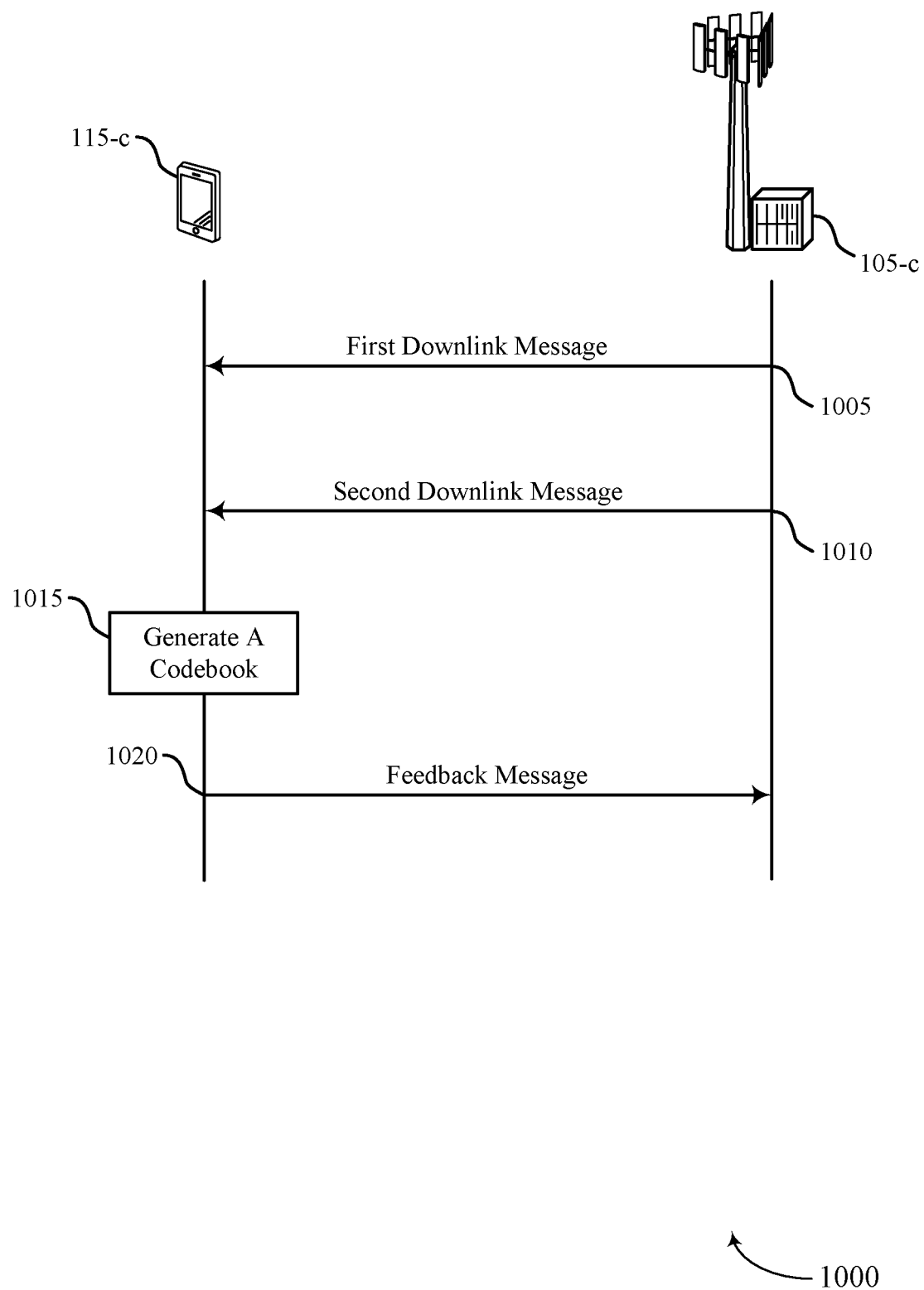
FIG. 10 illustrates an example of a process flow that supports techniques for multiplexing multi-bit and single-bit feedback in accordance with aspects of the present disclosure.

FIG. 10 illustrates an example of a process flow 1000 that supports techniques for multiplexing multi-bit and single-bit feedback in accordance with aspects of the present disclosure. The process flow 1000 may implement aspects of the wireless communications systems 100 and 200 or may be implemented by aspects of the wireless communications systems 100 and 200 as described with reference to FIGS. 1 and 2, respectively. For example, the process flow 1000 may implement or be implemented by a base station 105-c and a UE 115-c, which may be examples of a base station and a UE as described with reference to FIGS. 1 through 9. In the following description of the process flow 1000, the operations between the base station 105-c and the UE 115-c may be performed in different orders or at different times. Some operations may also be left out of the process flow 1000, or other operations may be added. Although the base station 105-c and the UE 115-c are shown performing the operations of the process flow 1000, some aspects of some operations may also be performed by one or more other wireless devices.

At 1005, the base station 105-c may transmit a first downlink message to the UE 115-c. The first downlink message may be associated with single-bit feedback. At 1010, the base station 105-c may transmit a second downlink message to the UE 115-c. The second downlink message may be associated with multi-bit feedback. The first downlink message and the second downlink message may have a common uplink transmission opportunity for transmitting a feedback message based on a codebook for reporting feedback pertaining to the first downlink message and the second downlink message.

In some examples, the UE 115-c may receive a downlink control message, such as DCI, that schedules the first downlink message and a second downlink control message that schedules the second downlink message. The first and second downlink control messages may indicate one or more uplink resources for the UE 115-c to use for transmitting feedback in response to the first and second downlink messages. The one or more uplink resources may be overlapping in time and may correspond to the common uplink transmission opportunity for the UE 115-c. In other examples, a single DCI may schedule the first and second downlink messages.

At 1015, the UE 115-c may generate the codebook based on decoding the first downlink message and the second downlink message. In particular, the first downlink message and the second downlink message may be received as coded data blocks, and the UE 115-c may attempt to decode the first downlink message and the second downlink message, for example, based on an error correction code. In some cases, the UE 115-c may have functionality to correct one or more transmission errors in one or both of the first downlink message and the second downlink message (e.g., using forward error correction or other techniques). In some other cases, however, transmission errors identified by decoding the first downlink message and/or the second downlink message may not be correctable, thus resulting in retransmission of one or more portions of a downlink message. In either case, feedback information may be generated by the UE 115-c to indicate, to the base station 105-c, data that was decoded correctly and/or data that was not decoded correctly. Thus, the UE 115-c may generate a codebook based on whether the first downlink message, the second downlink message, or both were decoded successfully. The codebook may support inclusion of both single-bit feedback for the first downlink message and multi-bit feedback for the second downlink message. The UE 115-c may generate the codebook in accordance with a codebook configuration for the UE 115-c. The UE 115-c may, in some examples, receive signaling that indicates the codebook configuration. Additionally, or alternatively, the UE 115-c may be configured to support the codebook configuration. In some examples, the UE 115-c may transmit a UE capability message to the base station 105-c to indicate a capability of the UE 115-c to support multiple subsubcodebooks of a codebook. In such cases, the codebook configuration may be based on the capability of the UE 115-c. In some cases, a processor of the UE 115-c may generate the codebook based on decoding the downlink messages.

The codebook configuration may support multiplexing the single-bit feedback and the multi-bit feedback into a same feedback message, and may be configured to reduce overhead and UE complexity. For example, the codebook configuration may indicate that the UE 115-c is to generate fewer subcodebooks or subsubcodebooks in the codebook than if the UE 115-c did not receive the codebook configuration. The codebook configuration may be an example of any of the codebook configurations described in further detail with reference to FIGS. 2, 3, 4, 5A, 5B, 6, 7A, 7B, 8 and 9.

At 1020, the UE 115-c may transmit the feedback message to the base station 105-c. The UE 115-c may transmit the feedback message during the common uplink transmission opportunity. In some examples, the UE 115-c may transmit the codebook via the feedback message, or the feedback message may be generated based on the codebook. The feedback message may include the single-bit feedback for the first downlink message and the multi-bit feedback for the second downlink message. The feedback message may be transmitted, for example, using a transceiver of the UE 115-c. Likewise, the feedback message may be received by the base station 105-c using a transceiver of the base station 105-c.

Figure 11:
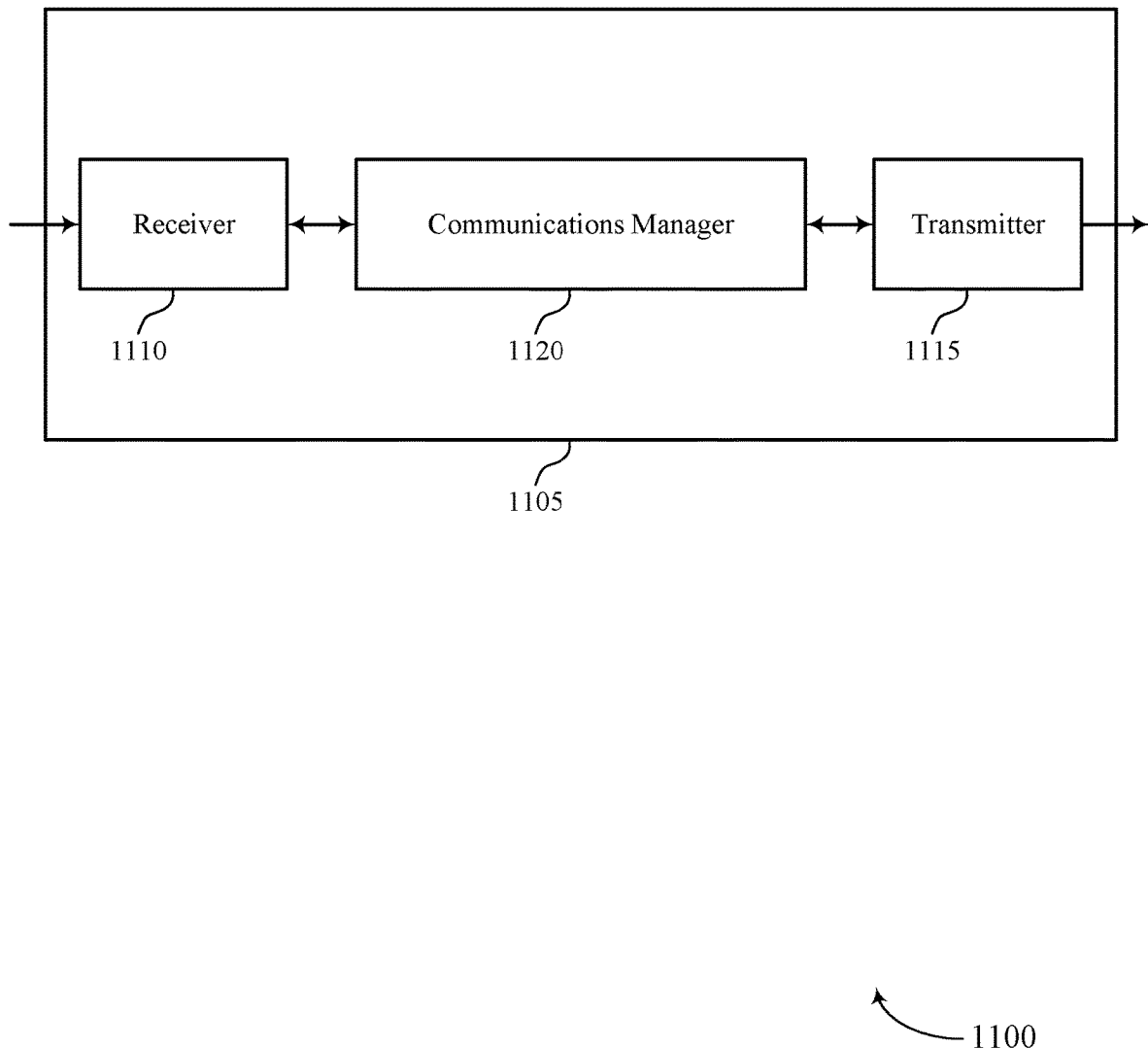
FIGS. 11 and 12 show block diagrams of devices that support techniques for multiplexing multi-bit and single-bit feedback in accordance with aspects of the present disclosure.

FIG. 11 shows a block diagram 1100 of a device 1105 that supports techniques for multiplexing multi-bit and single-bit feedback in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for multiplexing multi-bit and single-bit feedback). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for multiplexing multi-bit and single-bit feedback). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for multiplexing multi-bit and single-bit feedback as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message. The communications manager 1120 may be configured as or otherwise support a means for generating, based on decoding the first downlink message and the second downlink message, the codebook supporting inclusion of both single-bit feedback for the first downlink message and multi-bit feedback for the second downlink message. The communications manager 1120 may be configured as or otherwise support a means for transmitting, during the common uplink transmission opportunity, the feedback message based on the codebook.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced processing, reduced power consumption, and more efficient utilization of communication resources. The device 1105 may be configured with one or more different codebook structures that support inclusion of single-bit feedback and multi-bit feedback in a single feedback message. By multiplexing single-bit feedback information with multi-bit feedback information, the processor of the device 1105 may refrain from generating two or more separate codebooks and corresponding feedback messages, which may reduce processing and improve utilization of communication resources. Additionally, or alternatively, the codebook configuration may provide for the processor to generate fewer subsubcodebooks or subcodebooks than if the processor did not receive the configuration, which may support reduced overhead, processing and power consumption.

In some examples, the device 1105 may be configured with a first time gap for generating single-bit feedback information and a second time gap for generating multi-bit feedback information. If the second time gap is not satisfied for a downlink message that is associated with multi-bit feedback information, the processor of the device 1105 may reduce a quantity of bits in the feedback information for the downlink message. That is, the processor may transmit single-bit feedback information, which may reduce processing, latency, and improve communication reliability.

Figure 12:
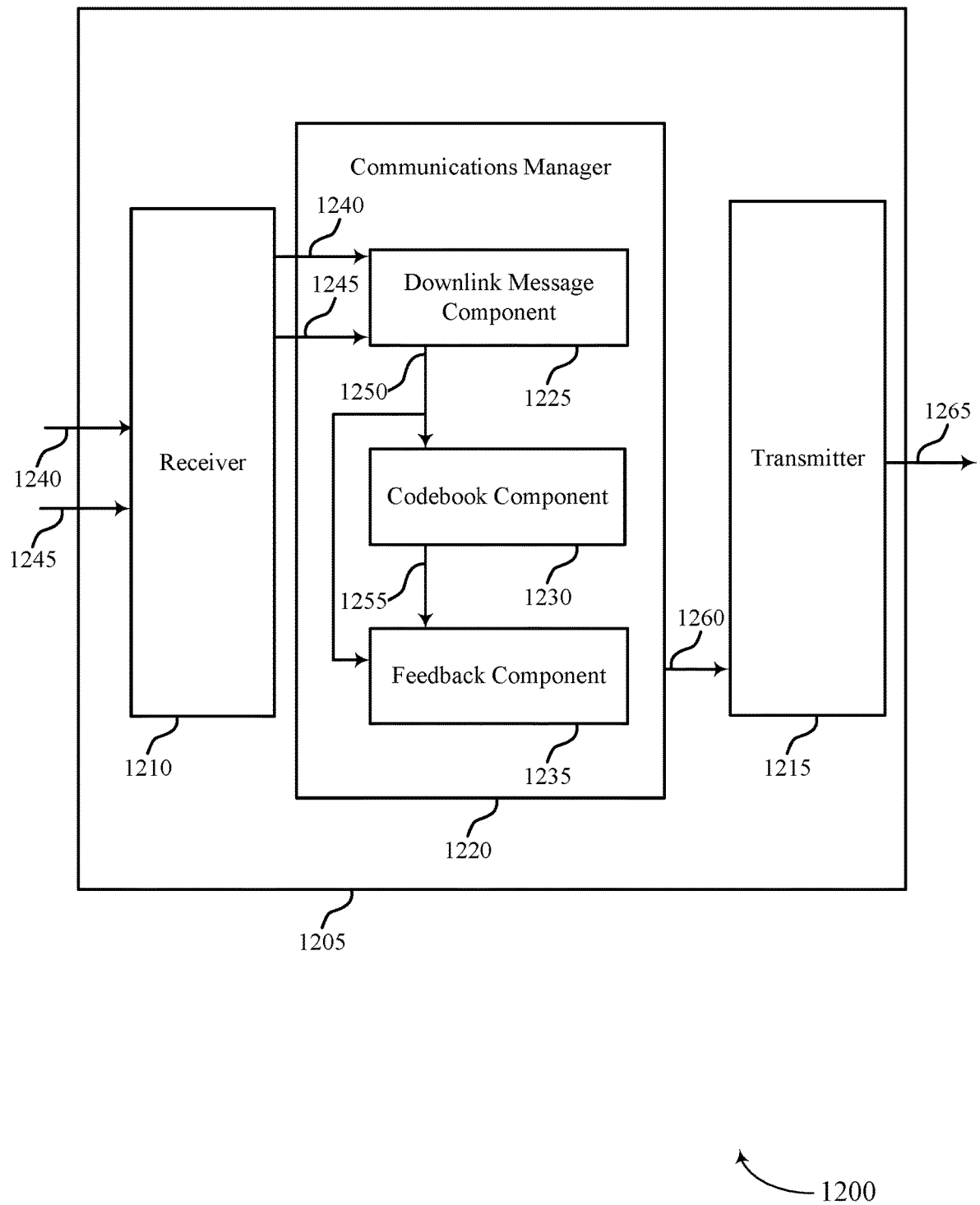

FIG. 12 shows a block diagram 1200 of a device 1205 that supports techniques for multiplexing multi-bit and single-bit feedback in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for multiplexing multi-bit and single-bit feedback). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for multiplexing multi-bit and single-bit feedback). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for multiplexing multi-bit and single-bit feedback as described herein. For example, the communications manager 1220 may include a downlink message component 1225, a codebook component 1230, a feedback component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. For example, the communications manager 1220 may receive, at the receiver 1210, a first downlink message 1240 and a second downlink message 1245 transmitted to the device 1205, from a base station 105. The first downlink message 1240 may be associated with multi-bit feedback and the second downlink message 1245 may be associated with single-bit feedback. In some examples, the first downlink message 1240 and the second downlink message 1245 may be passed on to other components of the device 1205. For example, the receiver 1210 may electrically send the first downlink message 1240 and the second downlink message 1245 to the downlink message component 1225.

The downlink message component 1225 may receive, from the receiver 1210, the first downlink message 1240, the second downlink message 1245, or both. The downlink message component 1225 may decode the first downlink message 1240 and the second downlink message 1245. Based on the decoding, the communications manager 1220 (e.g., via the downlink message component 1225) may identify that the first downlink message 1240 and the second downlink message 1245 have a common uplink transmission opportunity for transmitting a feedback message. The downlink message component 1225 may electrically send the decoded information 1250 from the first downlink message 1240 and the second downlink message 1245 to the codebook component 1230, the feedback component 1235, or both.

The codebook component 1230 may receive, from the downlink message component 1225, the decoded information 1250. The communications manager 1220 (e.g., via the codebook component 1230) may generate a codebook 1255 supporting inclusion of both single-bit feedback for the first downlink message 1240 and multi-bit feedback for the second downlink message 1245 based on the decoded information 1250. The codebook component 1230 may electrically send the codebook 1255 to the feedback component 1235.

The feedback component 1235 may receive the decoded information 1250 from the downlink message component 1225, the codebook 1255 from the codebook component 1230, or both. The feedback component 1235 may generate a feedback message 1260 based on the decoded information 1250, the codebook 1255, or both. In some examples, the feedback message 1260 may include the codebook 1255. The feedback component 1235 may electrically send the feedback message 1260 to the transmitter 1215. The transmitter 1215 may receive, from the feedback component 1235, the feedback message 1260.

The communications manager 1220, via the transmitter 1215, may transmit the output signals 1265, which may include the feedback message 1260, to a base station 105 during the common uplink transmission opportunity.

Figure 13:
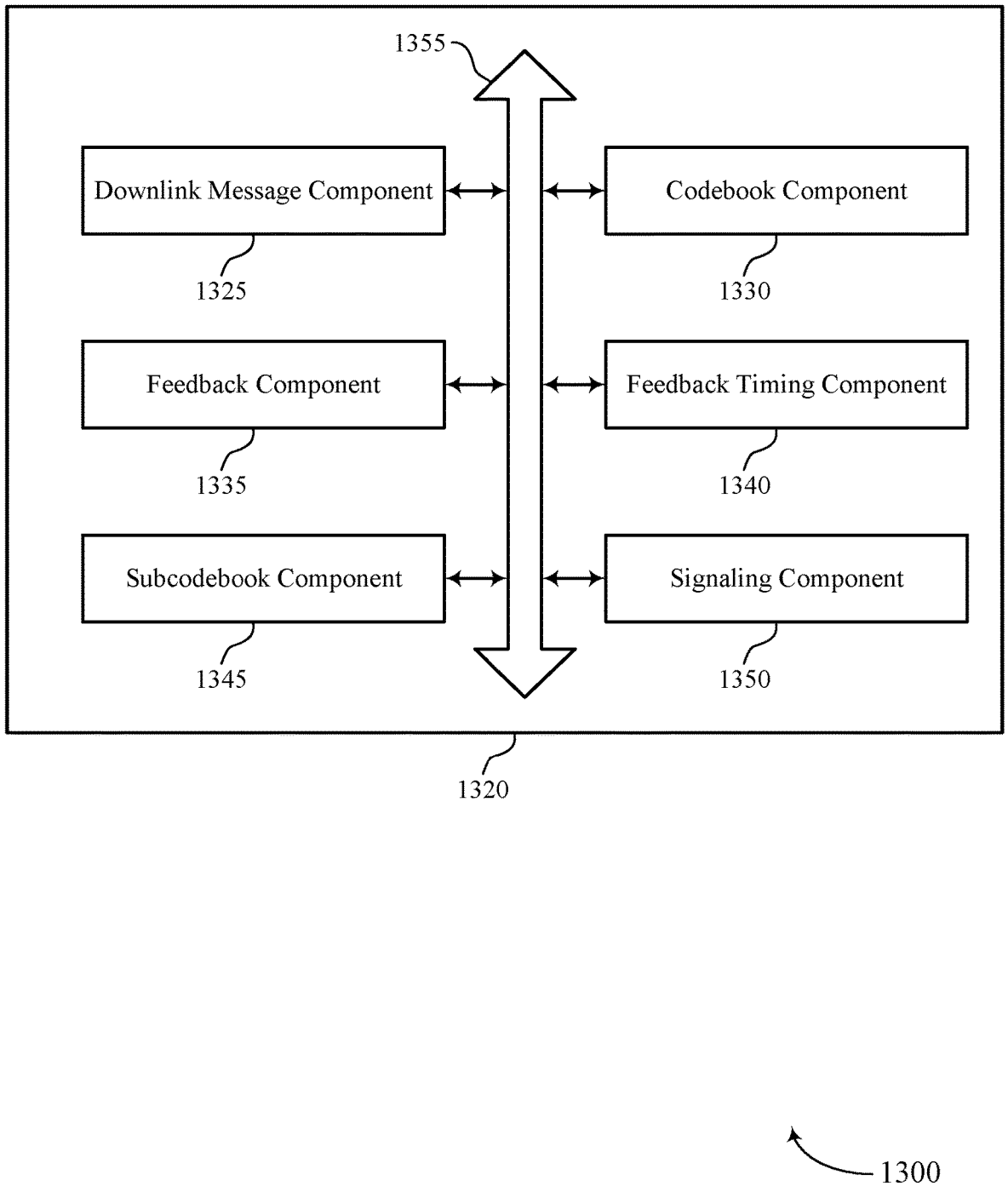
FIG. 13 shows a block diagram of a communications manager that supports techniques for multiplexing multi-bit and single-bit feedback in accordance with aspects of the present disclosure.

FIG. 13 shows a block diagram 1300 of a communications manager 1320 that supports techniques for multiplexing multi-bit and single-bit feedback in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for multiplexing multi-bit and single-bit feedback as described herein. For example, the communications manager 1320 may include a downlink message component 1325, a codebook component 1330, a feedback component 1335, a feedback timing component 1340, a subcodebook component 1345, a signaling component 1350, or any combination thereof. Each of these components may communicate, directly or indirectly, with one another (e.g., via one or more buses 1355).

The communications manager 1320 may support wireless communication at a UE in accordance with examples as disclosed herein. The downlink message component 1325 may be configured as or otherwise support a means for receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message. The downlink message component 1325 may decode the first and second downlink messages and send, to the codebook component 1330, the feedback component 1335, or both via the bus 1355, decoded information based on the downlink messages. The codebook component 1330 may be configured as or otherwise support a means for generating, based on the decoded information (e.g., based on the downlink message component 1325 decoding the first downlink message and the second downlink message), the codebook supporting inclusion of both single-bit feedback for the first downlink message and multi-bit feedback for the second downlink message. The codebook component 1330 may send, to the feedback component 1335 via the bus 1355, the codebook. The feedback component 1335 may be configured as or otherwise support a means for transmitting, during the common uplink transmission opportunity, the feedback message based on the codebook.

In some examples, the feedback timing component 1340 may be configured as or otherwise support a means for receiving signaling (e.g., from a base station 105) including a first feedback timing for the single-bit feedback for the first downlink message and a second feedback timing for the multi-bit feedback for the second downlink message, the first feedback timing indicating a first time gap that is less than a second time gap indicated by the second feedback timing. In some examples, the feedback timing component 1340 may send, to the feedback component 1335 via the bus 1355, the first feedback timing and the second feedback timing, and the feedback component 1335 may transmit the feedback message based on the codebook based on a time difference between the first downlink message and the feedback message being greater than or equal to the first time gap, the codebook supporting inclusion of at least the single-bit feedback for the first downlink message.

In some examples, the feedback timing component 1340 may be configured as or otherwise support a means for determining that a time difference between the second downlink message and the feedback message is greater than or equal to the second time gap. The feedback timing component 1340 may send, to the codebook component 1330 via the bus 1355, an indication of the time difference being greater than or equal to the second time gap. In some examples, the codebook component 1330 may be configured as or otherwise support a means for generating the codebook supporting inclusion of both the single-bit feedback for the first downlink message and the multi-bit feedback for the second downlink message based on the time difference being greater than or equal to the second time gap.

In some examples, the feedback timing component 1340 may be configured as or otherwise support a means for determining that a time difference between the second downlink message and the feedback message is less than the second time gap. The feedback timing component 1340 may send, to the codebook component 1330 via the bus 1355, an indication of the time difference being less than the second time gap. In some examples, the codebook component 1330 may be configured as or otherwise support a means for generating the codebook supporting inclusion of the single-bit feedback for the first downlink message and additional single-bit feedback for the second downlink message based on the time difference being less than the second time gap.

In some examples, to support generating the codebook supporting inclusion of the single-bit feedback for the first downlink message and the additional single-bit feedback for the second downlink message, the codebook component 1330 may be configured as or otherwise support a means for dropping one or more bits from the multi-bit feedback for the second downlink message.

In some examples, the subcodebook component 1345 may be configured as or otherwise support a means for determining that a subcodebook of the codebook supports inclusion of either the single-bit feedback or the multi-bit feedback. The subcodebook component 1345 may send, to the codebook component 1330 via the bus 1355, an indication of the determination. In some examples, the codebook component 1330 may be configured as or otherwise support a means for generating the codebook supporting inclusion of the single-bit feedback for the first downlink message based on the determination, where each subsubcodebook of the codebook supports inclusion of the single-bit feedback for the first downlink message.

In some examples, the subcodebook component 1345 may be configured as or otherwise support a means for determining that a subcodebook of the codebook supports inclusion of either the single-bit feedback or the multi-bit feedback. The subcodebook component 1345 may send, to the codebook component 1330 via the bus 1355, an indication of the determination. In some examples, the codebook component 1330 may be configured as or otherwise support a means for generating the codebook supporting inclusion of the multi-bit feedback for the second downlink message based on the determination, where each subsubcodebook of the codebook supports inclusion of the multi-bit feedback for the second downlink message.

In some examples, the subcodebook component 1345 may be configured as or otherwise support a means for determining that a first subcodebook and a second subcodebook of the codebook support inclusion of either the single-bit feedback or the multi-bit feedback. The subcodebook component 1345 may send, to the codebook component 1330 via the bus 1355, an indication of the determination. In some examples, the codebook component 1330 may be configured as or otherwise support a means for generating the codebook supporting inclusion of the single-bit feedback for the first downlink message or the multi-bit feedback for the second downlink message based on the determination, where a subsubcodebook of the first subcodebook supports inclusion of the single-bit feedback for the first downlink message and a subsubcodebook of the second subcodebook supports inclusion of the multi-bit feedback for the second downlink message.

In some examples, the signaling component 1350 may be configured as or otherwise support a means for receiving (e.g., from a base station 105) signaling configuring the UE with a per-TB based feedback scheme and a per-CBG based feedback scheme. The signaling component 1350 may send, to the subcodebook component 1345 via the bus 1355, an indication of the signaling. In some examples, the subcodebook component 1345 may be configured as or otherwise support a means for determining that a subcodebook of the codebook supports inclusion of the single-bit feedback and exclude the multi-bit feedback based on the signaling configuring the per-TB based feedback scheme and the per-CBG based feedback scheme. The subcodebook component 1345 may send, to the codebook component 1330 via the bus 1355, an indication of the determination. In some examples, the codebook component 1330 may be configured as or otherwise support a means for generating the codebook supporting inclusion of the single-bit feedback for the first downlink message and additional single-bit feedback for the second downlink message based on the determination, where a subsubcodebook of the subcodebook supports inclusion of the single-bit feedback for the first downlink message and the additional single-bit feedback for the second downlink message, and where the multi-bit feedback for the second downlink message is reduced to the additional single-bit feedback based on the determination.

In some examples, the signaling component 1350 may be configured as or otherwise support a means for receiving (e.g., from a base station 105) signaling configuring the UE with a per-TB based feedback scheme and disabling a per-CBG based feedback scheme. The signaling component 1350 may send, to the subcodebook component 1345 via the bus 1355, an indication of the signaling. In some examples, the subcodebook component 1345 may be configured as or otherwise support a means for determining that a subcodebook of the codebook supports inclusion of both the single-bit feedback and the multi-bit feedback based on the signaling configuring the per-TB based feedback scheme and disabling the per-CBG based feedback scheme. The subcodebook component 1345 may send, to the codebook component 1330 via the bus 1355, an indication of the determination. In some examples, the codebook component 1330 may be configured as or otherwise support a means for generating the codebook supporting inclusion of both the single-bit feedback for the first downlink message and the multi-bit feedback for the second downlink message based on the determination, where a first subsubcodebook of the subcodebook supports inclusion of the single-bit feedback for the first downlink message and a second subsubcodebook of the subcodebook supports inclusion of the multi-bit feedback for the second downlink message.

In some examples, the subcodebook component 1345 may be configured as or otherwise support a means for determining that a subcodebook of the codebook supports inclusion of both the single-bit feedback and the multi-bit feedback based on the codebook being a high-priority codebook. The subcodebook component 1345 may send, to the codebook component 1330 via the bus 1355, an indication of the determination. In some examples, the codebook component 1330 may be configured as or otherwise support a means for generating the codebook supporting inclusion of both the single-bit feedback for the first downlink message and the multi-bit feedback for the second downlink message based on the determination, where a first subsubcodebook of the subcodebook supports inclusion of the single-bit feedback for the first downlink message and a second subsubcodebook of the subcodebook supports inclusion of the multi-bit feedback for the second downlink message.

In some examples, the subcodebook component 1345 may be configured as or otherwise support a means for determining that a subcodebook of the codebook supports inclusion of the single-bit feedback and exclude the multi-bit feedback based on the codebook being a low-priority codebook, where generating the codebook includes. The subcodebook component 1345 may send, to the codebook component 1330 via the bus 1355, an indication of the determination. In some examples, the codebook component 1330 may be configured as or otherwise support a means for generating the codebook supporting inclusion of the single-bit feedback for the first downlink message and additional single-bit feedback for the second downlink message based on the determination, where a subsubcodebook of the subcodebook supports inclusion of the single-bit feedback for the first downlink message and the additional single-bit feedback for the second downlink message, and where the multi-bit feedback for the second downlink message is reduced to the additional single-bit feedback based on the determination.

In some examples, the signaling component 1350 may be configured as or otherwise support a means for receiving signaling configuring the UE with multi-TRP feedback. The signaling component 1350 may send, to the subcodebook component 1345 via the bus 1355, an indication of the signaling configuring the UE with multi-TRP feedback. In some examples, the subcodebook component 1345 may be configured as or otherwise support a means for determining that a subcodebook of the codebook supports inclusion of the single-bit feedback and exclude the multi-bit feedback based on the signaling configuring the multi-TRP feedback. The subcodebook component 1345 may send, to the codebook component 1330 via the bus 1355, an indication of the determination. In some examples, the codebook component 1330 may be configured as or otherwise support a means for generating the codebook supporting inclusion of the single-bit feedback for the first downlink message and additional single-bit feedback for the second downlink message based on the determination, where a subsubcodebook of the subcodebook supports inclusion of the single-bit feedback for the first downlink message and the additional single-bit feedback for the second downlink message, and where the multi-bit feedback for the second downlink message is reduced to the additional single-bit feedback based on the determination.

In some examples, to support generating the codebook, the codebook component 1330 may be configured as or otherwise support a means for generating the codebook supporting inclusion of both the single-bit feedback for the first downlink message and the multi-bit feedback for the second downlink message, where a subcodebook of the codebook includes a first subsubcodebook and a second subsubcodebook, the first subsubcodebook including the single-bit feedback and the second subsubcodebook including the multi-bit feedback.

In some examples, the signaling component 1350 may be configured as or otherwise support a means for transmitting an indication of a capability of the UE to support a set of multiple subsubcodebooks of the codebook, where transmitting the feedback message including the codebook is based on the capability of the UE.

In some examples, the multi-bit feedback includes a first bit indicating an ACK or a NACK associated with the second downlink message and one or more additional bits indicating information corresponding to one or more communications parameters. In some examples, the one or more communications parameters are associated with CSI.

Figure 14:
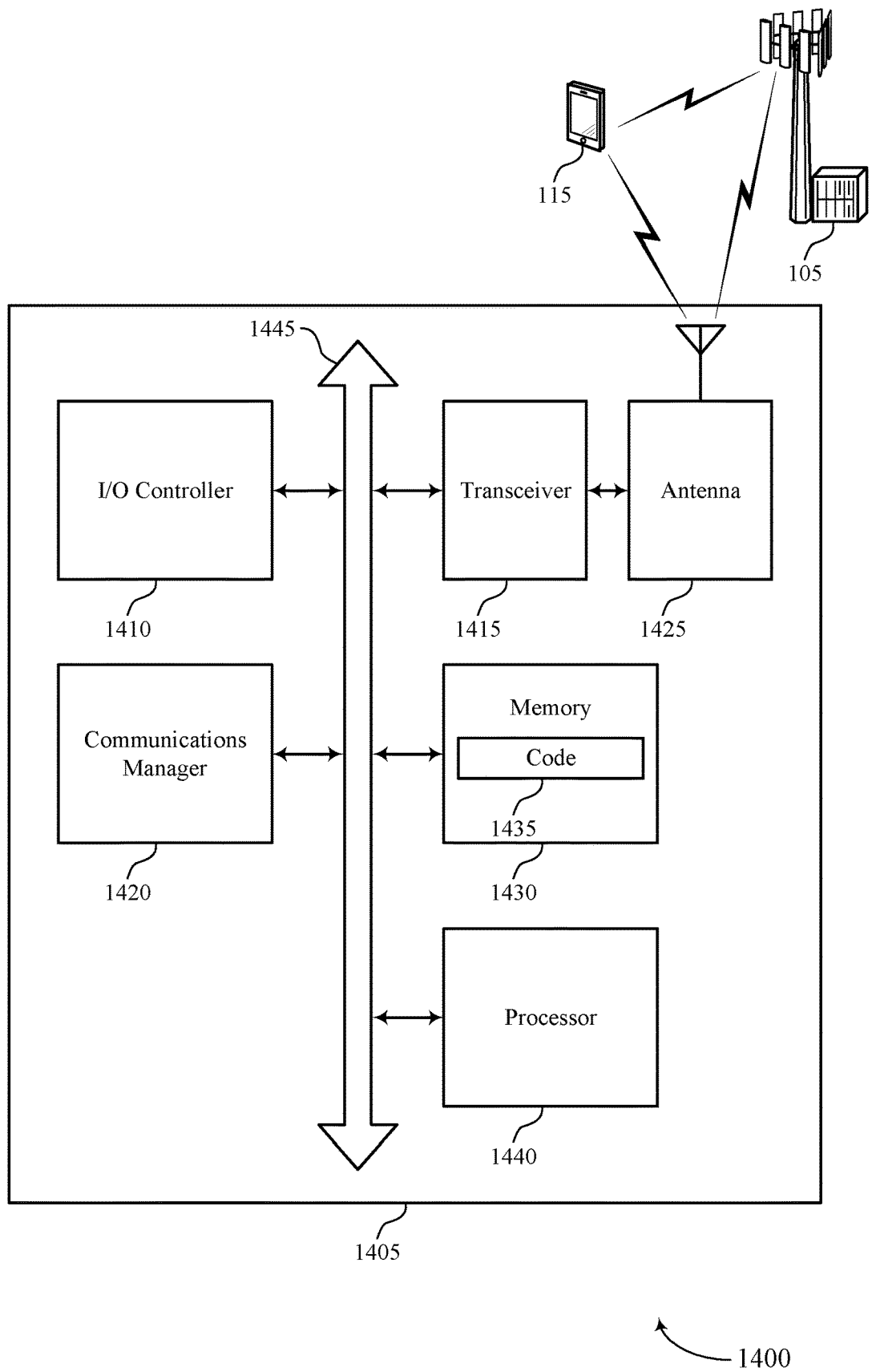
FIG. 14 shows a diagram of a system including a device that supports techniques for multiplexing multi-bit and single-bit feedback in accordance with aspects of the present disclosure.

FIG. 14 shows a diagram of a system 1400 including a device 1405 that supports techniques for multiplexing multi-bit and single-bit feedback in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally, or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for multiplexing multi-bit and single-bit feedback). For example, the device 1405 or a component of the device

1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message. The communications manager 1420 may be configured as or otherwise support a means for generating, based on decoding the first downlink message and the second downlink message, the codebook supporting inclusion of both single-bit feedback for the first downlink message and multi-bit feedback for the second downlink message. The communications manager 1420 may be configured as or otherwise support a means for transmitting, during the common uplink transmission opportunity, the feedback message based on the codebook.

By including or configuring the communications manager 1420 in accordance with examples as described herein, the device 1405 may support techniques for improved communication reliability, reduced latency, more efficient utilization of communication resources, and improved coordination between devices. The device 1405 may be configured with one or more different codebook structures that support inclusion of single-bit feedback and multi-bit feedback into a single feedback message. The codebook configurations may provide for the device 1405 to support single-bit and multi-bit feedback simultaneously, which may reduce latency, improve communication reliability, and improve utilization of communication resources. The multi-bit feedback may include one or more bits of CSI, which may improve coordination between devices (e.g., between a UE and a base station). Additionally, or alternatively, the codebook configurations may provide for the device 1405 to generate fewer subsubcodebooks or subcodebooks than if the device 1405 did not receive the configuration, which may support reduced overhead, UE complexity, and power consumption.

In some examples, the device 1405 may be configured with a first time gap for generating single-bit feedback information and a second time gap for generating multi-bit feedback information. The first and second time gaps may support improved communication reliability. If the second time gap is not satisfied for a downlink message that is associated with multi-bit feedback information, the device 1405 may, in some examples, reduce a quantity of bits in the feedback information for the downlink message. That is, the device 1405 may transmit single-bit feedback information. Additionally, or alternatively, if the second time gap is not satisfied, the device 1405 may refrain from transmitting feedback information for the downlink message. By operating according to the first and second time gaps, the device 1405 may support reduced latency and improved communication reliability.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for multiplexing multi-bit and single-bit feedback as described herein, or the processor 1440 and the memory 1430 may be otherwise configured to perform or support such operations.

Figure 15:
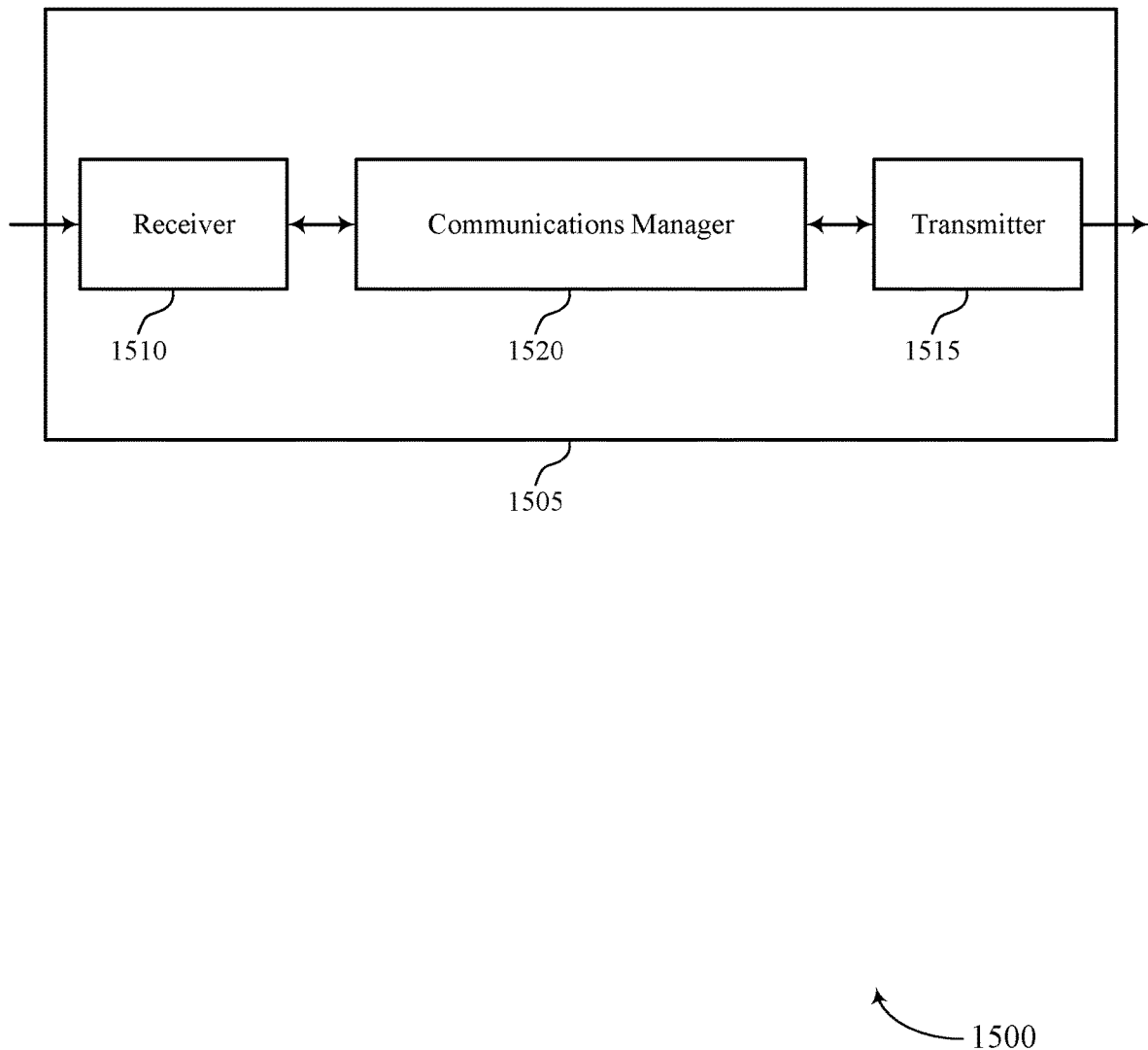
FIGS. 15 and 16 show block diagrams of devices that support techniques for multiplexing multi-bit and single-bit feedback in accordance with aspects of the present disclosure.

FIG. 15 shows a block diagram 1500 of a device 1505 that supports techniques for multiplexing multi-bit and single-bit feedback in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for multiplexing multi-bit and single-bit feedback). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for multiplexing multi-bit and single-bit feedback). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for multiplexing multi-bit and single-bit feedback as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message. The communications manager 1520 may be configured as or otherwise support a means for receiving, from the UE and during the common uplink transmission opportunity, the feedback message based on the codebook, the codebook supporting inclusion of single-bit feedback for the first downlink message and multi-bit feedback for the second downlink message.

Figure 16:
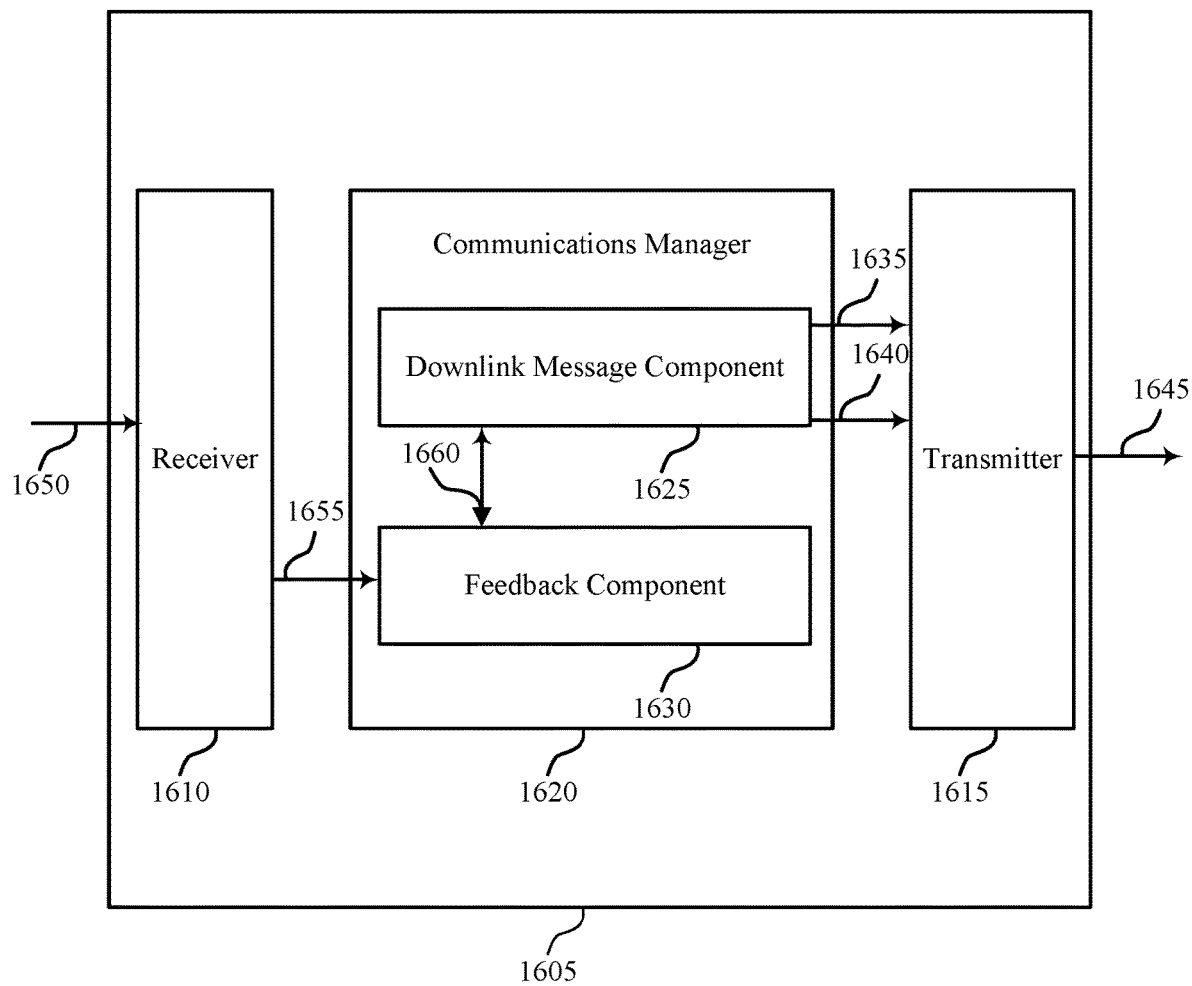

FIG. 16 shows a block diagram 1600 of a device 1605 that supports techniques for multiplexing multi-bit and single-bit feedback in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for multiplexing multi-bit and single-bit feedback). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for multiplexing multi-bit and single-bit feedback). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for multiplexing multi-bit and single-bit feedback as described herein. For example, the communications manager 1620 may include a downlink message component 1625 a feedback component 1630, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. For example, the downlink message component 1625 may generate a first downlink message 1635 and a second downlink message 1640. The first downlink message 1635 may be associated with single-bit feedback and the second downlink message 1640 may be associated with multi-bit feedback. The first downlink message 1635 and the second downlink message 1640 may share a common uplink transmission opportunity for receiving a feedback message 1655 that includes a codebook for reporting feedback pertaining to the first downlink message 1635 and the second downlink message 1640. The downlink message component 1625 may electrically send the first downlink message 1635 and the second downlink message 1640 to the transmitter 1615. The transmitter 1615 may receive, from the downlink message component 1625, the first downlink message 1635 and the second downlink message 1640.

The device 1605 may transmit, to a UE 115 and via the transmitter 1615, output signals 1645 that include the first downlink message 1635 and the second downlink message 1640. The device 1605 may receive, from the UE 115 and via the receiver 1610, input signals 1650 that include a feedback message 1655. The feedback message 1655 may be received from the UE 115 during the common uplink transmission opportunity. In some examples, the feedback message may be based on a codebook for reporting feedback pertaining to the first downlink message 1635 and the second downlink message 1640. In some examples, the codebook may support inclusion of single-bit feedback for the first downlink message and multi-bit feedback for the second downlink message. The receiver 1610 may electrically send, to the feedback component 1630, the feedback message 1655.

The feedback component 1630 may receive, from the receiver 1610, the feedback message 1655. The feedback component 1630 may decode the feedback message 1655 to identify a respective ACK or NACK in response to each downlink message and separate the single-bit feedback in response to the first downlink message 1635 from the multi-bit feedback in response to the second downlink message 1640. In some examples, the feedback component 1630 may electrically send or receive feedback signals 1660 to or from the downlink message component 1625. The feedback signals 1660 may indicate the common uplink transmission opportunity for receiving the feedback message 1655, a result of decoding the feedback message 1655, or both.

Figure 17:
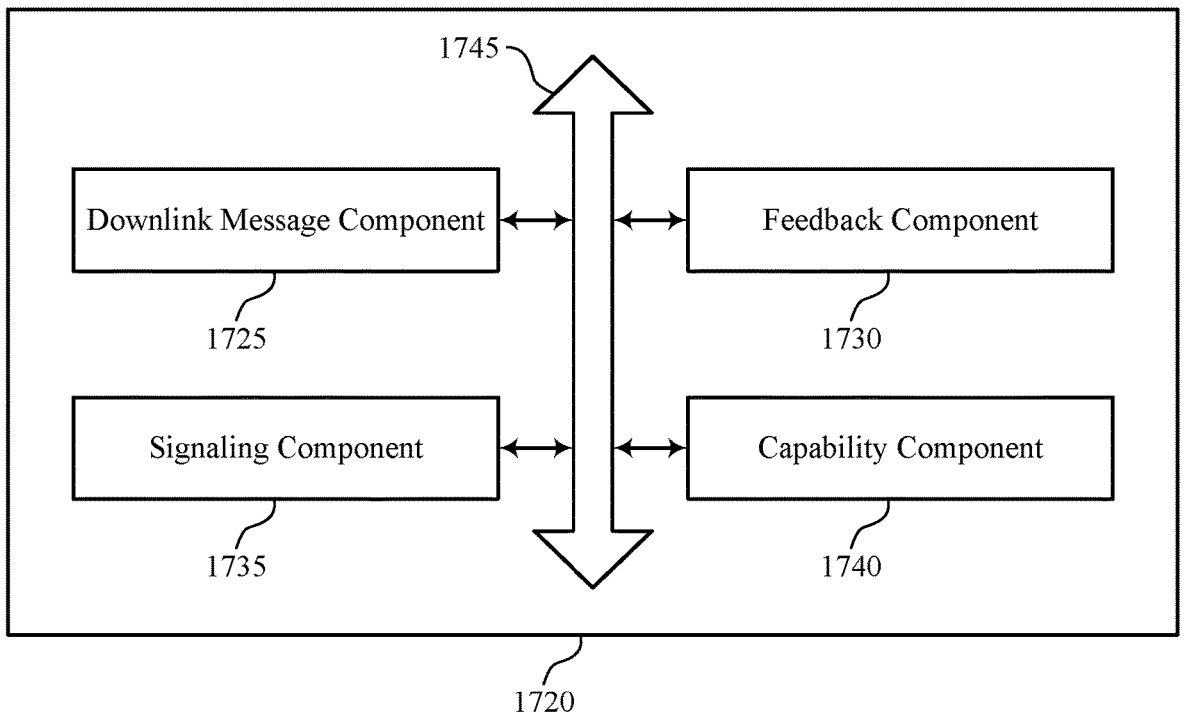
FIG. 17 shows a block diagram of a communications manager that supports techniques for multiplexing multi-bit and single-bit feedback in accordance with aspects of the present disclosure.

FIG. 17 shows a block diagram 1700 of a communications manager 1720 that supports techniques for multiplexing multi-bit and single-bit feedback in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for multiplexing multi-bit and single-bit feedback as described herein. For example, the communications manager 1720 may include a downlink message component 1725, a feedback component 1730, a signaling component 1735, a capability component 1740, or any combination thereof. Each of these components may communicate, directly or indirectly, with one another (e.g., via one or more buses 1745).

The communications manager 1720 may support wireless communication at a base station in accordance with examples as disclosed herein. The downlink message component 1725 may be configured as or otherwise support a means for transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message. The feedback component 1730 may be configured as or otherwise support a means for receiving, from the UE and during the common uplink transmission opportunity, the feedback message based on the codebook, the codebook supporting inclusion of single-bit feedback for the first downlink message and multi-bit feedback for the second downlink message. In some examples, the feedback component 1730 and the downlink message component 1725 may communicate feedback signals via the bus 1745. The feedback signals may indicate the common uplink transmission opportunity for receiving the feedback message, a result of decoding the feedback message, or both In some examples, the signaling component 1735 may be configured as or otherwise support a means for transmitting (e.g., to a UE 115) signaling indicating a first feedback timing for the single-bit feedback for the first downlink message and a second feedback timing for the multi-bit feedback for the second downlink message, the first feedback timing corresponding to a first time gap that is less than a second time gap indicated by the second feedback timing, where transmitting the feedback message based on the codebook is based on a time difference between the first downlink message and the feedback message being greater than or equal to the first time gap, the codebook supporting inclusion of at least the single-bit feedback for the first downlink message.

In some examples, a time difference between the second downlink message and the feedback message is greater than or equal to the second time gap. In some examples, the codebook supports inclusion of both the single-bit feedback for the first downlink message and the multi-bit feedback for the second downlink message based on the time difference being greater than or equal to the second time gap.

In some examples, a time difference between the second downlink message and the feedback message is less than the second time gap. In some examples, the codebook supports inclusion of the single-bit feedback for the first downlink message and additional single-bit feedback for the second downlink message based on the time difference being less than the second time gap.

In some examples, the codebook includes a subcodebook that supports inclusion of either the single-bit feedback for the first downlink message or the multi-bit feedback for the second downlink message. In some examples, each subsubcodebook of the codebook supports inclusion of the single-bit feedback for the first downlink message.

In some examples, a first subcodebook and a second subcodebook of the codebook support inclusion of either the single-bit feedback for the first downlink message or the multi-bit feedback for the second downlink message. In some examples, each subsubcodebook of the codebook supports inclusion of the multi-bit feedback for the second downlink message.

In some examples, a first subcodebook and a second subcodebook of the codebook support inclusion of either the single-bit feedback for the first downlink message or the multi-bit feedback for the second downlink message. In some examples, a subsubcodebook of the first subcodebook supports inclusion of the single-bit feedback for the first downlink message and a subsubcodebook of the second subcodebook supports inclusion of the multi-bit feedback for the second downlink message.

In some examples, the signaling component 1735 may be configured as or otherwise support a means for transmitting signaling configuring the UE with a per-TB based feedback scheme and a per-CBG based feedback scheme, where a subcodebook of the codebook includes the single-bit feedback and excludes the multi-bit feedback based on the signaling configuring the UE with the per-TB based feedback scheme and the per-CBG based feedback scheme, and where a subsubcodebook of the subcodebook supports inclusion of the single-bit feedback for the first downlink message and additional single-bit feedback for the second downlink message.

In some examples, the signaling component 1735 may be configured as or otherwise support a means for transmitting signaling configuring the UE with a per-TB based feedback scheme and disabling a per-CBG based feedback scheme, where a subcodebook of the codebook includes both the single-bit feedback and the multi-bit feedback based on the signaling configuring the per-TB based feedback scheme and disabling the per-CBG based feedback scheme, and where a first subsubcodebook of the subcodebook supports inclusion of the single-bit feedback for the first downlink message and a second subsubcodebook of the subcodebook supports inclusion of the multi-bit feedback for the second downlink message.

In some examples, a subcodebook of the codebook includes both the single-bit feedback and the multi-bit feedback based on the codebook being a high-priority codebook. In some examples, a first subsubcodebook of the subcodebook supports inclusion of the single-bit feedback for the first downlink message and a second subsubcodebook of the subcodebook supports inclusion of the multi-bit feedback for the second downlink message.

In some examples, a subcodebook of the codebook includes the single-bit feedback and excludes the multi-bit feedback based on the codebook being a low-priority codebook. In some examples, a subsubcodebook of the subcodebook supports inclusion of the single-bit feedback for the first downlink message and additional single-bit feedback for the second downlink message.

In some examples, the signaling component 1735 may be configured as or otherwise support a means for transmitting signaling configuring the UE with multi-TRP feedback, where a subcodebook of the codebook includes the single-bit feedback and excludes the multi-bit feedback based on the signaling configuring the multi-TRP feedback, and where a subsubcodebook of the subcodebook supports inclusion of the single-bit feedback for the first downlink message and additional single-bit feedback for the second downlink message.

In some examples, the codebook includes both the single-bit feedback for the first downlink message and the multi-bit feedback for the second downlink message. In some examples, a subcodebook of the codebook includes a first subsubcodebook and a second subsubcodebook, the first subsubcodebook including the single-bit feedback and the second subsubcodebook including the multi-bit feedback.

In some examples, the capability component 1740 may be configured as or otherwise support a means for receiving an indication of a capability of the UE to support a set of multiple subsubcodebooks of the codebook, where the feedback message including the codebook is based on the capability of the UE.

In some examples, the multi-bit feedback includes a first bit indicating an ACK or a NACK associated with the second downlink message and one or more additional bits indicating information corresponding to one or more communications parameters. In some examples, the one or more communications parameters are associated with CSI.

Figure 18:
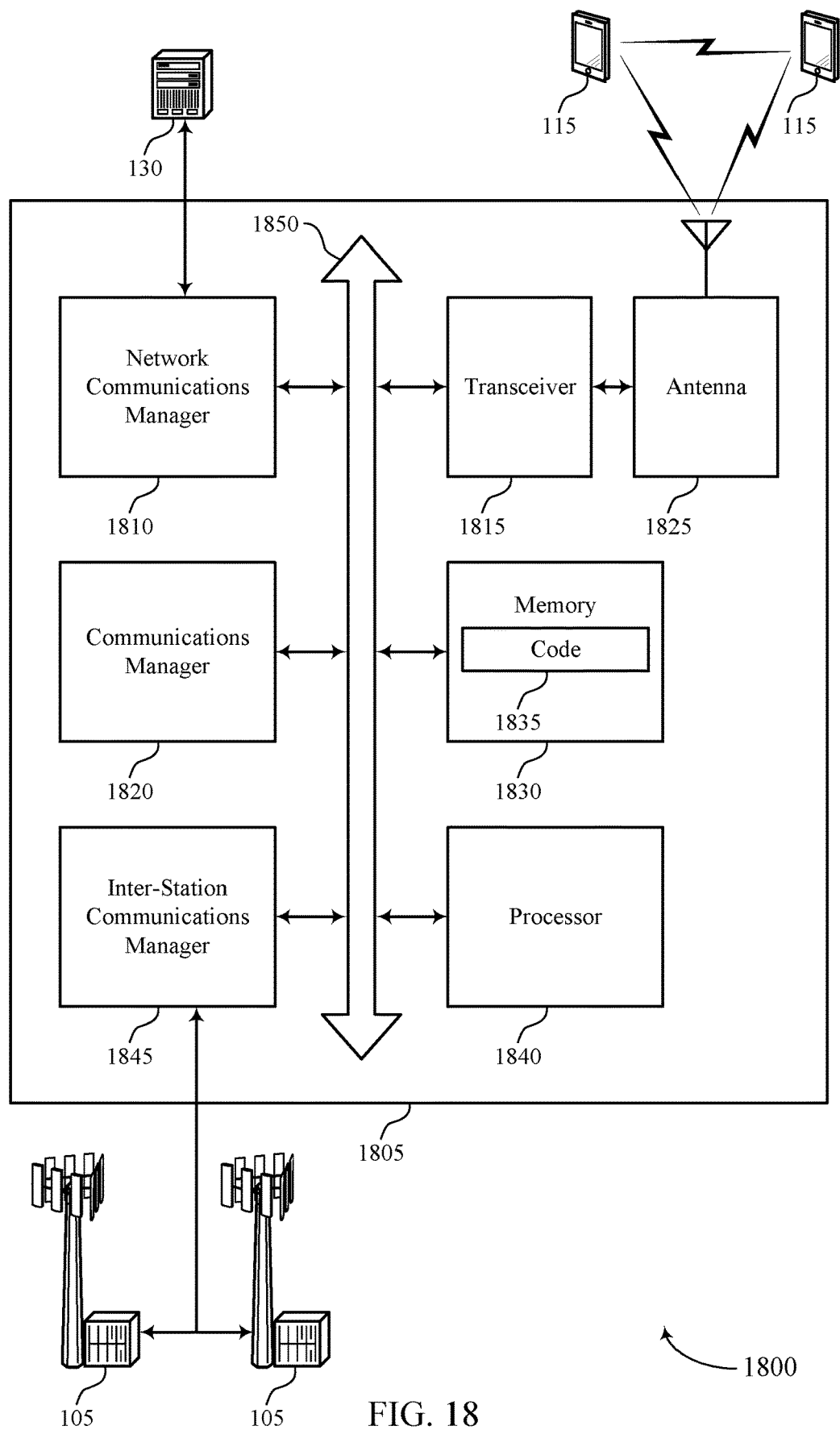
FIG. 18 shows a diagram of a system including a device that supports techniques for multiplexing multi-bit and single-bit feedback in accordance with aspects of the present disclosure.

FIG. 18 shows a diagram of a system 1800 including a device 1805 that supports techniques for multiplexing multi-bit and single-bit feedback in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for multiplexing multi-bit and single-bit feedback). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message. The communications manager 1820 may be configured as or otherwise support a means for receiving, from the UE and during the common uplink transmission opportunity, the feedback message based on the codebook, the codebook supporting inclusion of single-bit feedback for the first downlink message and multi-bit feedback for the second downlink message.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for multiplexing multi-bit and single-bit feedback as described herein, or the processor 1840 and the memory 1830 may be otherwise configured to perform or support such operations.

Figure 19:
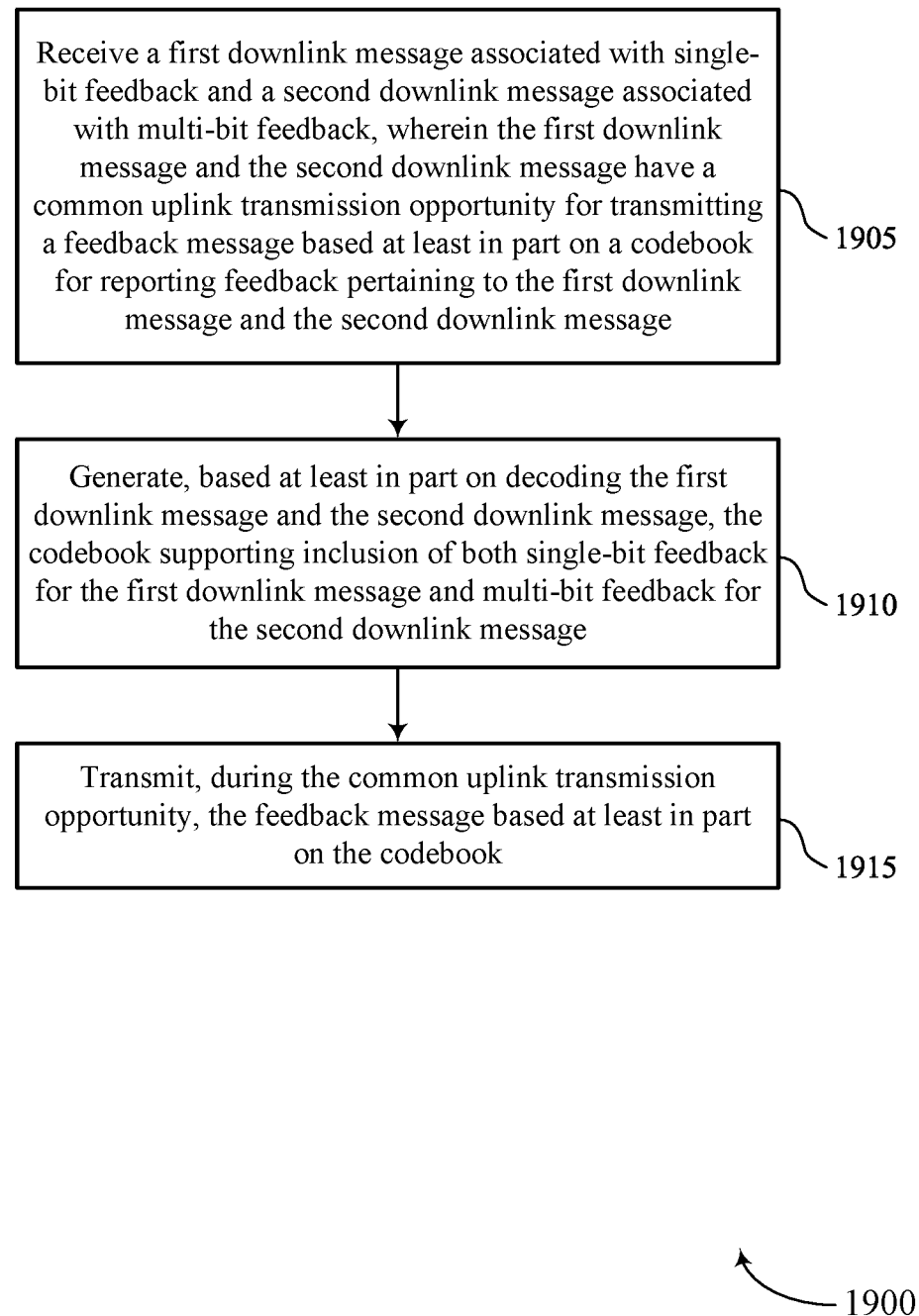
FIGS. 19 through 23 show flowcharts illustrating methods that support techniques for multiplexing multi-bit and single-bit feedback in accordance with aspects of the present disclosure.

FIG. 19 shows a flowchart illustrating a method 1900 that supports techniques for multiplexing multi-bit and single-bit feedback in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 1905, the method may include receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message. The operations of 1905 may be performed in accordance with examples as disclosed herein. In some examples, aspects of the operations of 1905 may be performed by a downlink message component 1325 as described with reference to FIG. 13.

At 1910, the method may include generating, based on decoding the first downlink message and the second downlink message, the codebook supporting inclusion of both single-bit feedback for the first downlink message and multi-bit feedback for the second downlink message. The operations of 1910 may be performed in accordance with examples as disclosed herein. In some examples, aspects of the operations of 1910 may be performed by a codebook component 1330 as described with reference to FIG. 13.

At 1915, the method may include transmitting, during the common uplink transmission opportunity, the feedback message based on the codebook. The operations of 1915 may be performed in accordance with examples as disclosed herein. In some examples, aspects of the operations of 1915 may be performed by a feedback component 1335 as described with reference to FIG. 13.

Figure 20:
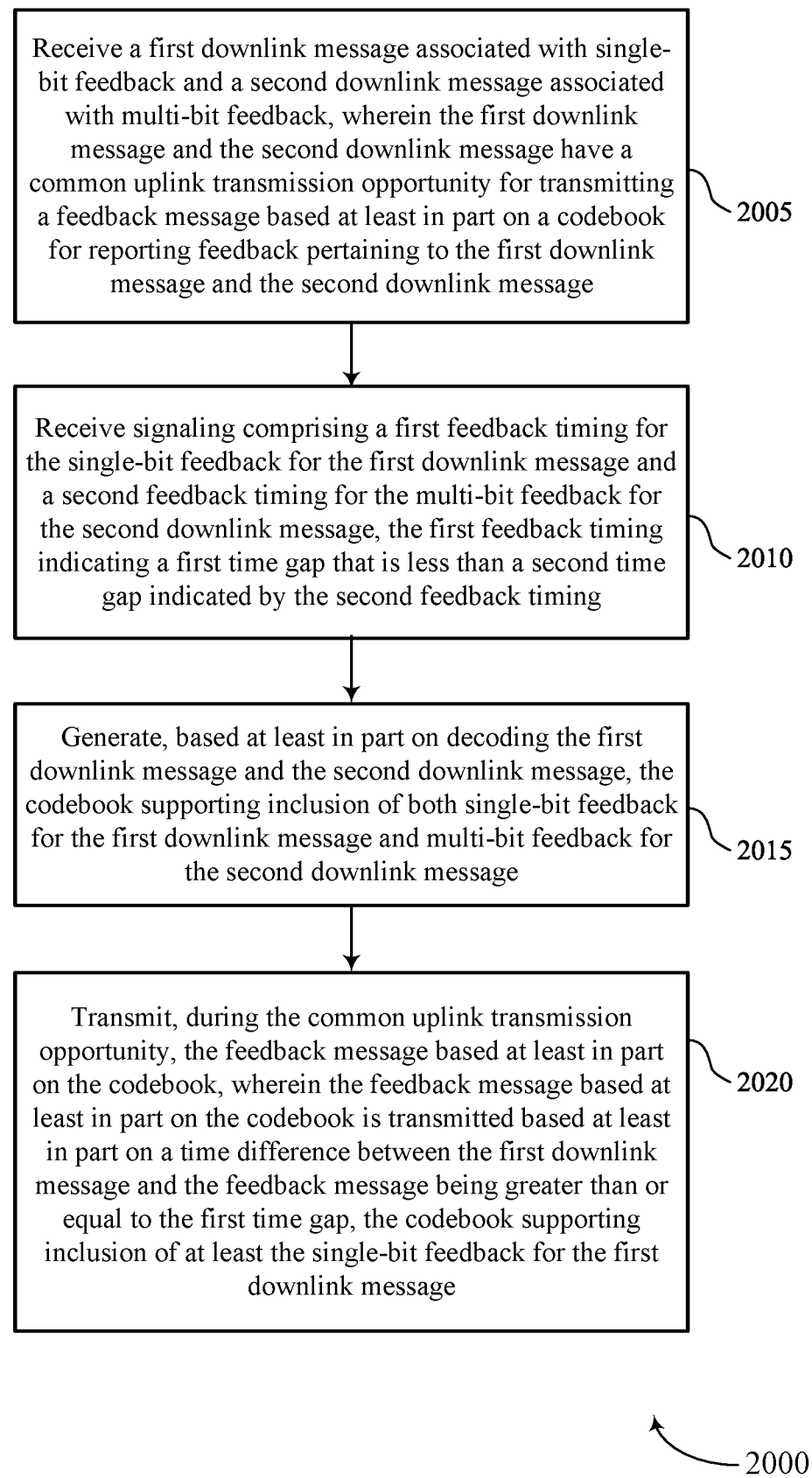

FIG. 20 shows a flowchart illustrating a method 2000 that supports techniques for multiplexing multi-bit and single-bit feedback in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2005, the method may include receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message. The operations of 2005 may be performed in accordance with examples as disclosed herein. In some examples, aspects of the operations of 2005 may be performed by a downlink message component 1325 as described with reference to FIG. 13.

At 2010, the method may include receiving signaling including a first feedback timing for the single-bit feedback for the first downlink message and a second feedback timing for the multi-bit feedback for the second downlink message, the first feedback timing indicating a first time gap that is less than a second time gap indicated by the second feedback timing. The operations of 2010 may be performed in accordance with examples as disclosed herein. In some examples, aspects of the operations of 2010 may be performed by a feedback timing component 1340 as described with reference to FIG. 13.

At 2015, the method may include generating, based on decoding the first downlink message and the second downlink message, the codebook supporting inclusion of both single-bit feedback for the first downlink message and multi-bit feedback for the second downlink message. The operations of 2015 may be performed in accordance with examples as disclosed herein. In some examples, aspects of the operations of 2015 may be performed by a codebook component 1330 as described with reference to FIG. 13.

At 2020, the method may include transmitting, during the common uplink transmission opportunity, the feedback message based on the codebook, where the feedback message based on the codebook is transmitted based on a time difference between the first downlink message and the feedback message being greater than or equal to the first time gap, the codebook supporting inclusion of at least the single-bit feedback for the first downlink message. The operations of 2020 may be performed in accordance with examples as disclosed herein. In some examples, aspects of the operations of 2020 may be performed by a feedback component 1335 as described with reference to FIG. 13.

Figure 21:
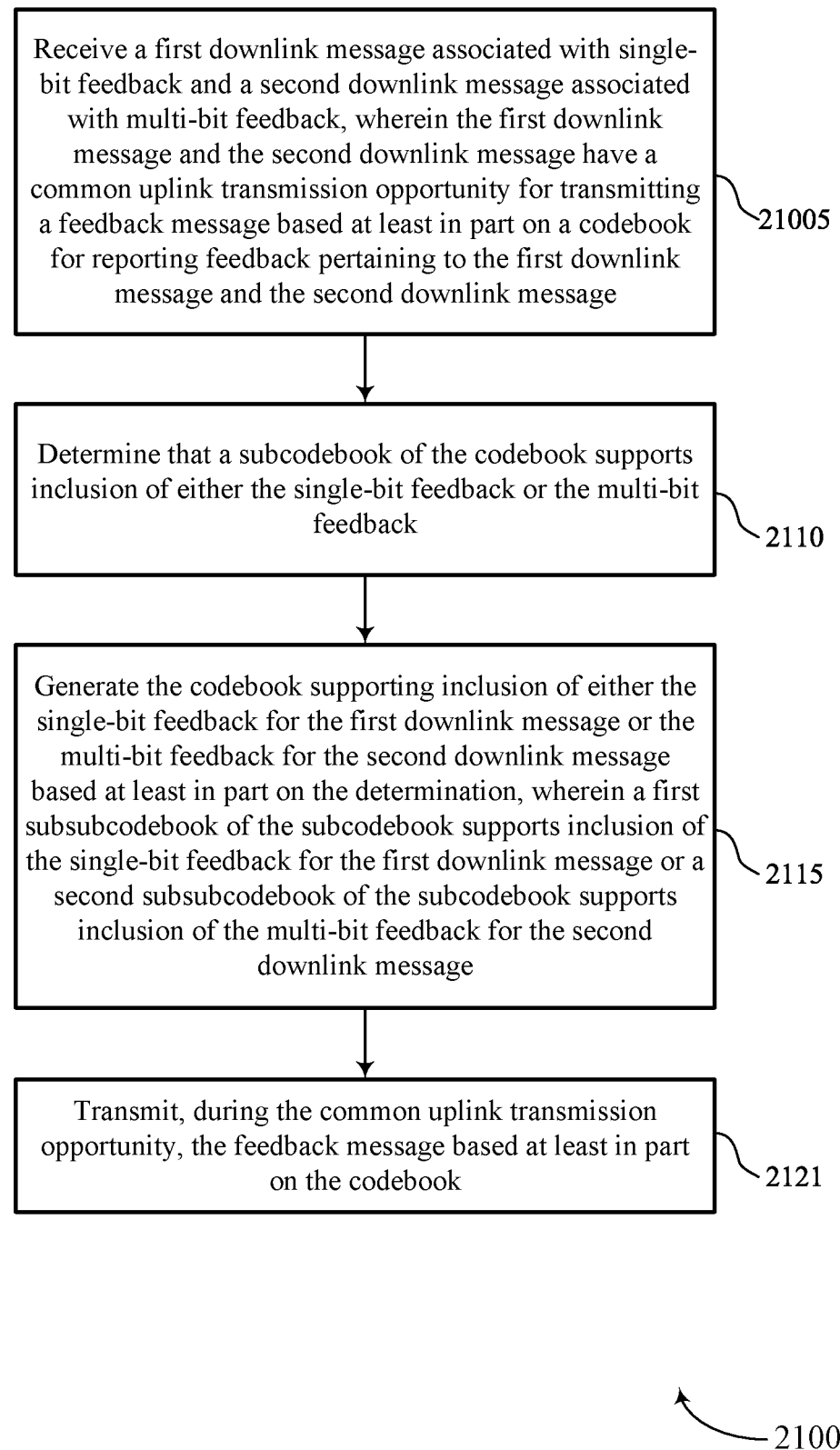

FIG. 21 shows a flowchart illustrating a method 2100 that supports techniques for multiplexing multi-bit and single-bit feedback in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally, or alternatively, the UE may perform aspects of the described functions using special-purpose hardware.

At 2105, the method may include receiving a first downlink message associated with single-bit feedback and a second downlink message associated with multi-bit feedback, where the first downlink message and the second downlink message have a common uplink transmission opportunity for transmitting a feedback message based on a codebook for reporting feedback pertaining to the first downlink message and the second downlink message. The operations of 2105 may be performed in accordance with examples as disclosed herein. In some examples, aspects of the operations of 2105 may be performed by a downlink message component 1325 as described with reference to FIG. 13.

At 2110, the method may include determining that a subcodebook of the codebook supports inclusion of either the single-bit feedback or the multi-bit feedback. The operations of 2110 may be performed in accordance with examples as disclosed herein. In some examples, aspects of the operations of 2110 may be performed by a subcodebook component 1345 as described with reference to FIG. 13.

At 2115, the method may include generating, based on decoding the first downlink message and the second downlink message, the codebook supporting inclusion of both single-bit feedback for the first downlink message and multi-bit feedback for the second downlink message. The operations of 2115 may be performed in accordance with examples as disclosed herein. In some examples, aspects of the operations of 2115 may be performed by a codebook component 1330 as described with reference to FIG. 13.

At 2120, the method may include transmitting, during the common uplink transmission opportunity, the feedback message based on the codebook. The operations of 2120 may be performed in accordance with examples as disclosed herein. In some examples, aspects of the operations of 2120 may be performed by a feedback component 1335 as described with reference to FIG. 13.

Figure 22:
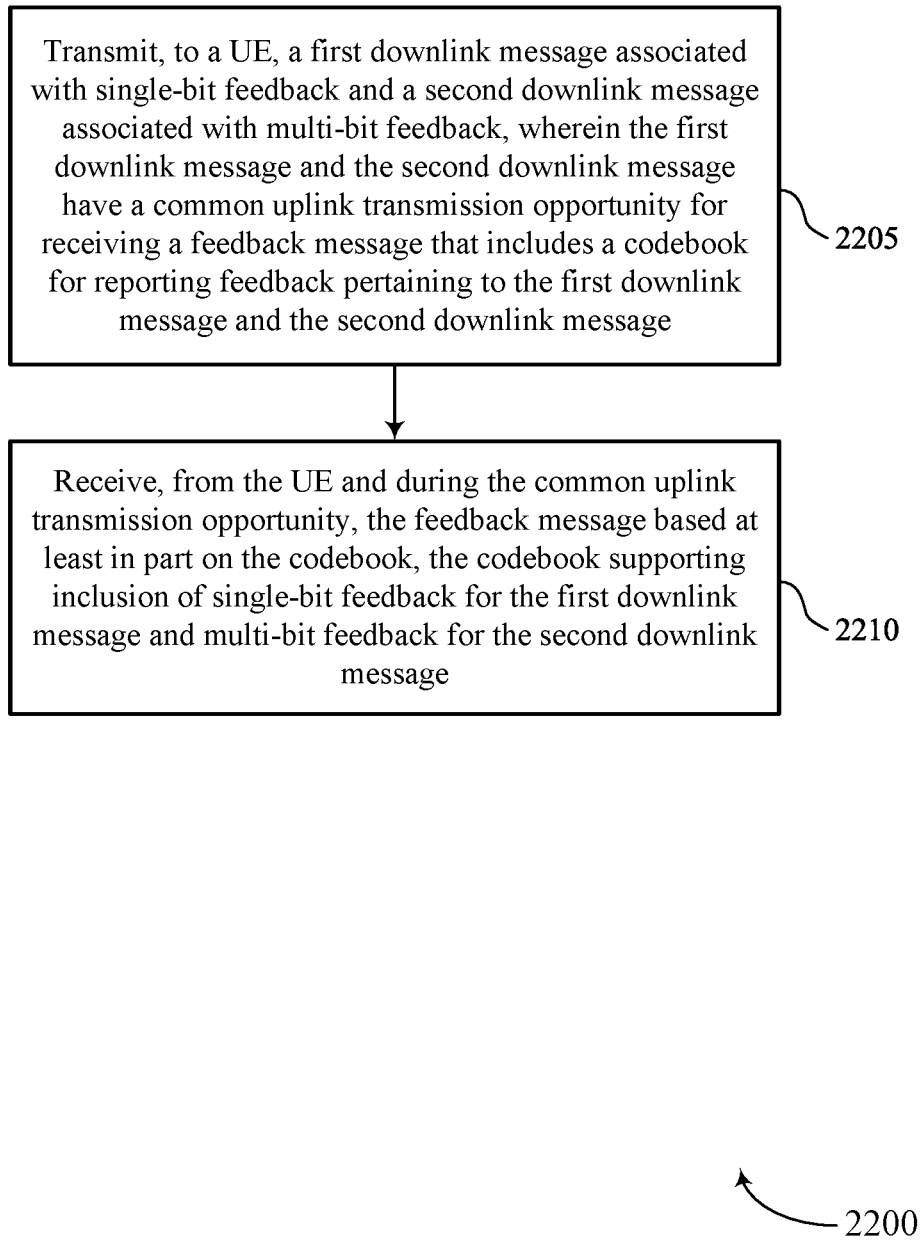

FIG. 22 shows a flowchart illustrating a method 2200 that supports techniques for multiplexing multi-bit and single-bit feedback in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2205, the method may include transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message. The operations of 2205 may be performed in accordance with examples as disclosed herein. In some examples, aspects of the operations of 2205 may be performed by a downlink message component 1725 as described with reference to FIG. 17.

At 2210, the method may include receiving, from the UE and during the common uplink transmission opportunity, the feedback message based on the codebook, the codebook supporting inclusion of single-bit feedback for the first downlink message and multi-bit feedback for the second downlink message. The operations of 2210 may be performed in accordance with examples as disclosed herein. In some examples, aspects of the operations of 2210 may be performed by a feedback component 1730 as described with reference to FIG. 17.

Figure 23:
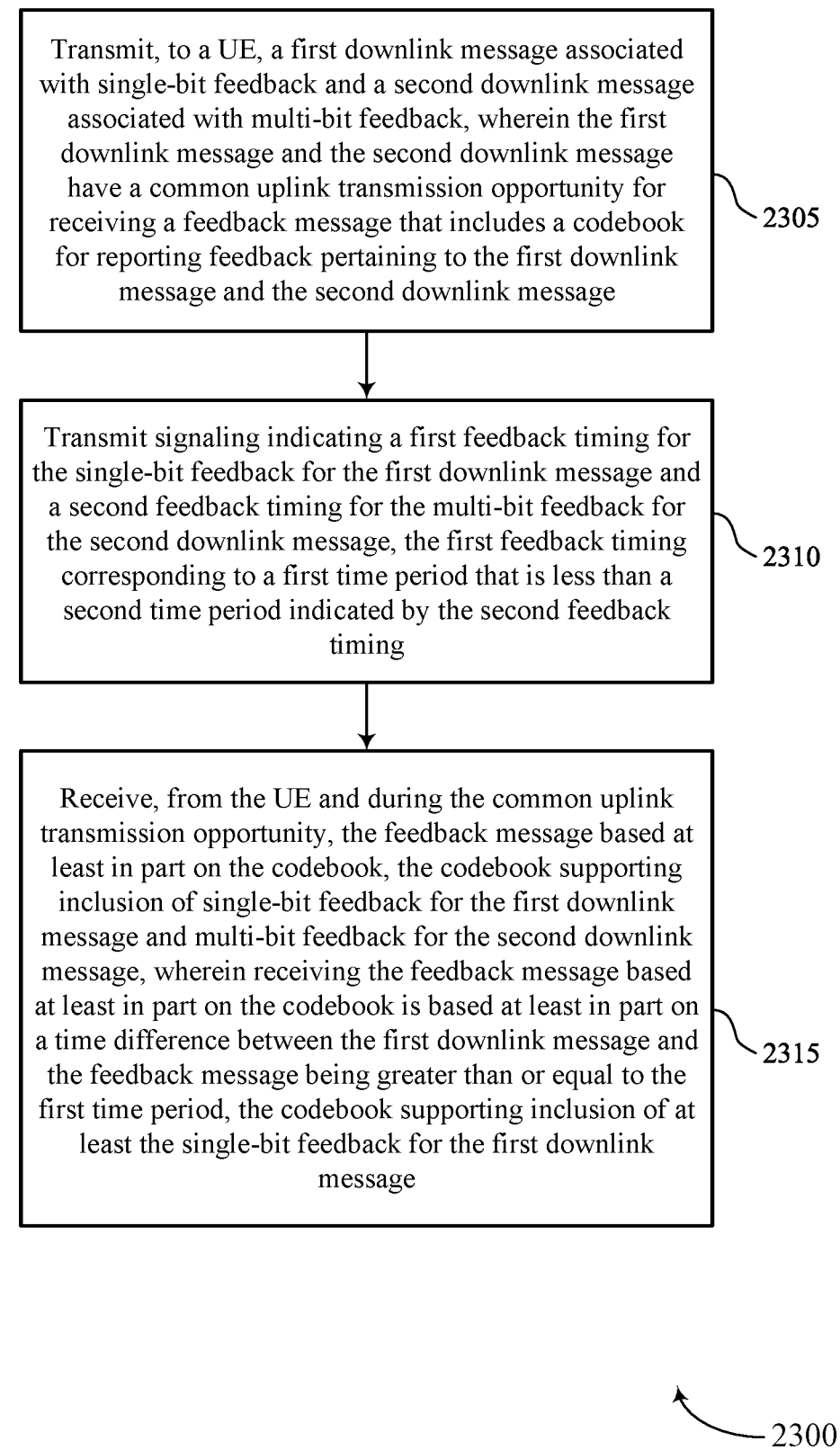

FIG. 23 shows a flowchart illustrating a method 2300 that supports techniques for multiplexing multi-bit and single-bit feedback in accordance with aspects of the present disclosure. The operations of the method 2300 may be implemented by a base station or its components as described herein. For example, the operations of the method 2300 may be performed by a base station 105 as described with reference to FIGS. 1 through 10 and 15 through 18. In some examples, a base station may execute a set of instructions to control the functional elements of the base station to perform the described functions. Additionally, or alternatively, the base station may perform aspects of the described functions using special-purpose hardware.

At 2305, the method may include transmitting, to a UE, a first downlink message associated with single-bit feedback and a second downlink message associated with multi-bit feedback, where the first downlink message and the second downlink message have a common uplink transmission opportunity for receiving a feedback message that includes a codebook for reporting feedback pertaining to the first downlink message and the second downlink message. The operations of 2305 may be performed in accordance with examples as disclosed herein. In some examples, aspects of the operations of 2305 may be performed by a downlink message component 1725 as described with reference to FIG. 17.

At 2310, the method may include transmitting signaling indicating a first feedback timing for the single-bit feedback for the first downlink message and a second feedback timing for the multi-bit feedback for the second downlink message, the first feedback timing corresponding to a first time gap that is less than a second time gap indicated by the second feedback timing. The operations of 2310 may be performed in accordance with examples as disclosed herein. In some examples, aspects of the operations of 2310 may be performed by a signaling component 1735 as described with reference to FIG. 17.

At 2315, the method may include receiving, from the UE and during the common uplink transmission opportunity, the feedback message based on the codebook, the codebook supporting inclusion of single-bit feedback for the first downlink message and multi-bit feedback for the second downlink message, where receiving the feedback message based on the codebook is based on a time difference between the first downlink message and the feedback message being greater than or equal to the first time gap, the codebook supporting inclusion of at least the single-bit feedback for the first downlink message. The operations of 2315 may be performed in accordance with examples as disclosed herein. In some examples, aspects of the operations of 2315 may be performed by a feedback component 1730 as described with reference to FIG. 17.

The following provides an overview of aspects of the present disclosure:

Aspect 1: A method for wireless communication at a UE, comprising: receiving a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message; generating, based at least in part on decoding the first downlink message and the second downlink message, the codebook supporting inclusion of both single-bit feedback for the first downlink message and multi-bit feedback for the second downlink message; and transmitting, during the common uplink transmission opportunity, the feedback message based at least in part on the codebook.

Aspect 2: The method of aspect 1, further comprising: receiving signaling comprising a first feedback timing for the single-bit feedback for the first downlink message and a second feedback timing for the multi-bit feedback for the second downlink message, the first feedback timing indicating a first time gap that is less than a second time gap indicated by the second feedback timing, wherein the feedback message based at least in part on the codebook is transmitted based at least in part on a time difference between the first downlink message and the feedback message being greater than or equal to the first time gap, the codebook supporting inclusion of at least the single-bit feedback for the first downlink message.

Aspect 3: The method of aspect 2, further comprising: determining that a time difference between the second downlink message and the feedback message is greater than or equal to the second time gap, wherein generating the codebook comprises: generating the codebook supporting inclusion of both the single-bit feedback for the first downlink message and the multi-bit feedback for the second downlink message based at least in part on the time difference being greater than or equal to the second time gap.

Aspect 4: The method of aspect 2, wherein determining that a time difference between the second downlink message and the feedback message is less than the second time gap, wherein generating the codebook comprises: generating the codebook supporting inclusion of the single-bit feedback for the first downlink message and additional single-bit feedback for the second downlink message based at least in part on the time difference being less than the second time gap.

Aspect 5: The method of aspect 4, wherein generating the codebook supporting inclusion of the single-bit feedback for the first downlink message and the additional single-bit feedback for the second downlink message comprises: dropping one or more bits from the multi-bit feedback for the second downlink message.

Aspect 6: The method of any of aspects 1 through 2, further comprising: determining that a subcodebook of the codebook supports inclusion of either the single-bit feedback or the multi-bit feedback, wherein generating the codebook comprises: generating the codebook supporting inclusion of the single-bit feedback for the first downlink message based at least in part on the determination, wherein each subsubcodebook of the codebook supports inclusion of the single-bit feedback for the first downlink message.

Aspect 7: The method of any of aspects 1 through 2, further comprising: determining that a subcodebook of the codebook supports inclusion of either the single-bit feedback or the multi-bit feedback, wherein generating the codebook comprises: generating the codebook supporting inclusion of the multi-bit feedback for the second downlink message based at least in part on the determination, wherein each subsubcodebook of the codebook supports inclusion of the multi-bit feedback for the second downlink message.

Aspect 8: The method of any of aspects 1 through 2, further comprising: determining that a first subcodebook and a second subcodebook of the codebook support inclusion of either the single-bit feedback or the multi-bit feedback, wherein generating the codebook comprises: generating the codebook supporting inclusion of the single-bit feedback for the first downlink message or the multi-bit feedback for the second downlink message based at least in part on the determination, wherein a subsubcodebook of the first subcodebook supports inclusion of the single-bit feedback for the first downlink message and a subsubcodebook of the second subcodebook supports inclusion of the multi-bit feedback for the second downlink message.

Aspect 9: The method of any of aspects 1 through 2, further comprising: receiving signaling configuring the UE with a per-TB based feedback scheme and a per-CBG based feedback scheme; and determining that a subcodebook of the codebook supports inclusion of the single-bit feedback and exclude the multi-bit feedback based at least in part on the signaling configuring the per-TB based feedback scheme and the per-CBG based feedback scheme, wherein generating the codebook comprises: generating the codebook supporting inclusion of the single-bit feedback for the first downlink message and additional single-bit feedback for the second downlink message based at least in part on the determination, wherein a subsubcodebook of the subcodebook supports inclusion of the single-bit feedback for the first downlink message and the additional single-bit feedback for the second downlink message, and wherein the multi-bit feedback for the second downlink message is reduced to the additional single-bit feedback based at least in part on the determination.

Aspect 10: The method of any of aspects 1 through 2, wherein receiving signaling configuring the UE with a per-TB based feedback scheme and disabling a per-CBG based feedback scheme; and determining that a subcodebook of the codebook supports inclusion of both the single-bit feedback and the multi-bit feedback based at least in part on the signaling configuring the per-TB based feedback scheme and disabling the per-CBG based feedback scheme, wherein generating the codebook comprises: generating the codebook supporting inclusion of both the single-bit feedback for the first downlink message and the multi-bit feedback for the second downlink message based at least in part on the determination, wherein a first subsubcodebook of the subcodebook supports inclusion of the single-bit feedback for the first downlink message and a second subsubcodebook of the subcodebook supports inclusion of the multi-bit feedback for the second downlink message.

Aspect 11: The method of any of aspects 1 through 2, wherein determining that a subcodebook of the codebook supports inclusion of both the single-bit feedback and the multi-bit feedback based at least in part on the codebook being a high-priority codebook, wherein generating the codebook comprises: generating the codebook supporting inclusion of both the single-bit feedback for the first downlink message and the multi-bit feedback for the second downlink message based at least in part on the determination, wherein a first subsubcodebook of the subcodebook supports inclusion of the single-bit feedback for the first downlink message and a second subsubcodebook of the subcodebook supports inclusion of the multi-bit feedback for the second downlink message.

Aspect 12: The method of any of aspects 1 through 2, further comprising: determining that a subcodebook of the codebook supports inclusion of the single-bit feedback and exclude the multi-bit feedback based at least in part on the codebook being a low-priority codebook, wherein generating the codebook comprises: generating the codebook supporting inclusion of the single-bit feedback for the first downlink message and additional single-bit feedback for the second downlink message based at least in part on the determination, wherein a subsubcodebook of the subcodebook supports inclusion of the single-bit feedback for the first downlink message and the additional single-bit feedback for the second downlink message, and wherein the multi-bit feedback for the second downlink message is reduced to the additional single-bit feedback based at least in part on the determination.

Aspect 13: The method of any of aspects 1 through 2, further comprising: receiving signaling configuring the UE with multi-TRP feedback; and determining that a subcodebook of the codebook supports inclusion of the single-bit feedback and exclude the multi-bit feedback based at least in part on the control signaling configuring the multi-TRP feedback, wherein generating the codebook comprises: generating the codebook supporting inclusion of the single-bit feedback for the first downlink message and additional single-bit feedback for the second downlink message based at least in part on the determination, wherein a subsubcodebook of the subcodebook supports inclusion of the single-bit feedback for the first downlink message and the additional single-bit feedback for the second downlink message, and wherein the multi-bit feedback for the second downlink message is reduced to the additional single-bit feedback based at least in part on the determination.

Aspect 14: The method of any of aspects 1 through 2, wherein generating the codebook comprises: generating the codebook supporting inclusion of both the single-bit feedback for the first downlink message and the multi-bit feedback for the second downlink message, wherein a subcodebook of the codebook comprises a first subsubcodebook and a second subsubcodebook, the first subsubcodebook including the single-bit feedback and the second subsubcodebook including the multi-bit feedback.

Aspect 15: The method of any of aspects 1 through 14, further comprising: transmitting an indication of a capability of the UE to support a plurality of subsubcodebooks of the codebook, wherein transmitting the feedback message comprising the codebook is based at least in part on the capability of the UE.

Aspect 16: The method of any of aspects 1 through 15, wherein the multi-bit feedback comprises a first bit indicating an ACK or a NACK associated with the second downlink message and one or more additional bits indicating information corresponding to one or more communications parameters, and the one or more communications parameters are associated with CSI.

Aspect 17: A method for wireless communication at a base station, comprising: transmitting, to a UE, a first downlink message associated with single-bit feedback and a second downlink message associated with multi-bit feedback, wherein the first downlink message and the second downlink message have a common uplink transmission opportunity for receiving a feedback message that includes a codebook for reporting feedback pertaining to the first downlink message and the second downlink message; and receiving, from the UE and during the common uplink transmission opportunity, the feedback message based at least in part on the codebook, the codebook supporting inclusion of single-bit feedback for the first downlink message and multi-bit feedback for the second downlink message.

Aspect 18: The method of aspect 17, further comprising: transmitting signaling indicating a first feedback timing for the single-bit feedback for the first downlink message and a second feedback timing for the multi-bit feedback for the second downlink message, the first feedback timing corresponding to a first time gap that is less than a second time gap indicated by the second feedback timing, wherein transmitting the feedback message based at least in part on the codebook is based at least in part on a time difference between the first downlink message and the feedback message being greater than or equal to the first time gap, the codebook supporting inclusion of at least the single-bit feedback for the first downlink message.

Aspect 19: The method of aspect 18, wherein a time difference between the second downlink message and the feedback message is greater than or equal to the second time gap, and the codebook supports inclusion of both the single-bit feedback for the first downlink message and the multi-bit feedback for the second downlink message based at least in part on the time difference being greater than or equal to the second time gap.

Aspect 20: The method of any of aspects 18 through 19, wherein a time difference between the second downlink message and the feedback message is less than the second time gap, and the codebook supports inclusion of the single-bit feedback for the first downlink message and additional single-bit feedback for the second downlink message based at least in part on the time difference being less than the second time gap.

Aspect 21: The method of any of aspects 17 through 18, wherein the codebook comprises a subcodebook that supports inclusion of either the single-bit feedback for the first downlink message or the multi-bit feedback for the second downlink message, and each subsubcodebook of the codebook supports inclusion of the single-bit feedback for the first downlink message.

Aspect 22: The method of any of aspects 17 through 18, wherein a first subcodebook and a second subcodebook of the codebook support inclusion of either the single-bit feedback for the first downlink message or the multi-bit feedback for the second downlink message, and each subsubcodebook of the codebook supports inclusion of the multi-bit feedback for the second downlink message.

Aspect 23: The method of any of aspects 17 through 18, wherein a first subcodebook and a second subcodebook of the codebook support inclusion of either the single-bit feedback for the first downlink message or the multi-bit feedback for the second downlink message, and a subsubcodebook of the first subcodebook supports inclusion of the single-bit feedback for the first downlink message and a subsubcodebook of the second subcodebook supports inclusion of the multi-bit feedback for the second downlink message.

Aspect 24: The method of any of aspects 17 through 18, further comprising: transmitting signaling configuring the UE with a per-TB based feedback scheme and a per-CBG based feedback scheme, wherein a subcodebook of the codebook includes the single-bit feedback and excludes the multi-bit feedback based at least in part on the signaling configuring the UE with the per-TB based feedback scheme and the per-CBG based feedback scheme, and wherein a subsubcodebook of the subcodebook supports inclusion of the single-bit feedback for the first downlink message and additional single-bit feedback for the second downlink message.

Aspect 25: The method of any of aspects 17 through 18, further comprising: transmitting signaling configuring the UE with a per-TB based feedback scheme and disabling a per-CBG based feedback scheme, wherein a subcodebook of the codebook includes both the single-bit feedback and the multi-bit feedback based at least in part on the signaling configuring the per-TB based feedback scheme and disabling the per-CBG based feedback scheme, and wherein a first subsubcodebook of the subcodebook supports inclusion of the single-bit feedback for the first downlink message and a second subsubcodebook of the subcodebook supports inclusion of the multi-bit feedback for the second downlink message.

Aspect 26: The method of any of aspects 17 through 18, wherein a subcodebook of the codebook includes both the single-bit feedback and the multi-bit feedback based at least in part on the codebook being a high-priority codebook, and a first subsubcodebook of the subcodebook supports inclusion of the single-bit feedback for the first downlink message and a second subsubcodebook of the subcodebook supports inclusion of the multi-bit feedback for the second downlink message.

Aspect 27: The method of any of aspects 17 through 18, wherein a subcodebook of the codebook includes the single-bit feedback and excludes the multi-bit feedback based at least in part on the codebook being a low-priority codebook, and a subsubcodebook of the subcodebook supports inclusion of the single-bit feedback for the first downlink message and additional single-bit feedback for the second downlink message.

Aspect 28: The method of any of aspects 17 through 18, further comprising: transmitting signaling configuring the UE with multi-TRP feedback, wherein a subcodebook of the codebook includes the single-bit feedback and excludes the multi-bit feedback based at least in part on the signaling configuring the multi-TRP feedback, and wherein a subsubcodebook of the subcodebook supports inclusion of the single-bit feedback for the first downlink message and additional single-bit feedback for the second downlink message.

Aspect 29: The method of any of aspects 17 through 18, wherein the codebook includes both the single-bit feedback for the first downlink message and the multi-bit feedback for the second downlink message, and a subcodebook of the codebook comprises a first subsubcodebook and a second subsubcodebook, the first subsubcodebook including the single-bit feedback and the second subsubcodebook including the multi-bit feedback.

Aspect 30: The method of any of aspects 17 through 29, further comprising: receiving an indication of a capability of the UE to support a plurality of subsubcodebooks of the codebook, wherein the feedback message comprising the codebook is based at least in part on the capability of the UE.

Aspect 31: The method of any of aspects 17 through 30, wherein the multi-bit feedback comprises a first bit indicating an ACK or a NACK associated with the second downlink message and one or more additional bits indicating information corresponding to one or more communications parameters, the one or more communications parameters are associated with CSI.

Aspect 32: An apparatus for wireless communication at a UE, comprising a processor; memory coupled with the processor; and instructions stored in the memory and executable by the processor to cause the apparatus to perform a method of any of aspects 1 through 16.

Aspect 33: An apparatus for wireless communication at a UE, comprising at least one means for performing a method of any of aspects 1 through 16.

Aspect 34: A non-transitory computer-readable medium storing code for wireless communication at a UE, the code comprising instructions executable by a processor to perform a method of any of aspects 1 through 16.

Aspect 35: An apparatus for wireless communication at a base station, comprising a processor; memory coupled with the processor; and instructions stored in the memory and executable by the processor to cause the apparatus to perform a method of any of aspects 17 through 31.

Aspect 36: An apparatus for wireless communication at a base station, comprising at least one means for performing a method of any of aspects 17 through 31.

Aspect 37: A non-transitory computer-readable medium storing code for wireless communication at a base station, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:
   a processor; and
   memory coupled with the processor, wherein the apparatus is configured to:
      receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;
      receive signaling comprising a first feedback timing for the single-bit feedback for the first downlink message and a second feedback timing for the multi-bit feedback for the second downlink message, wherein the first feedback timing indicates a first time gap that is less than a second time gap indicated by the second feedback timing; and
      transmit, during the common uplink transmission opportunity and based at least in part on a time difference between the first downlink message and the feedback message being greater than or equal to the first time gap, the feedback message, wherein the feedback message is based at least in part on the codebook, and wherein the codebook supports the single-bit feedback for the first downlink message and the multi-bit feedback for the second downlink message.

2. The apparatus of claim 1, wherein the codebook is based at least in part on a time difference between the second downlink message and the feedback message being greater than or equal to the second time gap.

3. The apparatus of claim 1, wherein the codebook is based at least in part on a time difference between the second downlink message and the feedback message being less than the second time gap.

4. The apparatus of claim 3, wherein the apparatus is configured to:
   drop one or more bits from the multi-bit feedback for the second downlink message.

5. The apparatus of claim 1, wherein the apparatus is configured to:
   generate the codebook, wherein a subcodebook of the codebook comprises a first subsubcodebook and a second subsubcodebook, the first subsubcodebook including the single-bit feedback and the second subsubcodebook including the multi-bit feedback.

6. The apparatus of claim 1, wherein the apparatus is configured to:
   transmit an indication of a capability of the apparatus to support a plurality of subsubcodebooks of the codebook, wherein transmission of the feedback message is based at least in part on the capability of the apparatus.

7. The apparatus of claim 1, wherein the apparatus is configured to:
   generate, based at least in part on decoding the first downlink message and the second downlink message, the codebook.

8. The apparatus of claim 2, wherein the feedback message includes the single-bit feedback for the first downlink message and the multi-bit feedback for the second downlink message.

9. The apparatus of claim 3, wherein the feedback message includes the single-bit feedback for the first downlink message, and wherein the feedback messages includes, based at least in part on the time difference between the second downlink message and the feedback message being less than the second time gap, single-bit feedback for the second downlink message instead of the multi-bit feedback.

10. The apparatus of claim 9, wherein the apparatus is configured to:
drop one or more bits from the multi-bit feedback for the second downlink message.

11. The apparatus of claim 1, wherein the apparatus is configured to:
modify the multi-bit feedback for the second downlink message into an additional single-bit feedback for the second message.

12. The apparatus of claim 11, wherein the feedback message includes the single-bit feedback for the first message and the additional single-bit feedback for the second message.

13. The apparatus of claim 12, wherein the modification is based at least in part on a time difference between the second downlink message and the feedback message being less than the second time gap.

14. An apparatus for wireless communication, comprising:
a processor; and
memory coupled with the processor; wherein the apparatus is configured to:
receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;
determine that a subcodebook of the codebook supports either the single-bit feedback or the multi-bit feedback;
generate the codebook supporting the single-bit feedback for the first downlink message based at least in part on the determination, wherein each subsubcodebook of the codebook supports the single-bit feedback for the first downlink message, wherein the codebook supports the multi-bit feedback for the second downlink message; and
transmit, during the common uplink transmission opportunity, the feedback message, wherein the feedback message is based at least in part on the codebook.

15. An apparatus for wireless communication, comprising:
a processor; and
memory coupled with the processor; wherein the apparatus is configured to:
receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;
determine that a subcodebook of the codebook supports either the single-bit feedback or the multi-bit feedback;
generate the codebook supporting the multi-bit feedback for the second downlink message based at least in part on the determination, wherein each subsubcodebook of the codebook supports the multi-bit feedback for the second downlink message, wherein the codebook supports the single-bit feedback for the first downlink message; and
transmit, during the common uplink transmission opportunity, the feedback message, wherein the feedback message is based at least in part on the codebook.

16. An apparatus for wireless communication, comprising:
a processor; and
memory coupled with the processor; wherein the apparatus is configured to:
receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;
determine that a first subcodebook and a second subcodebook of the codebook support either the single-bit feedback or the multi-bit feedback;
generate the codebook supporting the single-bit feedback for the first downlink message or the multi-bit feedback for the second downlink message based at least in part on the determination, wherein a subsubcodebook of the first subcodebook supports the single-bit feedback for the first downlink message and a subsubcodebook of the second subcodebook supports the multi-bit feedback for the second downlink message; and
transmit, during the common uplink transmission opportunity, the feedback message, wherein the feedback message is based at least in part on the codebook.

17. An apparatus for wireless communication, comprising:
a processor; and
memory coupled with the processor; wherein the apparatus is configured to:
receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;
receive signaling that configures the apparatus with a per-transport block based feedback scheme and a per-code block group based feedback scheme;
determine, based at least in part on the signaling, that a subcodebook of the codebook supports the single-bit feedback and excludes the multi-bit feedback;

generate the codebook based at least in part on the determination, wherein a subsubcodebook of the subcodebook supports the single-bit feedback for the first downlink message and an additional single-bit feedback for the second downlink message, and wherein the multi-bit feedback for the second downlink message is reduced to the additional single-bit feedback based at least in part on the determination; and transmit, during the common uplink transmission opportunity, the feedback message, wherein the feedback message is based at least in part on the codebook.

18. An apparatus for wireless communication, comprising:

a processor; and memory coupled with the processor; wherein the apparatus is configured to:

receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;

receive signaling that configures the apparatus with a per-transport block based feedback scheme and that disables a per-code block group based feedback scheme;

determine, based at least in part on the signaling, that a subcodebook of the codebook supports the single-bit feedback and the multi-bit feedback;

generate, based at least in part on the determination, the codebook supporting the single-bit feedback for the first downlink message and the multi-bit feedback for the second downlink message, wherein a first subsubcodebook of the subcodebook supports the single-bit feedback for the first downlink message and a second sub subcodebook of the subcodebook supports the multi-bit feedback for the second downlink message; and transmit, during the common uplink transmission opportunity, the feedback message, wherein the feedback message is based at least in part on the codebook.

19. An apparatus for wireless communication, comprising:

a processor; and memory coupled with the processor; wherein the apparatus is configured to:

receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;

determine, based at least in part on the codebook being a high-priority codebook, that a subcodebook of the codebook supports the single-bit feedback and the multi-bit feedback;

generate the codebook supporting both the single-bit feedback for the first downlink message and the multi-bit feedback for the second downlink message based at least in part on the determination, wherein a first subsubcodebook of the subcodebook supports the single-bit feedback for the first downlink message and a second subsubcodebook of the subcodebook supports the multi-bit feedback for the second downlink message; and transmit, during the common uplink transmission opportunity, the feedback message, wherein the feedback message is based at least in part on the codebook.

20. An apparatus for wireless communication, comprising:

a processor; and memory coupled with the processor; wherein the apparatus is configured to:

receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback determine, based at least in part on the codebook being a low-priority codebook, that a subcodebook of the codebook supports the single-bit feedback and excludes the multi-bit feedback;

generate the codebook based at least in part on the determination, wherein a subsubcodebook of the subcodebook supports the single-bit feedback for the first downlink message and an additional single-bit feedback for the second downlink message, and wherein the multi-bit feedback for the second downlink message is reduced to the additional single-bit feedback based at least in part on the determination; and transmit, during the common uplink transmission opportunity, the feedback message, wherein the feedback message is based at least in part on the codebook.

21. An apparatus for wireless communication, comprising:

a processor; and memory coupled with the processor; wherein the apparatus is configured to:

receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;

receive signaling that configures the apparatus with multi-transmission/reception point feedback;

determine, based at least in part on the signaling, that a subcodebook of the codebook supports the single-bit feedback and excludes the multi-bit feedback;

generate the codebook based at least in part on the determination, wherein a subsubcodebook of the subcodebook supports the single-bit feedback for the first downlink message and an additional single-bit feedback for the second downlink message, and wherein the multi-bit feedback for the second downlink message is reduced to the additional single-bit feedback based at least in part on the determination; and transmit, during the common uplink transmission opportunity, the feedback message, wherein the feedback message is based at least in part on the codebook.

22. An apparatus for wireless communication, comprising:
a processor; and
memory coupled with the processor; wherein the apparatus is configured to:
receive a first downlink message associated with single-bit feedback and a second downlink message associated with multi-bit feedback, wherein the first downlink message and the second downlink message have a common uplink transmission opportunity for transmitting a feedback message based at least in part on a codebook for reporting feedback pertaining to the first downlink message and the second downlink message;
generate the codebook, wherein the codebook supports the single-bit feedback for the first downlink message and the multi-bit feedback for the second downlink message; and
transmit, during the common uplink transmission opportunity, the feedback message, wherein the feedback message is based at least in part on the codebook, wherein the multi-bit feedback comprises a first bit indicating an acknowledgment or a negative acknowledgment associated with the second downlink message, wherein the multi-bit feedback comprises one or more additional bits indicating information corresponding to one or more communications parameters, and wherein the one or more communications parameters are associated with channel state information.

23. An apparatus for wireless communication at a base station, comprising:
a processor; and
memory coupled with the processor; wherein the apparatus is configured to cause the base station to:
transmit, to a user equipment (UE), a first downlink message associated with single-bit feedback and a second downlink message associated with multi-bit feedback, wherein the first downlink message and the second downlink message have a common uplink transmission opportunity for receiving a feedback message that includes a codebook for reporting feedback pertaining to the first downlink message and the second downlink message;
transmit signaling indicating a first feedback timing for the single-bit feedback for the first downlink message and a second feedback timing for the multi-bit feedback for the second downlink message, wherein the first feedback timing corresponds to a first time gap that is less than a second time gap indicated by the second feedback timing; and
receive, from the UE and during the common uplink transmission opportunity and based at least in part on a time difference between the first downlink message and the feedback message being greater than or equal to the first time gap, the feedback message, wherein the feedback message is based at least in part on the codebook, and wherein the codebook supports the single-bit feedback for the first downlink message and the multi-bit feedback for the second downlink message.

24. The apparatus of claim 23, wherein the codebook is based at least in part on a time difference between the second downlink message and the feedback message being greater than or equal to the second time gap.

25. The apparatus of claim 23, wherein the codebook is based at least in part on a time difference between the second downlink message and the feedback message being less than the second time gap.

26. The apparatus of claim 23, wherein the codebook comprises a subcodebook that supports either the single-bit feedback for the first downlink message or the multi-bit feedback for the second downlink message, and each subsubcodebook of the codebook supports the single-bit feedback for the first downlink message.

27. The apparatus of claim 23, wherein a first subcodebook and a second subcodebook of the codebook support either the single-bit feedback for the first downlink message or the multi-bit feedback for the second downlink message, and each subsubcodebook of the codebook supports the multi-bit feedback for the second downlink message.

28. The apparatus of claim 23, wherein a first subcodebook and a second subcodebook of the codebook support either the single-bit feedback for the first downlink message or the multi-bit feedback for the second downlink message, and a sub subcodebook of the first subcodebook supports the single-bit feedback for the first downlink message and a subsubcodebook of the second subcodebook supports the multi-bit feedback for the second downlink message.

29. The apparatus of claim 23, wherein the apparatus is configured cause the base station to:
transmit second signaling for configuring the UE with a per-transport block based feedback scheme and a per-code block group based feedback scheme, wherein a subcodebook of the codebook includes the single-bit feedback and excludes the multi-bit feedback based at least in part on the second signaling, and wherein a subsubcodebook of the subcodebook supports the single-bit feedback for the first downlink message and additional single-bit feedback for the second downlink message.

30. The apparatus of claim 23, wherein the apparatus is configured cause the base station to:
transmit second signaling for configuring the UE with a per-transport block based feedback scheme and for disabling a per-code block group based feedback scheme, wherein a subcodebook of the codebook includes both the single-bit feedback and the multi-bit feedback based at least in part on the second signaling, and wherein a first subsubcodebook of the subcodebook supports the single-bit feedback for the first downlink message and a second sub subcodebook of the subcodebook supports the multi-bit feedback for the second downlink message.

31. The apparatus of claim 23, wherein a subcodebook of the codebook includes both the single-bit feedback and the multi-bit feedback based at least in part on the codebook being a high-priority codebook, and wherein a first subsubcodebook of the subcodebook supports the single-bit feedback for the first downlink message and a second subsubcodebook of the subcodebook supports the multi-bit feedback for the second downlink message.

32. The apparatus of claim 23, wherein a subcodebook of the codebook includes the single-bit feedback and excludes the multi-bit feedback based at least in part on the codebook being a low-priority codebook, and wherein a subsubcodebook of the subcodebook supports the single-bit feedback for the first downlink message and additional single-bit feedback for the second downlink message.

33. The apparatus of claim 23, wherein the apparatus is configured cause the base station to:
transmit second signaling for configuring the UE with multi-transmission/reception point feedback, wherein a subcodebook of the codebook includes the single-bit feedback and excludes the multi-bit feedback based at least in part on the second signaling, and wherein a subsubcodebook of the subcodebook supports the single-bit feedback for the first downlink message and additional single-bit feedback for the second downlink message.

34. The apparatus of claim 23, wherein the codebook includes the single-bit feedback for the first downlink message and the multi-bit feedback for the second downlink message, wherein a subcodebook of the codebook comprises a first subsubcodebook and a second subsubcodebook, and wherein the first subsubcodebook includes the single-bit feedback and the second subsubcodebook includes the multi-bit feedback.

35. The apparatus of claim 23, wherein the apparatus is configured cause the base station to:
receive an indication of a capability of the UE to support a plurality of subsubcodebooks of the codebook, wherein the feedback message comprising the codebook is based at least in part on the capability of the UE.

36. An apparatus for wireless communication at a base station, comprising:
a processor; and
memory coupled with the processor; wherein the apparatus is configured to cause the base station to:
transmit, to a user equipment (UE), a first downlink message associated with single-bit feedback and a second downlink message associated with multi-bit feedback, wherein the first downlink message and the second downlink message have a common uplink transmission opportunity for receiving a feedback message that includes a codebook for reporting feedback pertaining to the first downlink message and the second downlink message; and
receive, from the UE and during the common uplink transmission opportunity, the feedback message, wherein the feedback message is based at least in part on the codebook, wherein the codebook includes the single-bit feedback for the first downlink message and the multi-bit feedback for the second downlink message, wherein the multi-bit feedback comprises a first bit indicating an acknowledgment or a negative acknowledgment associated with the second downlink message, wherein the multi-bit feedback comprises one or more additional bits indicating information corresponding to one or more communications parameters, and wherein the one or more communications parameters are associated with channel state information.

* * * * *